US009715005B2

(12) United States Patent
Hughes et al.

(10) Patent No.: US 9,715,005 B2
(45) Date of Patent: Jul. 25, 2017

(54) METHOD, APPARATUS, AND COMPUTER PROGRAM PRODUCT IMPROVING REAL TIME LOCATION SYSTEMS WITH MULTIPLE LOCATION TECHNOLOGIES

(71) Applicant: ZIH Corp., Lincolnshire, IL (US)

(72) Inventors: John K. Hughes, Coarsegold, CA (US); James J. O'Hagan, McHenry, IL (US)

(73) Assignee: ZIH Corp., Lincolnshire, IL (US)

( * ) Notice: Subject to any disclaimer, the term of this patent is extended or adjusted under 35 U.S.C. 154(b) by 142 days.

(21) Appl. No.: 14/298,035

(22) Filed: Jun. 6, 2014

(65) Prior Publication Data

US 2014/0361928 A1 Dec. 11, 2014

Related U.S. Application Data

(63) Continuation-in-part of application No. 13/942,316, filed on Jul. 15, 2013, now Pat. No. 9,002,485.

(60) Provisional application No. 61/831,990, filed on Jun. 6, 2013.

(51) Int. Cl.
*G01S 3/02* (2006.01)
*G01S 5/02* (2010.01)
*G01S 13/76* (2006.01)
*G01S 19/48* (2010.01)
*G01S 13/87* (2006.01)

(52) U.S. Cl.
CPC .......... *G01S 5/0284* (2013.01); *G01S 13/765* (2013.01); *G01S 19/48* (2013.01); *G01S 5/0294* (2013.01); *G01S 13/878* (2013.01)

(58) Field of Classification Search
CPC .... G01S 5/0284; G01S 5/0294; G01S 13/765; G01S 13/878; G01S 19/48

USPC ......... 342/463, 386, 350; 340/539.23, 12.51, 340/13.26

See application file for complete search history.

(56) References Cited

U.S. PATENT DOCUMENTS 3,732,500 A 5/1973 Dishal et al.
4,270,145 A 5/1981 Farina
5,046,133 A 9/1991 Watanabe et al.
(Continued)

FOREIGN PATENT DOCUMENTS

EP 1235077 A2 8/2002
EP 1241616 A2 9/2002
(Continued)

OTHER PUBLICATIONS

Invention to Pay Additional Fees/Partial International Search Report for PCT/IB2015/054099 dated Oct. 6, 2015.
(Continued)

*Primary Examiner* — Chuong P Nguyen

(57) ABSTRACT

Systems, methods, apparatuses, and computer readable media are disclosed for improving, in some examples, real time location systems with multiple location technologies. In one embodiment, a method is provided including receiving blink data from a location tag associated with a first sensor; receiving proximity data generated based on communications between the first sensor and a second sensor, the proximity data including a sensor identifier; calculating location data associated with the location tag based on the blink data; and determining sensor position calculation data associated with the first sensor based on the proximity data.

14 Claims, 13 Drawing Sheets

(56) References Cited

U.S. PATENT DOCUMENTS

| | | |
|---|---|---|
| 5,119,104 A | 6/1992 | Heller |
| 5,469,409 A | 11/1995 | Anderson et al. |
| 5,513,854 A | 5/1996 | Daver |
| 5,645,077 A | 7/1997 | Foxlin |
| 5,699,244 A | 12/1997 | Clark et al. |
| 5,793,630 A | 8/1998 | Theimer et al. |
| 5,901,172 A | 5/1999 | Fontana et al. |
| 5,920,287 A | 7/1999 | Belcher et al. |
| 5,930,741 A | 7/1999 | Kramer |
| 5,995,046 A | 11/1999 | Belcher et al. |
| 6,028,626 A | 2/2000 | Aviv |
| 6,121,926 A | 9/2000 | Belcher et al. |
| 6,176,837 B1 | 1/2001 | Foxlin |
| 6,204,813 B1 | 3/2001 | Wadell et al. |
| 6,366,242 B1 | 4/2002 | Boyd et al. |
| 6,380,894 B1 | 4/2002 | Boyd et al. |
| 6,593,885 B2 | 7/2003 | Wisherd et al. |
| 6,655,582 B2 | 12/2003 | Wohl et al. |
| 6,710,713 B1 | 3/2004 | Russo |
| 6,812,884 B2 | 11/2004 | Richley et al. |
| 6,836,744 B1 | 12/2004 | Asphahani et al. |
| 6,882,315 B2 | 4/2005 | Richley et al. |
| 7,009,638 B2 | 3/2006 | Gruber et al. |
| 7,190,271 B2 | 3/2007 | Boyd et al. |
| 7,263,133 B1 | 8/2007 | Miao |
| 7,667,604 B2 | 2/2010 | Ebert et al. |
| 7,671,802 B2 | 3/2010 | Walsh et al. |
| 7,710,322 B1 | 5/2010 | Ameti et al. |
| 7,739,076 B1 | 6/2010 | Vock et al. |
| 7,755,541 B2 | 7/2010 | Wisherd et al. |
| 7,899,006 B2 | 3/2011 | Boyd |
| 7,969,348 B2 | 6/2011 | Baker et al. |
| 8,009,727 B2 | 8/2011 | Hui et al. |
| 8,023,917 B2 | 9/2011 | Popescu |
| 8,077,981 B2 | 12/2011 | Elangovan et al. |
| 8,269,835 B2 | 9/2012 | Grigsby |
| 8,279,051 B2 | 10/2012 | Khan |
| 8,289,185 B2 | 10/2012 | Alonso |
| 8,457,392 B2 | 6/2013 | Cavallaro et al. |
| 8,477,046 B2 | 7/2013 | Alonso |
| 8,568,278 B2 | 10/2013 | Riley et al. |
| 8,665,152 B1 | 3/2014 | Kling et al. |
| 8,696,458 B2 | 4/2014 | Foxlin et al. |
| 8,705,671 B2 | 4/2014 | Ameti et al. |
| 8,775,916 B2 | 7/2014 | Pulsipher et al. |
| 8,780,204 B2 | 7/2014 | DeAngelis et al. |
| 8,795,045 B2 | 8/2014 | Sorrells et al. |
| 8,842,002 B2 | 9/2014 | Rado |
| 8,989,880 B2 * | 3/2015 | Wohl .................. G06K 7/10227 700/91 |
| 9,081,076 B2 | 7/2015 | DeAngelis et al. |
| 9,185,361 B2 | 11/2015 | Curry |
| 9,381,645 B1 | 7/2016 | Yarlagadda et al. |
| 2001/0010541 A1 | 8/2001 | Fernandez et al. |
| 2001/0030625 A1 | 10/2001 | Doles et al. |
| 2002/0004398 A1 | 1/2002 | Ogino et al. |
| 2002/0041284 A1 | 4/2002 | Konishi et al. |
| 2002/0114493 A1 | 8/2002 | McNitt et al. |
| 2002/0116147 A1 | 8/2002 | Vock et al. |
| 2002/0130835 A1 | 9/2002 | Brosnan |
| 2002/0135479 A1 | 9/2002 | Belcher et al. |
| 2003/0090387 A1 | 5/2003 | Lestienne et al. |
| 2003/0095186 A1 | 5/2003 | Aman et al. |
| 2003/0128100 A1 | 7/2003 | Burkhardt et al. |
| 2003/0163287 A1 | 8/2003 | Vock et al. |
| 2003/0227453 A1 | 12/2003 | Beier et al. |
| 2004/0022227 A1 | 2/2004 | Lynch et al. |
| 2004/0062216 A1 | 4/2004 | Nicholls et al. |
| 2004/0108954 A1 | 6/2004 | Richley et al. |
| 2004/0178960 A1 | 9/2004 | Sun |
| 2004/0249969 A1 | 12/2004 | Price |
| 2004/0260470 A1 | 12/2004 | Rast |
| 2004/0260828 A1 | 12/2004 | Price |
| 2005/0026563 A1 | 2/2005 | Leeper et al. |
| 2005/0031043 A1 | 2/2005 | Paquelet |
| 2005/0059998 A1 | 3/2005 | Norte et al. |
| 2005/0075079 A1 | 4/2005 | Jei et al. |
| 2005/0093976 A1 | 5/2005 | Valleriano |
| 2005/0148281 A1 | 7/2005 | Sanchez-Castro et al. |
| 2005/0207617 A1 | 9/2005 | Sarnoff |
| 2006/0067324 A1 | 3/2006 | Kim |
| 2006/0139167 A1 * | 6/2006 | Davie .................. G01S 13/878 340/539.13 |
| 2006/0164213 A1 | 7/2006 | Burghard et al. |
| 2006/0252476 A1 | 11/2006 | Bahou |
| 2006/0271912 A1 | 11/2006 | Mickle et al. |
| 2006/0281061 A1 | 12/2006 | Hightower et al. |
| 2007/0091292 A1 | 4/2007 | Cho et al. |
| 2007/0176749 A1 | 8/2007 | Boyd et al. |
| 2007/0296723 A1 | 12/2007 | Williams |
| 2008/0065684 A1 | 3/2008 | Zilberman |
| 2008/0106381 A1 | 5/2008 | Adamec et al. |
| 2008/0113787 A1 | 5/2008 | Alderucci |
| 2008/0129825 A1 | 6/2008 | DeAngelis et al. |
| 2008/0140233 A1 * | 6/2008 | Seacat .................. G06Q 90/00 700/91 |
| 2008/0186231 A1 | 8/2008 | Aljadeff et al. |
| 2008/0204248 A1 | 8/2008 | Winget et al. |
| 2008/0262885 A1 | 10/2008 | Jain et al. |
| 2008/0266131 A1 | 10/2008 | Richardson et al. |
| 2008/0269016 A1 | 10/2008 | Ungari et al. |
| 2008/0281443 A1 | 11/2008 | Rodgers |
| 2008/0285805 A1 | 11/2008 | Luinge et al. |
| 2008/0291024 A1 | 11/2008 | Zhang et al. |
| 2009/0048044 A1 | 2/2009 | Oleson et al. |
| 2009/0141736 A1 | 6/2009 | Becker |
| 2009/0231198 A1 * | 9/2009 | Walsh ................ A63B 24/0021 342/463 |
| 2010/0026809 A1 | 2/2010 | Curry |
| 2010/0045508 A1 | 2/2010 | Ekbal et al. |
| 2010/0054304 A1 | 3/2010 | Barnes et al. |
| 2010/0060452 A1 | 3/2010 | Schuster et al. |
| 2010/0150117 A1 | 6/2010 | Aweya et al. |
| 2010/0228314 A1 | 9/2010 | Goetz |
| 2010/0250305 A1 | 9/2010 | Lee et al. |
| 2010/0278386 A1 | 11/2010 | Hoeflinger |
| 2010/0283630 A1 | 11/2010 | Alonso |
| 2010/0328073 A1 | 12/2010 | Nikitin et al. |
| 2011/0002223 A1 | 1/2011 | Gross |
| 2011/0025847 A1 | 2/2011 | Park et al. |
| 2011/0054782 A1 | 3/2011 | Kaahui et al. |
| 2011/0063114 A1 | 3/2011 | Ikoyan |
| 2011/0064023 A1 | 3/2011 | Yamamoto et al. |
| 2011/0084806 A1 | 4/2011 | Perkins et al. |
| 2011/0134240 A1 | 6/2011 | Anderson et al. |
| 2011/0140970 A1 | 6/2011 | Fukagawa et al. |
| 2011/0169959 A1 | 7/2011 | DeAngelis et al. |
| 2011/0188513 A1 | 8/2011 | Christoffersson et al. |
| 2011/0195701 A1 * | 8/2011 | Cook .................. G01S 5/0018 455/422.1 |
| 2011/0261195 A1 | 10/2011 | Martin et al. |
| 2011/0300905 A1 | 12/2011 | Levi |
| 2011/0320322 A1 | 12/2011 | Roslak et al. |
| 2012/0014278 A1 | 1/2012 | Ameti et al. |
| 2012/0015665 A1 | 1/2012 | Farley et al. |
| 2012/0024516 A1 | 2/2012 | Bhadurt et al. |
| 2012/0042326 A1 | 2/2012 | Jain et al. |
| 2012/0057634 A1 | 3/2012 | Shi et al. |
| 2012/0057640 A1 | 3/2012 | Shi et al. |
| 2012/0065483 A1 | 3/2012 | Chung et al. |
| 2012/0081531 A1 | 4/2012 | DeAngelis et al. |
| 2012/0112904 A1 | 5/2012 | Nagy et al. |
| 2012/0126973 A1 | 5/2012 | DeAngelis et al. |
| 2012/0139708 A1 | 6/2012 | Paradiso et al. |
| 2012/0184878 A1 | 7/2012 | Najafi et al. |
| 2012/0212505 A1 | 8/2012 | Burroughs et al. |
| 2012/0218301 A1 | 8/2012 | Miller |
| 2012/0225676 A1 | 9/2012 | Boyd et al. |
| 2012/0231739 A1 | 9/2012 | Chen et al. |
| 2012/0246795 A1 | 10/2012 | Scheffler et al. |
| 2012/0256745 A1 | 10/2012 | Plett et al. |
| 2012/0268239 A1 | 10/2012 | Ljung et al. |
| 2013/0003860 A1 | 1/2013 | Sasai et al. |
| 2013/0021142 A1 | 1/2013 | Matsui et al. |

(56) References Cited

U.S. PATENT DOCUMENTS

| | | |
|---|---|---|
| 2013/0021206 A1 | 1/2013 | Hach et al. |
| 2013/0040574 A1 | 2/2013 | Hillyard |
| 2013/0041590 A1 | 2/2013 | Burich et al. |
| 2013/0041775 A1 | 2/2013 | Rosenberg |
| 2013/0066448 A1 | 3/2013 | Alonso |
| 2013/0076645 A1 | 3/2013 | Anantha et al. |
| 2013/0093625 A1 | 4/2013 | Smith |
| 2013/0096704 A1 | 4/2013 | Case |
| 2013/0115904 A1 | 5/2013 | Kapoor et al. |
| 2013/0138386 A1 | 5/2013 | Jain et al. |
| 2013/0138518 A1 | 5/2013 | White et al. |
| 2013/0142384 A1 | 6/2013 | Ofek |
| 2013/0147608 A1 | 6/2013 | Sadr |
| 2013/0202062 A1 | 8/2013 | Sadr et al. |
| 2013/0257598 A1 | 10/2013 | Kawaguchi et al. |
| 2013/0268185 A1 | 10/2013 | Rabbath et al. |
| 2013/0339156 A1 | 12/2013 | Sanjay et al. |
| 2014/0055588 A1 | 2/2014 | Bangera et al. |
| 2014/0145828 A1 | 5/2014 | Bassan-Eskenazi |
| 2014/0156036 A1 | 6/2014 | Huang |
| 2014/0170607 A1 | 6/2014 | Hsiao et al. |
| 2014/0221137 A1 | 8/2014 | Krysiak et al. |
| 2014/0301427 A1 | 10/2014 | Khalaf-Allah |
| 2014/0320660 A1 | 10/2014 | DeAngelis et al. |
| 2014/0361875 A1 | 12/2014 | O'Hagan et al. |
| 2014/0361906 A1* | 12/2014 | Hughes .............. H04W 84/18 340/870.01 |
| 2014/0361909 A1 | 12/2014 | Stelfox et al. |
| 2014/0364141 A1 | 12/2014 | O'Hagan et al. |
| 2014/0365415 A1 | 12/2014 | Stelfox et al. |
| 2015/0002272 A1 | 1/2015 | Alonso et al. |
| 2015/0057981 A1* | 2/2015 | Gross .................. G01S 5/06 703/1 |
| 2015/0085111 A1 | 3/2015 | Lavery |
| 2015/0088617 A1 | 3/2015 | Geist et al. |
| 2015/0097653 A1* | 4/2015 | Gibbs .............. G06K 7/10366 340/10.1 |
| 2015/0148129 A1 | 5/2015 | Austerlade et al. |
| 2015/0355311 A1* | 12/2015 | O'Hagan .............. G01S 5/021 340/539.13 |
| 2015/0358852 A1 | 12/2015 | Richley et al. |
| 2015/0360133 A1 | 12/2015 | MacCallum et al. |
| 2015/0375041 A1 | 12/2015 | Richley et al. |
| 2015/0375083 A1 | 12/2015 | Stelfox et al. |
| 2015/0378002 A1* | 12/2015 | Hughes .............. G01S 5/0294 342/451 |
| 2015/0379387 A1 | 12/2015 | Richley |
| 2016/0097837 A1 | 4/2016 | Richley et al. |

FOREIGN PATENT DOCUMENTS

| | | |
|---|---|---|
| EP | 1253438 A2 | 10/2002 |
| EP | 1503513 A1 | 2/2005 |
| EP | 2474939 A1 | 11/2012 |
| WO | WO-9805977 A1 | 2/1998 |
| WO | WO 99/61936 A1 | 12/1999 |
| WO | WO 0108417 | 2/2001 |
| WO | WO 2006/022548 | 3/2006 |
| WO | WO-2010/083943 A1 | 7/2010 |
| WO | WO 2015/051813 A1 | 4/2014 |
| WO | WO 2014197600 | 12/2014 |

OTHER PUBLICATIONS

International Search Report and Written Opinion for International Application No. PCT/IB2015/054099 dated Dec. 9, 2015.
International Search Report and Written Opinion from International Application No. PCT/US2014/040881 dated Nov. 4, 2014.
Complaint before the United States District Court of Massachusetts, Civil Action No. 1:15-cv-12297, *Lynx System Developers, Inc. et al. v. Zebra Enterprise Solutions Corporation et al.*, filed Jun. 10, 2015.
International Search Report and Written Opinion from International Application No. PCT/US2014/041062 dated Oct. 1, 2014.
International Search Report and Written Opinion from International Application No. PCT/US2014/040947 dated Oct. 9, 2014.
Fontana, R.J., Richley, E., Barney, J., "Commercialization of an Ultra Wideband Precision Asset Location System," *2003 IEEE Conference on Ultra Wideband Systems and Technologies*, Nov. 16-19, 2003.
Gueziec, A., "Tracking Pitches for Broadcast Television," *Computer*, Aug. 7, 2002.
CattleLog Pro, *eMerge Interactive, Inc.*, Sebastian, FL, 2004.
Marchant, J., "Secure Animal Identification and Source Verification," *JM Communications*, UK, 2002.
"A Guide to Using NLIS Approved Ear Tags and Rumen Boluses," National Livestock Identification Scheme, *Meat & Livestock Australia Limited*, North Sydney, Australia, May 2003.
King, L., "NAIS Cattle ID Pilot Projects Not Needed, Since Proven Advanced Technology Already Exists," *ScoringSystem, Inc.*, Sarasota, FL, Dec. 27, 2005. (www.prweb.com/releases/2005/12prweb325888.htm).
"RFID in the Australian Meat and Livestock Industry," Allflex Australia Pty Ltd,Capalaba, QLD (AU), *Data Capture Suppliers Guide*, 2003-2004.
Swedberg, Claire, "USDA Researchers Develop System to Track Livestock Feeding Behavior Unobtrusively", RFID Journal, Jul. 18, 2013.
International Search Report and Written Opinion from International Application No. PCT/US2014/040940 dated Dec. 17, 2014.
Defendent's Answer to Complaint before the United States District Court of Massachusetts, Civil Action No. 1:15-cv-12297, *Lynx System Developers, Inc. et al., v. Zebra Enterprise Solutions Corporation et al.*, filed Apr. 6, 2016.
International Search Report for International Application No. PCT/US2014/053647 dated Dec. 19, 2014.
International Search Report and Written Opinion for International Application No. PCT/US2016/035614 dated Sep. 15, 2016.
Zhu et al., "A Real-Time Articulated Human Motion Tracking Using Tri-Axis Inertial/Magnetic Sensors Package," IEEE Transactions on Neural Systems and Rehabilitation Engineering, vol. 12, No. 2, Jun. 2004, pp. 295-302.
Swedberg, C., "N.J. Company Seeks to Market Passive Sensor RFID Tags", RFID Journal, Jun. 14, 2011, <http://www.rfidjournal.com/articles/pdf?8527>.
U.S. Appl. No. 61/895,548, filed Oct. 25, 2013, In re: Alonso et al., entitle Method and Apparatus for Associating Radio Frequency Identification Tags with Participants.
U.S. Appl. No. 61/895,548, filed Oct. 25, 2013, In re: Alonso et al., entitled "Method, Apparatus, and Computer Program Product for Collecting Sporting Event Data Based on Real Time Data for Proximity and Movement of Objects".
International Search Report and Written Opinion for International Application No. PCT/IB2015/059264 dated Feb. 10, 2016.
Jinyun Zhang et al., "UWB Systems for Wireless Sensor Networks", Proceedings of the IEEE, IEEE. New York, US, vol. 97, No. 2, Feb. 1, 2009 (Feb. 1, 2009), pp. 313-331.
International Search Report and Written Opinion for International Application No. PCT/US2015/034267 dated Sep. 25, 2015.
International Search Report and Written Opinion for International Application No. PCT/IB2015/054103 dated Aug. 14, 2015.
Cheong, P. et al., "Synchronization, TOA and Position Estimation for Low-Complexity LDR UWB Devices", Ultra-Wideband, 2005 IEEE International Conference, Zurich, Switzerland Sep. 5-8, 2005, Piscataway, NJ, USA, IEEE, Sep. 5, 2005, pp. 480-484.
International Search Report and Written Opinion for International Application No. PCT/IB2015/054213 dated Aug. 6, 2015.
Wang, Y. et al., "An Algorithmic and Systematic Approach from Improving Robustness of TOA-Based Localization", 2013 IEEE 10th International Conference on High Performance Computing and Communications & 2013 IEEE, Nov. 13, 2013, pp. 2066-2073.
Guvenc, I. et al., "A Survey on TOA Based Wireless Localization and NLOA Mitigation Techniques", IEEE Communications Surveys, IEEE, New York, NY, US, vol. 11, No. 3, Oct. 1, 2009, pp. 107-124.
International Search Report and Written Opinion for International Application PCT/IB2015/054102 dated Nov. 4, 2015.

(56) References Cited

OTHER PUBLICATIONS

"Seattleite wins top prize in Microsoft's Super Bowl tech Contest", San Francisco AP, Komonews.com, Feb. 6, 2016. <http://komonews.com/news/local/seattleite-wins-top-prize-in-microsofts-super-bowl-tech-contest>.
Bahle et al., "I See You: How to Improve Wearable Activity Recognition by Leveraging Information from Environmental Cameras," Pervasive Computing and Communications Workshops, IEEE International Conference, (Mar. 18-22, 2013).
Teixeira et al., "Tasking Networked CCTV Cameras and Mobile Phones to Identify and Localize Multiple People," Ubicomp '10 Proceedings of the 12th ACM International Conference on Ubiquitous Computing, pp. 213-222 (Sep. 26-29, 2010).
Complaint before the United States District Court of Massachusetts, Civil Action No. 1:15-cv-12297, *Lynx System Developers, Inc. et al.* v. *Zebra Enterprise Solutions Corporation et al.*, filed Mar. 23, 2016.
European Search Report for European Patent Application No. 14806811.7 dated Dec. 9, 2016.

\* cited by examiner

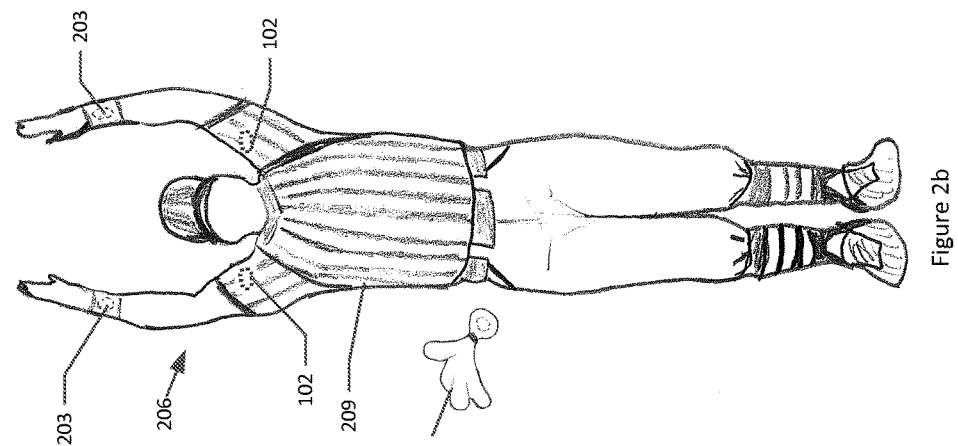
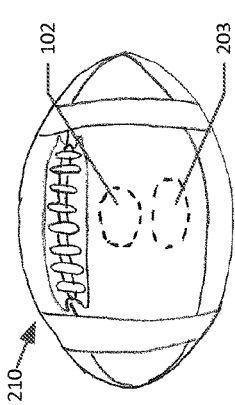
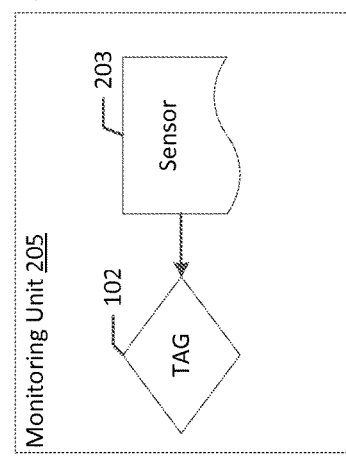
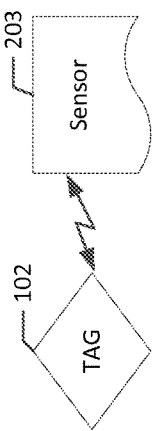
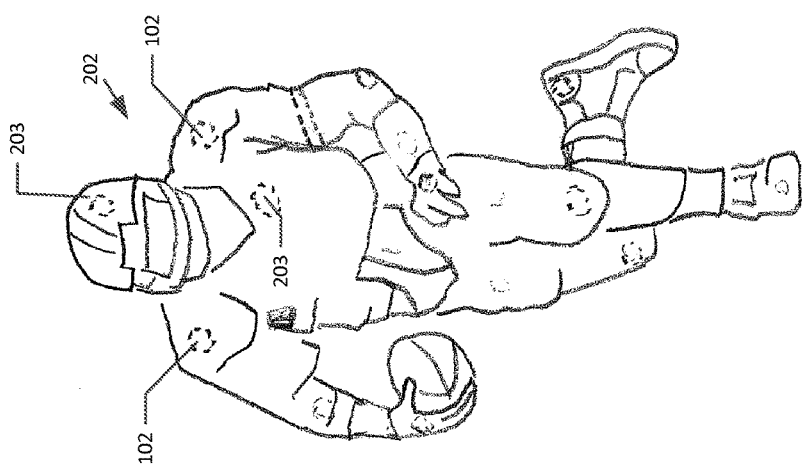

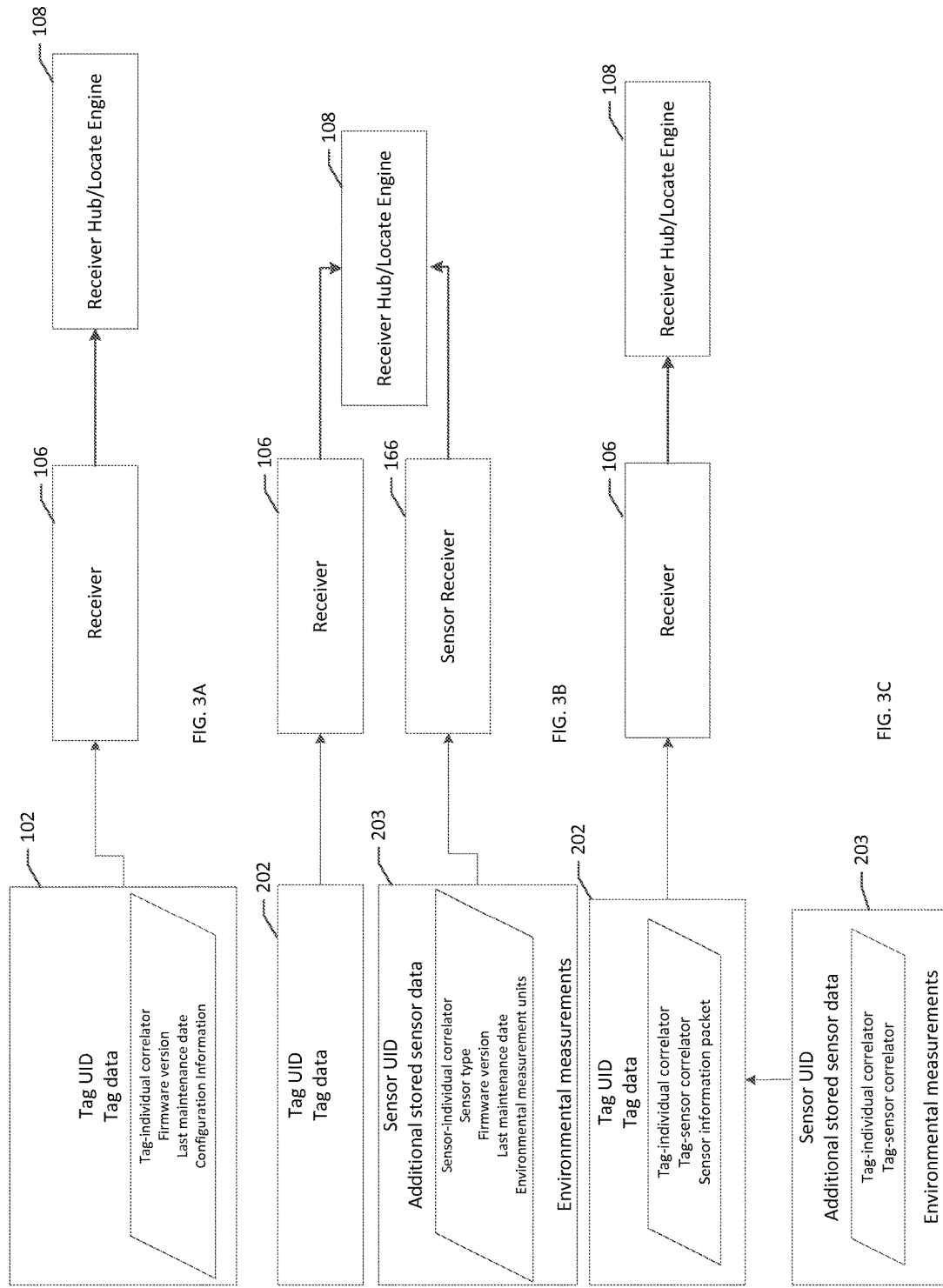

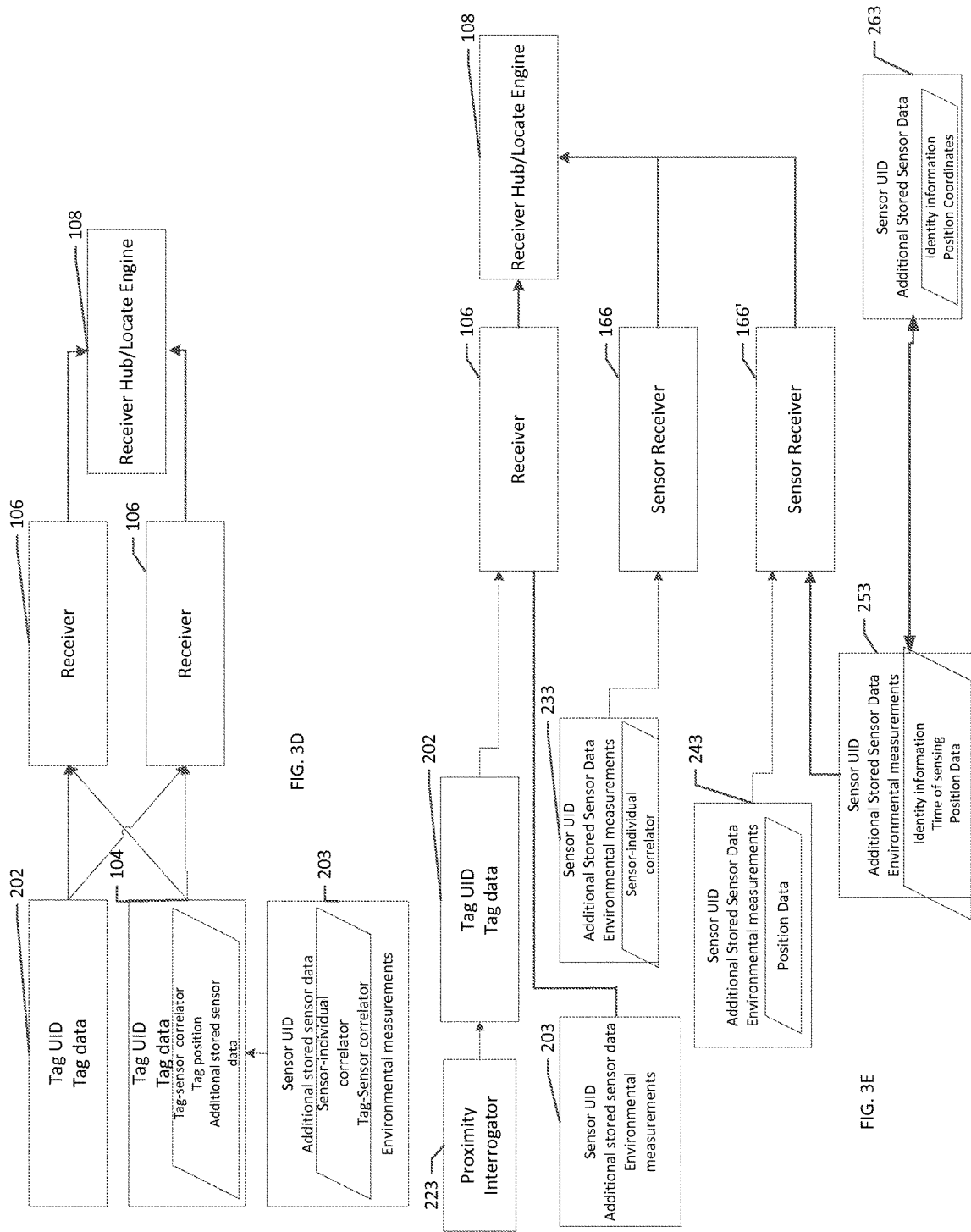

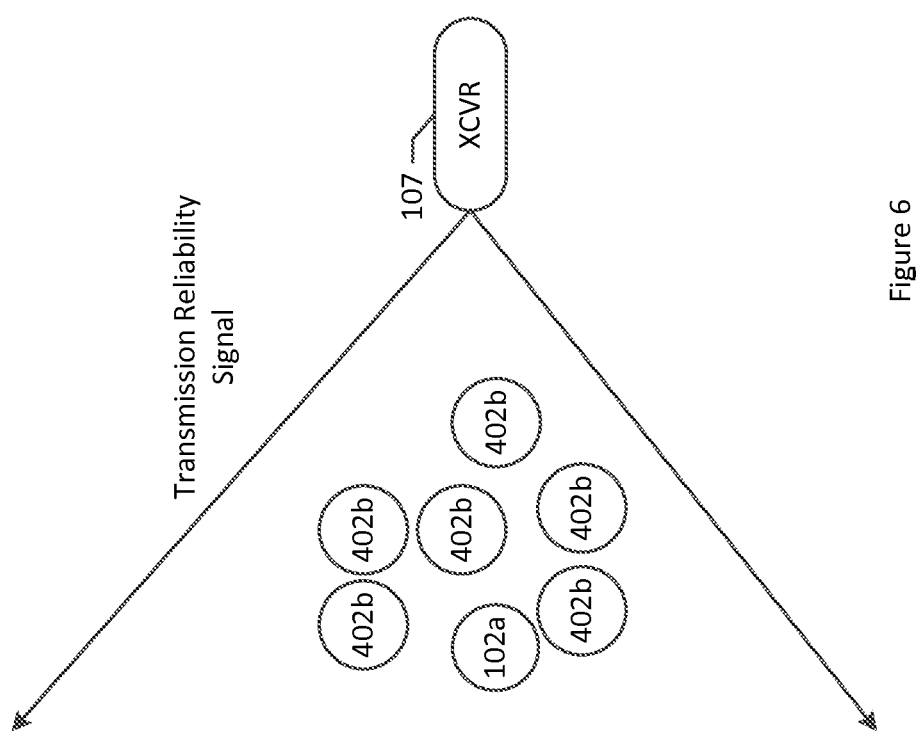

METHOD, APPARATUS, AND COMPUTER PROGRAM PRODUCT IMPROVING REAL TIME LOCATION SYSTEMS WITH MULTIPLE LOCATION TECHNOLOGIES

CROSS-REFERENCE TO RELATED APPLICATION

This application claims priority from and the benefit of the filing date of U.S. Provisional Patent Application No. 61/831,990 filed Jun. 6, 2013 the contents of which are incorporated by reference in its entirety herein.

This application is a continuation in part of U.S. patent application Ser. No. 13/942,316 filed Jul. 15, 2013, which claims priority from and the benefit of the filing date of U.S. Provisional Patent Application No. 61/831,990 filed Jun. 6, 2013 the contents of which are incorporated by reference in its entirety herein.

FIELD

Embodiments discussed herein are related to radio frequency locating and, more particularly, to systems, methods, apparatus, computer readable media for improving real time location systems (RTLS) with multiple location technologies.

BACKGROUND

A number of deficiencies and problems associated with RTLS locating are identified herein. Through applied effort, ingenuity, and innovation, exemplary solutions to many of these identified problems are embodied by the present invention, which is described in detail below.

BRIEF SUMMARY

Systems, methods, apparatus, and computer readable media are disclosed for improving real time location systems (RTLS) with multiple location technologies. In an embodiment a method is provided including receiving, at a mesh node, first proximity data or first position data from a origin node; and transmitting from the mesh node; a signal configured to cause the transmission of blink data from a location tag and the first proximity data or the first position data received from the origin node. In an example embodiment, the method also includes transmitting, from the mesh node, second proximity data or second position data, In an example embodiment the method also includes receiving, at the mesh node, a distress signal from the origin node, and transmitting the first proximity or the first position data received from the origin node based on receiving the distress signal. In an example embodiment the method also includes determining, at the mesh node, if a message count generated based on the first proximity data or the first position data satisfies a predetermined threshold; the transmitting the first proximity data or the first position data is based on the message count determination. In an example embodiment of the method the message count is determined based on a data transmit number. In an example embodiment the message count comprises a time count.

In an example embodiment the method also includes receiving, at the mesh node, a message route; determining if the mesh node is designated in the message route. The transmitting the first proximity data or the first position data is based on determining the mesh node is designated in the message route. In an example embodiment of the method receiving first proximity data or first position data is through a mesh network. In an example embodiment of the method receiving of the first proximity data has a predetermined radius.

In an example embodiment of the method proximity data is based on Bluetooth low energy transmissions. In an example embodiment of the method proximity data is based on Wi-Fi received signal strength index. In an example embodiment of the method the proximity data is based on radio frequency identification. In an example embodiment of the method the position data is based on global positioning. In an example embodiment of the method the position data is based on radio frequency identification.

In an embodiment a method is provided including determining, using a processor, receipt of a transmission reliability signal; and transmitting proximity data or position data based on the determination of receipt of the transmission reliability signal. In an example embodiment the method also includes transmitting a distress signal based on the determination of receipt of the transmission reliability signal. In an example embodiment the method also includes transmitting a signal configured to cause the transmission of blink data from a location tag based on the determination of receipt of the transmission reliability signal.

In an example embodiment of the method the signal configured to cause the transmission of blink data is further configured to cause altering of the location tag blink rate. In an example embodiment of the method the proximity data is associated with a predetermined radius. In an example embodiment of the method transmitting proximity or position data is through a mesh network. In an example embodiment of the method proximity data is based on Bluetooth low energy transmissions.

In an example embodiment of the method the proximity data is based on Wi-Fi received signal strength index. In an example embodiment of the method the proximity data is based on radio frequency identification. In an example embodiment of the method the position data is based on global positioning. In an example embodiment of the method the position data is based on radio frequency identification.

In an embodiment a method is provided including receiving blink data from a location tag associated with a first sensor; receiving proximity data generated based on communications between the first sensor and a second sensor, wherein the proximity data comprises an identifier; calculating, using a processor, location data associated with the location tag based on the blink data; and determining sensor position calculation data associated with the first sensor based on the proximity data.

In an example embodiment of the method the sensor position calculation data associated with the first sensor is based on a predetermined transmit radius associated with the second sensor. In an example embodiment the method also includes assigning a first priority to the location data and a second priority to the sensor position calculation data; and determining a highest priority location data or sensor position calculation data available. In an example embodiment the method also includes causing the highest priority location data or sensor position calculation data to be displayed on a graphic user interface. In an example embodiment the method also includes causing the highest priority location data or sensor position calculation data to be stored in a memory.

In an example embodiment of the method, the sensor position calculation data is further based on location data. In an example embodiment the method also includes determining sensor position calculation data associated with the second sensor based on previous location data associated with either the location tag or a second location tag. In an example embodiment of the method, the determining sensor position calculation data associated with the second sensor is further based on the sensor position calculation data associated with the first tag.

In an example embodiment the method also includes validating the location data based on the sensor position calculation data. In an example embodiment the method also includes determining a message route based on: location data of a plurality of location tags associated with the sensors, or sensor position calculation data of a plurality of sensors; and transmitting the message route in a monitored area.

In an embodiment a method is provided including receiving blink data generated by a location tag associated with a first sensor; receiving position data generated by the first sensor, the position data includes a sensor identifier; calculating, using a processor, location data associated with the location tag based on the blink data; and determining sensor position calculation data associated with the first sensor. In an example embodiment the method also includes determining sensor position calculation data associated with a first sensor based on previous location data associated with either the location tag. In an example embodiment, the method includes receiving, form the first sensor position data associated with a second sensor, the position data associated with the second sensor is based on communication between the first sensor and the second sensor, and determining sensor position calculation data associated with the second sensor based on the sensor position calculation data associated with the first tag.

In an example embodiment the method also includes assigning a first priority to the location data and a second priority to the sensor position calculation data; and determining a highest available priority location data or sensor position calculation data available. In an example embodiment the method also includes causing the highest available priority location data or sensor position calculation data to be displayed on a graphic user interface. In an example embodiment the method also includes causing the highest available priority location data or sensor position calculation data to be stored in a memory. In an example embodiment the method also includes validating the location data based on the sensor position calculation associated with the first sensor. In an example embodiment the method also includes determining a message route based on: location data of a plurality of location tags or sensor position calculation data of a plurality of sensors; and transmitting the message route in a monitored area.

In an example embodiment a method is provided including calculating, using a processor, location data based on blink data received from a location tag, determining sensor position calculation data based on position data or proximity data received from a sensor associated with the location tag, and determining an over-determined location based on the location data, the sensor position calculation data, and a location hierarchy. In an example embodiment of the method, the location hierarchy comprises location data and sensor position calculation data based on proximity data associated with the location data, global positioning, or proximity data associated with a sensor.

In some embodiments of the method, the determining the over-determined location is based on a location hierarchy containing at least two location data or sensor position calculation data. In further example embodiments of the method the determining the over-determined location is based on a location hierarchy comprising at least three location data or sensor position calculation data. In an example embodiment of the method, the determining the over-determined location is based on a location hierarchy comprising at least four location data or sensor position calculation data.

In an example embodiment, the method also includes causing the over-determined location to be displayed on a user interface. In some example embodiments of the method, causing the over-determined location to be stored in a memory.

In a further example embodiment a method is provided including calculating, using a processor, location data based on blink data received from a location tag, determining a sensor position calculation data based on position data or proximity data received from a sensor associated with the location tag, and determining an over-determined location based on the location data, the sensor position calculation data, a first monitoring area location hierarchy, and a second monitored area location hierarchy.

In an example embodiment of the method, the location hierarchy for the first or second monitored area comprises location data and sensor position calculation data based on proximity data associated with the location data, global positioning, or proximity data associated with a sensor. In some example embodiments of the method, the determining the over-determined location is based on a location hierarchy containing at least two location data or sensor position calculation data. In further example embodiments of the method, the determining the over-determined location is based on a location hierarchy comprising at least three location data or sensor position calculation data.

In an example embodiment of the method, the determining the over-determined location is based on a location hierarchy comprising at least four location data or sensor position calculation data. In some example embodiments, the method also includes causing the over-determined location to be displayed on a user interface. In another example embodiment, the method also includes, causing at least the highest priority location or sensor position calculation data available to be stored in a memory.

In an example embodiment an apparatus is provided including at least one processor and at least one memory including computer program code, the at least one memory and computer program code configured to, with the processor, cause the apparatus to receive, at a mesh node, first proximity data or first position data from an origin node; transmit from the mesh node: data signal configured to cause the transmission of blink data from a location tag; and the first proximity data or the first position data received from the origin node. In an example embodiment, he at least one memory and computer program code may be further configured to, with the processor, cause the apparatus to transmit from the mesh node second proximity data or second position data.

The at least one memory and computer program code may be further configured to, with the processor, cause the apparatus to receive, at the mesh node, a distress signal from the origin node, and transmit the first proximity or the first position data received from the origin node based on receiving the distress signal.

The at least one memory and computer program code may be further configured to, with the processor, cause the apparatus to determine, at the mesh node, if a message count generated based on the first proximity data or the first position data satisfies a predetermined threshold; and the transmitting the first proximity data or the first position data is based on the message count determination. In an example embodiment of the apparatus the message count is determined based on a data transmit number. In an example embodiment of the apparatus the message count comprises a time count.

The at least one memory and computer program code may be further configured to, with the processor, cause the apparatus to receive, at the mesh node, a message route; determine if the mesh node is designated in the message route; and wherein the transmitting the first proximity data or the first position data is based on determining the mesh node is designated in the message route. In an example embodiment of the apparatus the receiving the first proximity data or first position data is through a mesh network. In an example embodiment of the apparatus the receiving of the proximity data has a predetermined radius. In an example embodiment of the apparatus the proximity data is based on Bluetooth low energy transmissions.

In an example embodiment of the apparatus the proximity data is based on Wi-Fi received signal strength index. In an example embodiment of the apparatus the proximity data is based on radio frequency identification. In an example embodiment of the apparatus the position data is based on global positioning. In an example embodiment of the apparatus the position data is based on radio frequency identification.

In an example embodiment an apparatus is provided including at least one processor and at least one memory including computer program code, the at least one memory and computer program code configured to, with the processor, cause the apparatus to determine receipt of a transmission reliability signal; and transmit proximity data or position data based on the determination of receipt of the transmission reliability signal. The at least one memory and computer program code may be further configured to, with the processor, cause the apparatus to transmit a distress signal based on the determination of receipt of the transmission reliability signal.

The at least one memory and computer program code may be further configured to, with the processor, cause the apparatus to transmit a signal configured to cause the transmission of blink data from a location tag based on the determination of receipt of the transmission reliability signal. In an example embodiment of the apparatus the signal configured to cause the transmission of blink data is further configured to cause altering of the location tag blink rate based on the determination of receipt of the transmission reliability signal. In an example embodiment of the apparatus the proximity data is associated with a predetermined radius. In an example embodiment of the apparatus the transmitting the proximity or position data is through a mesh network.

In an example embodiment of the apparatus the proximity data is based on Bluetooth low energy transmissions. In an example embodiment of the apparatus the proximity data is based on Wi-Fi received signal strength index. In an example embodiment of the apparatus the proximity data is based on radio frequency identification. In an example embodiment of the apparatus the position data is based on global positioning. In an example embodiment of the apparatus the position data is based on radio frequency identification.

In an example embodiment an apparatus is provided including at least one processor and at least one memory including computer program code, the at least one memory and computer program code configured to, with the processor, cause the apparatus to receive blink data from a location tag associated with a first sensor; receive proximity data generated based on communications between the first sensor and a second sensor, the proximity data comprises an identifier; calculate location data associated with the location tag based on the blink data; and determine sensor position calculation data associated with the first sensor based on the proximity data.

In an example embodiment of the apparatus the sensor position calculation data associated with the first sensor is based on a predetermined transmit radius associated with the second sensor. The at least one memory and computer program code may be further configured to, with the processor, cause the apparatus to assign a first priority to the location data and a second priority to the sensor position calculation data; and determine a highest priority location data or sensor position calculation data available. The at least one memory and computer program code may be further configured to, with the processor, cause the apparatus to cause the highest priority location data or sensor position calculation data to be displayed on a graphic user interface. The at least one memory and computer program code may be further configured to, with the processor, cause the apparatus to cause the highest priority location data or sensor position calculation data to be stored in a memory. In an example embodiment of the apparatus, the sensor position calculation data is further based on the location data.

The at least one memory and computer program code may be further configured to, with the processor, cause the apparatus to determine sensor position calculation data associated with the second sensor based on previous location data associated with either the location tag or a second location tag. In an example embodiment of the apparatus the determining sensor position calculation data associated with the second sensor is further based on the sensor position calculation data associated with the first sensor. The at least one memory and computer program code may be further configured to, with the processor, cause the apparatus to validate location data based on the sensor position calculation data. The at least one memory and computer program code may be further configured to, with the processor, cause the apparatus to determine a message route based on: the location data of a plurality of location tags associated with sensors, or sensor position calculation data of a plurality of sensors; and transmit the message route in a monitored area.

In an example embodiment an apparatus is provided including at least one processor and at least one memory including computer program code, the at least one memory and computer program code configured to, with the processor, cause the apparatus to receive blink data generated by a location tag associated with a first sensor; receive position data generated by the first sensor, wherein the position data comprises a sensor identifier; calculate location data associated with the location tag based on the blink data; and determine sensor position calculation data associated with the first sensor based on the position data.

The at least one memory and computer program code may be further configured to, with the processor, cause the apparatus to determine sensor position calculation data associated with a sensor based on previous location data associated with either the location tag. In an example embodiment of the apparatus, the at least one memory and computer program code may be further configured to, with the processor, cause the apparatus to receive position data associated with a second sensor from a first sensor, wherein the position data associated with the second sensor is based on the communication between the first sensor and the second sensor, and determine sensor position calculation data associated with the second sensor based on the sensor position calculation data associated with the first sensor. The at least one memory and computer program code may be further configured to, with the processor, cause the apparatus to assign a first priority to the location data and a second priority to the sensor position calculation data; and determine a highest available priority location data or sensor position calculation data available. The at least one memory and computer program code may be further configured to, with the processor, cause the apparatus to cause the highest available priority location data or sensor position calculation data to be displayed on a graphic user interface. The at least one memory and computer program code may be further configured to, with the processor, cause the apparatus to cause the highest available priority location data or sensor position calculation data to be stored in a memory.

The at least one memory and computer program code may be further configured to, with the processor, cause the apparatus to validate location data based on the sensor position calculation data associated with the first sensor. The at least one memory and computer program code may be further configured to, with the processor, cause the apparatus to determine a message route based on calculated location data of a plurality of location tags associated with sensors or determined sensor position calculation data of a plurality of sensors; and transmit the message route in a monitored area.

In an example embodiment an apparatus is provided including at least one processor and at least one memory including computer program code, the at least one memory and computer program code configured to, with the processor, cause the apparatus to calculate location data based on blink data received from a location tag, determine sensor position calculation data based on position data or proximity data received from a sensor associated with the location tag, and determine an over-determined location based on the location data, the sensor position calculation data, and a location hierarchy. In an example embodiment of the method, the location hierarchy comprises location data, sensor position calculation data based on proximity data associated with the location data, global positioning or proximity data associated with a sensor.

In some embodiments of the apparatus, the determining the over-determined location is based on a location hierarchy containing at least two location data or sensor position calculation data. In further example embodiments of the apparatus the determining the over-determined location is based on a location hierarchy comprising at least three location data or sensor position calculation data. In an example embodiment of the apparatus, the determining the over-determined location is based on a location hierarchy comprising at least four location data or sensor position calculation data.

The at least one memory and computer program code may be further configured to, with the processor, cause the apparatus to cause the over-determined location to be displayed on a user interface. The at least one memory and computer program code may be further configured to, with the processor, cause the apparatus to cause the over-determined location to be stored in a memory.

In an example embodiment an apparatus is provided including at least one processor and at least one memory including computer program code, the at least one memory and computer program code configured to, with the processor, cause the apparatus to calculate location data based on blink data received from a location tag, determine a sensor position calculation data based on position data or proximity data received from a sensor associated with the location tag, and determine an over-determined location based on the location data, the sensor position calculation data, a first monitoring area location hierarchy, and a second monitored area location hierarchy.

In an example embodiment of the apparatus, the location hierarchy for the first or second monitored area comprises location data, sensor position calculation data based on proximity data associated with the location data, global positioning, or proximity data associated with a sensor. In some example embodiments of the apparatus, the determining the over-determined location is based on a location hierarchy containing at least two location data or sensor position calculation data. In further example embodiments of the apparatus, the determining the over-determined location is based on a location hierarchy comprising at least three location data or sensor position calculation data.

In an example embodiment of the apparatus, the determining the over-determined location is based on a location hierarchy comprising at least four location data or sensor position calculation data. The at least one memory and computer program code may be further configured to, with the processor, cause the apparatus to cause the over-determined location to be displayed on a user interface. The at least one memory and computer program code may be further configured to, with the processor, cause the apparatus to cause the over-determined location to be stored in a memory.

In an example embodiment a computer program product is provided including a non-transitory computer readable medium having program code portions stored thereon, the program code portions configured, upon execution to receive, at a mesh node, first proximity data or first position data from a origin node; transmit from the mesh node: a signal configured to cause the transmission of blink data from a location tag; and the first proximity data or the first position data received from the origin tag. The program code portions may be further configured, upon execution to transmit from the mesh node second proximity data or second position data. The program code portions may be further configured, upon execution, to receive, at the mesh node, a distress signal from the origin node, and transmit the first proximity or the first position data received from the origin node based on receiving the distress signal.

The program code portions may be further configured, upon execution, to determine, at the mesh node, if a message count generated based on the first proximity data or the first position data satisfies a predetermined threshold; and wherein the transmitting the first proximity or the first position data is based on the message count determination. In an example embodiment of the computer program product the message count is determined based on a data transmit number. In an example embodiment of the computer program product the message count comprises a time count.

The program code portions may be further configured, upon execution, to receive, at the mesh node, a message route; determine if the mesh node is designated in the message route. The transmitting the first proximity data or the first position data is based on determining the mesh node is designated in the message route. In an example embodiment of the computer program product the receiving the first proximity data or first position data is through a mesh network. In an example embodiment of the computer program product the receiving of the first proximity data has a predetermined radius.

In an example embodiment of the computer program product the proximity data is based on Bluetooth low energy transmissions. In an example embodiment of the computer program product the proximity data is based on Wi-Fi received signal strength index. In an example embodiment of the computer program product the proximity data is based on radio frequency identification. In an example embodiment of the computer program product the position data is based on global positioning. In an example embodiment of the computer program product the position data is based on radio frequency identification.

In an example embodiment a computer program product is provided including a non-transitory computer readable medium having program code portions stored thereon, the program code portions configured, upon execution to determine receipt of a transmission reliability signal; and transmit proximity data or position data based on the determination of receipt of the transmission reliability signal. The program code portions may be further configured, upon execution, to transmit a distress signal based on the determination of receipt of the transmission reliability signal. The program code portions may be further configured, upon execution, to transmit a signal configured to cause the transmission of blink data from a location tag based on the determination of receipt of the transmission reliability signal. In an example embodiment of the computer program product the signal configured to cause the transmission of blink data is further configured to cause the altering of the location tag blink rate.

In an example embodiment of the computer program product the transmitting of proximity data has a predetermined radius. In an example embodiment of the computer program product the transmitting the proximity or position data is through a mesh network. In an example embodiment of the computer program product the proximity data is based on Bluetooth low energy transmissions. In an example embodiment of the computer program product the proximity data is based on Wi-Fi received signal strength index. In an example embodiment of the computer program product the proximity data is based on radio frequency identification. In an example embodiment of the computer program product the position data is based on global positioning. In an example embodiment of the computer program product the position data is based on radio frequency identification.

In an example embodiment a computer program product is provided including a non-transitory computer readable medium having program code portions stored thereon, the program code portions configured, upon execution to receive blink from a location tag associated with a first sensor; receive proximity data generated based on communications between the first sensor and a second sensor, wherein the proximity data comprises an identifier; calculate location data associated with the location tag based on the blink data; and determine sensor position calculation data associated with the first sensor based on the proximity data. In an example embodiment of the computer program product the sensor position calculation data associated with the first sensor is based on a predetermined transmit radius associated with the second sensor.

The program code portions may be further configured, upon execution, to assign a first priority to the location data and a second priority to the sensor position calculation data; and determine a highest priority location data or sensor position calculation data available. The program code portions may be further configured, upon execution, to cause the highest priority location data or sensor position calculation data to be displayed on a graphic user interface. The program code portions may be further configured, upon execution, to cause the highest priority location data or sensor position calculation data to be stored in a memory. In an example embodiment of the computer program product, the sensor position calculation data is further based on location data.

The program code portions may be further configured, upon execution, to determine sensor position calculation data associated with the second sensor based on previous location data associated with either the location tag or second location tag. In an example embodiment of the computer program product the determining sensor position calculation data associated with the second sensor is further based on the sensor position calculation data associated with the first sensor. The program code portions may be further configured, upon execution, to validate location data based on the sensor position calculation data. The program code portions may be further configured, upon execution, to determine a message route based on the calculated location data of a plurality of location tags associated with sensors or determined sensor position calculation data of a plurality of sensors; and transmit the message route in a monitored area.

In an example embodiment a computer program product is provided including a non-transitory computer readable medium having program code portions stored thereon, the program code portions configured, upon execution to receive blink data generated by a location tag associated with a first sensor; receive position data generated by the first sensor, wherein the position data comprises a sensor identifier; calculate location data associated with the location tag based on the blink data; and determine sensor position calculation data associated with the first sensor based on the position data. The program code portions are further configured, upon execution, to determine sensor position calculation data associated with a sensor based on previous location data associated with the location tag.

In an example embodiment of the computer program product, the program code portions are further configured, upon execution, to receive, from the first sensor, position data associated with a second sensor, wherein the position data associated with the second sensor is based on communication between the first sensor and the second sensor, and determine sensor position calculation data associated with the second sensor based on the sensor position calculation data associated with the first sensor. The program code portions are further configured, upon execution, to assign a first priority to the location data and a second priority to the sensor position calculation data; and determine a highest available priority location data or sensor position calculation data available. The program code portions may be further configured, upon execution, to cause the highest available priority location data or sensor position calculation data to be displayed on a graphic user interface. The program code portions may be further configured, upon execution, to cause the highest available priority location data or sensor position calculation data to be stored in a memory. The program code portions are further configured, upon execution, to validate location data based on the first sensor position calculation data. The program code portions may be further configured, upon execution, to determine a message route based on calculated location data of a plurality of location tags or determined sensor position calculation data of a plurality of sensors; and transmit the message route in a monitored area.

In an example embodiment a computer program product is provided including a non-transitory computer readable medium having program code portions stored thereon, the program code portions configured, upon execution to calculate location data based on blink data received from a location tag, determine sensor position calculation data based on position data or proximity data received from a sensor associated with the location tag, and determine an over-determined location based on the location data, the sensor position calculation data, and a location hierarchy. In an example embodiment of the method, the location hierarchy comprises location data, sensor position calculation data based on proximity data associated with the location data, global positioning, or proximity data associated with a sensor.

In some embodiments of the computer program product, the determining the over-determined location is based on a location hierarchy containing at least two location data or sensor position calculation data. In further example embodiments of the computer program, the determining the over-determined location is based on a location hierarchy comprising at least three location data or sensor position calculation data. In an example embodiment of the computer program product, the determining the over-determined location is based on a location hierarchy comprising at least four location data or sensor position calculation data.

The program code portions may be further configured, upon execution, to cause the over-determined location to be displayed on a user interface. The program code portions may be further configured, upon execution, to cause the apparatus to cause the over-determined location to be stored in a memory.

In an example embodiment a computer program product is provided including a non-transitory computer readable medium having program code portions stored thereon, the program code portions configured, upon execution to calculate location data based on blink data received from a location tag, determine a sensor position calculation data based on position data or proximity data received from a sensor associated with the location tag, and determine an over-determined location based on the location data, the sensor position calculation data, a first monitoring area hierarchy, and a second monitored area hierarchy.

In an example embodiment of the computer program product, the location hierarchy for the first or second monitored area comprises location data, sensor position calculation data based on proximity data associated with the location data, global positioning, or proximity data associated with a sensor. In some example embodiments of the computer program product, the determining the over-determined location is based on a location hierarchy containing at least two location data or sensor position calculation data. In further example embodiments of the computer program product, the determining the over-determined location is based on a location hierarchy comprising at least three location data or sensor position calculation data.

In an example embodiment of the computer program product, the determining the over-determined location is based on a location hierarchy comprising at least four location data or sensor position calculation data. The program code portions may be further configured, upon execution, to cause the computer program product cause the over-determined location to be displayed on a user interface. The program code portions may be further configured, upon execution, to cause the over-determined location to be stored in a memory.

In an example embodiment a method is provided including receiving tag blink data form a location tag associated with a participant, receiving sensor data from a sensor associated with the participant, calculating location data based on the blink data, determining sensor position calculation data based on the sensor data, and determining an object location based on the location data and the sensor data. In an example embodiment of the method, the sensor data is received through a mesh network.

In an example embodiment an apparatus is provided including at least one processor and at least one memory including computer program code, the at least one memory and computer program code configured to, with the processor, cause the apparatus to receive tag blink data form a location tag associated with a participant receive sensor data from a sensor associated with the participant calculate location data based on the blink data determine sensor position calculation data based on the sensor data, and determine an object location based on the location data and the sensor data. In an example embodiment of the apparatus, the sensor data is received through a mesh network.

In an example embodiment a computer program product is provided including a non-transitory computer readable medium having program code portions stored thereon, the program code portions configured, upon execution to receive tag blink data form a location tag associated with a participant receive sensor data from a sensor associated with the participant calculate location data based on the blink data determine sensor position calculation data based on the sensor data and determine an object location based on the location data and the sensor data. In an example embodiment of the computer program product the sensor data is received through a mesh network.

In a further example embodiment a method is provided including receiving a first sensor data from a sensor associated with a participant receiving a second sensor data from a second sensor associated with the participant determining a first sensor position calculation data based on the first sensor data and a second sensor position calculation data based on the second sensor data and determining a participant position based on the first sensor position calculation data and the second sensor position calculation data. In an example embodiment of the method, the sensor data is received through a mesh network.

In yet another example embodiment, an apparatus is provided including at least one processor and at least one memory including computer program code, the at least one memory and computer program code configured to, with the processor, cause the apparatus to receive a first sensor data from a sensor associated with a participant, receive a second sensor data from a second sensor associated with the participant; determine a first sensor position calculation data based on the first sensor data and a second sensor position calculation data based on the second sensor data, and determine a participant position based on the first sensor position calculation data and the second sensor position calculation data. In an example embodiment of the apparatus, the sensor data is received through a mesh network.

In still a further example embodiment, a computer program product is provided including a non-transitory computer readable medium having program code portions stored thereon, the program code portions configured, upon execution to receive a first sensor data from a sensor associated with a participant, receive a second sensor data from a second sensor associated with the participant, determine a first sensor position calculation data based on the first sensor data and a second sensor position calculation data based on the second sensor data, and determine a participant position based on the first sensor position calculation data and the second sensor position calculation data. In an example embodiment of the computer program product, the sensor data is received through a mesh network.

In another example embodiment, a method is provided including receiving blink data from a location tag associated with a participant, receiving sensor data from a sensor associated with the participant, calculating location data based on the blink data, determining sensor position calculation data based on the sensor data, and determining a location of a participant based on the location data when the participant is in a monitored area and determining a position of the participant based on the sensor position calculation data when the participant is outside the monitored area. In an example embodiment of the method, the sensor data is received through a mesh network.

In further example embodiments an apparatus is provided including at least one processor and at least one memory including computer program code, the at least one memory and computer program code configured to, with the processor, cause the apparatus to receive blink data from a location tag associated with a participant, receive sensor data from a sensor associated with the participant, calculate location data based on the blink data, determine sensor position calculation data based on the sensor data, and determine a location of a participant based on the location data when the participant is in a monitored area and determining a position of the participant based on the sensor position calculation data when the participant is outside the monitored area. In an example embodiment of the apparatus, the sensor data is received through a mesh network.

In still further example embodiments, a computer program product is provided including a non-transitory computer readable medium having program code portions stored thereon, the program code portions configured, upon execution to receive blink data from a location tag associated with a participant, receive sensor data from a sensor associated with the participant, calculate location data based on the blink data, determine sensor position calculation data based on the sensor data, and determine a location of a participant based on the location data when the participant is in a monitored area and determining a position of the participant based on the sensor position calculation data when the participant is outside the monitored area. In an example embodiment of the computer program product, the sensor data is received through a mesh network.

In an example embodiment a method is provided including receiving a first sensor data from a first sensor and a second sensor data from a second sensor wherein the first sensor and the second sensor are associated with a participant and determining a position of the participant based on the first sensor data when the participant is in a first monitored area and determining the position of the participant based on the second sensor data when the participant is in a second monitored area, wherein the first sensor and second sensor are different position technologies. In some example embodiments of the method, the first sensor or second sensor data is received through a mesh network.

In another example embodiment, an apparatus is provided including at least one processor and at least one memory including computer program code, the at least one memory and computer program code configured to, with the processor, cause the apparatus to receive a first sensor data from a first sensor and a second sensor data from a second sensor wherein the first sensor and the second sensor are associated with a participant and determine a position of the participant based on the first sensor data when the participant is in a first monitored area and determining the position of the participant based on the second sensor data when the participant is in a second monitored area, wherein the first sensor and second sensor are different position technologies. In an example embodiment of the apparatus, the first sensor data or second sensor data is received through a mesh network.

In a further example embodiment, a computer program product is provided including a non-transitory computer readable medium having program code portions stored thereon, the program code portions configured, upon execution to receive a first sensor data from a first sensor and a second sensor data from a second sensor wherein the first sensor and the second sensor are associated with a participant and determine a position of the participant based on the first sensor data when the participant is in a first monitored area and determining the position of the participant based on the second sensor data when the participant is in a second monitored area, wherein the first sensor and second sensor are different position technologies. In an example embodiment of the computer program product, the first sensor data or the second sensor data is received through a mesh network.

In an example embodiment a method is provided including receiving blink data from a location tag at a first blink rate during a first time period, receiving blink data from the location tag at a second blink rate during a second time period, wherein the second blink rate is different from the first blink rate, wherein the second blink rate is indicative of the location tag being within a monitored area, and determining a participant location based at least on the blink data received at the second blink rate.

In other example embodiments, an apparatus is provided including at least one processor and at least one memory including computer program code, the at least one memory and computer program code configured to, with the processor, cause the apparatus to receive blink data from a location tag at a first blink rate during a first time period, receive blink data from the location tag at a second blink rate during a second time period, wherein the second blink rate is different from the first blink rate, wherein the second blink rate is indicative of the location tag being within a monitored area, and determine a participant location based at least on the blink data received at the second blink rate.

In yet another example embodiment, a computer program product is provided including a non-transitory computer readable medium having program code portions stored thereon, the program code portions configured, upon execution to receive blink data from a location tag at a first blink rate during a first time period, receive blink data from the location tag at a second blink rate during a second time period, wherein the second blink rate is different from the first blink rate, wherein the second blink rate is indicative of the location tag being within a monitored area, and determine a participant location based at least on the blink data received at the second blink rate.

In an example embodiment a method is provided including transmitting blink data, from a location tag, at a first blink rate, receiving a transmission reliability signal, and transmitting blink data at a second blink rate in response to receiving the transmission reliability signal. In an example embodiment of the method, the transmitting at a second blink rate based on the receiving the transmission reliability signal and the failure of receipt of the transmission reliability signal causes the location tag to transmit at the first blink rate.

In another example embodiment, an apparatus is provided including at least one processor and at least one memory including computer program code, the at least one memory and computer program code configured to, with the processor, cause the apparatus to transmit blink data, from a location tag, at a first blink rate receive a transmission reliability signal and transmit blink data at a second blink rate in response to receiving the transmission reliability signal. In an example embodiment of the apparatus, the transmitting at a second blink rate based on the receiving the transmission reliability signal and the failure of receipt of the transmission reliability signal causes the location tag to transmit at the first blink rate.

In an example embodiment, a computer program product is provided including a non-transitory computer readable medium having program code portions stored thereon, the program code portions configured, upon execution to transmit blink data, from a location tag, at a first blink rate; receive a transmission reliability signal, and transmit blink data at a second blink rate in response to receiving the transmission reliability signal. In an example embodiment of the computer program product, the transmitting at a second blink rate based on the receiving the transmission reliability signal and the failure of receipt of the transmission reliability signal causes the location tag to transmit at the first blink rate.

In yet another example embodiment, a location system is provided including a transmitter configured to transmit a transmission reliability signal, a location tag configured to transmit blink data, wherein the location tag transmits the blink data at a first blink rate if the transmission reliability signal has been received and transmits the blink data at a second blink rate if the transmission reliability signal is not received, and a receiver hub for receiving the blink data and calculating a tag location based on at least the blink data received at the first blink rate.

In an example embodiment of the location system the transmitter is configured to transmit the transmission reliability signal repeatedly.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 illustrates an exemplary environment equipped with a radio frequency locating system and sensors for determining a participant location or position in accordance with some embodiments of the present invention;

FIGS. 2A-E illustrate some exemplary tags and sensor configurations that may provide information for participant location or position determination in accordance with some embodiments of the present invention;

FIGS. 3A-3F are block diagrams showing the input and output of receivers and sensor receivers in accordance with some embodiments of the present invention;

FIG. 6 illustrates an exemplary receiver and transmission reliability signal path in accordance with some example embodiments of the present invention;

Figure 8A:
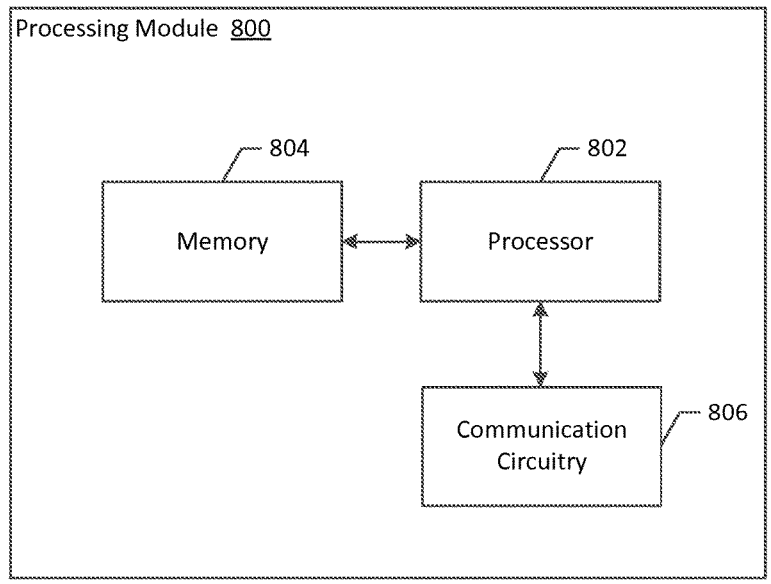
Figure 8B:
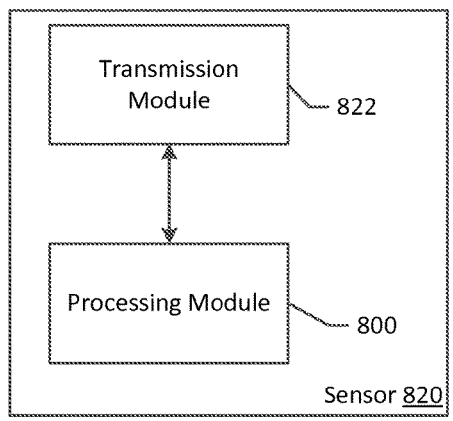
Figure 8C:
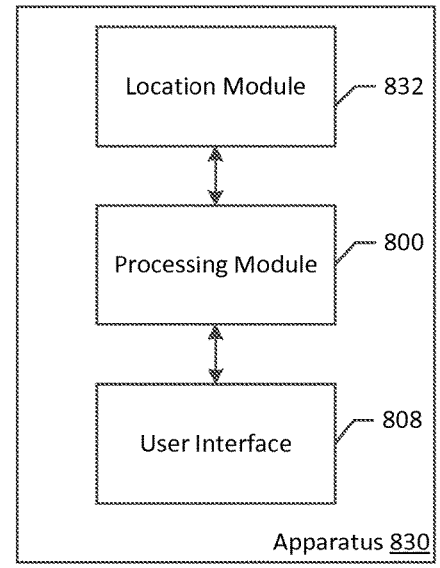
Figure 9:
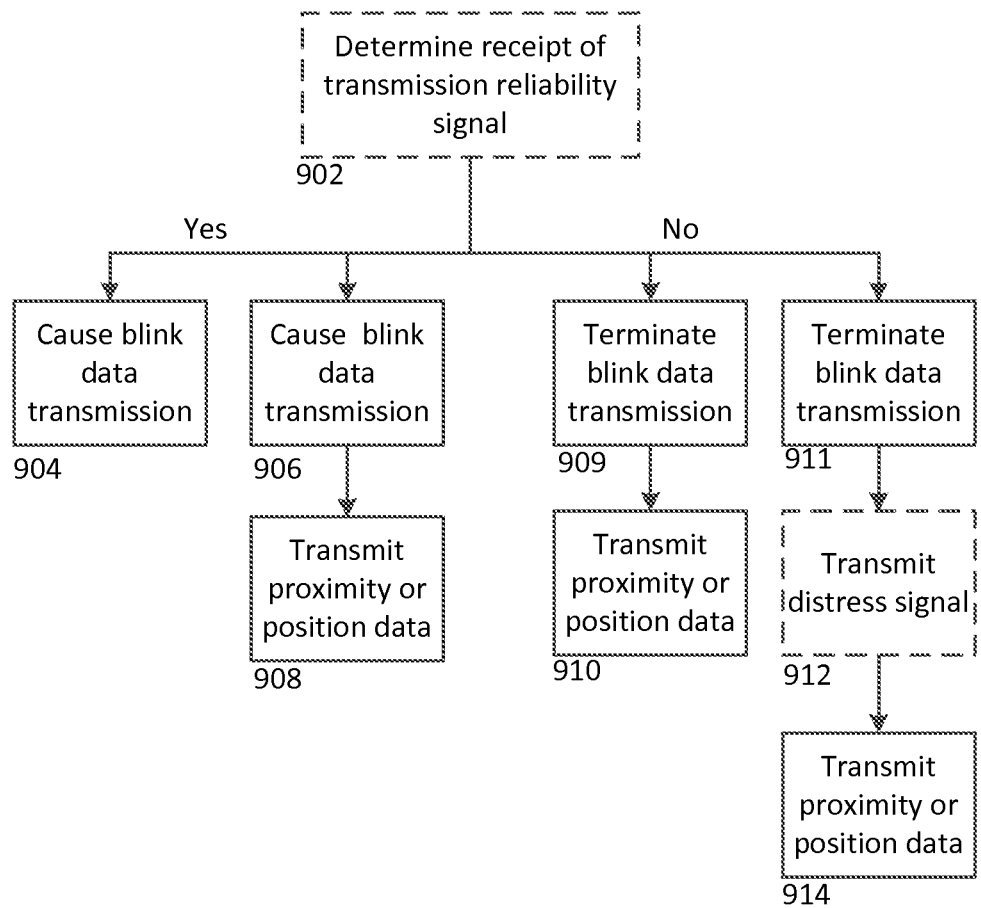
Figure 10:
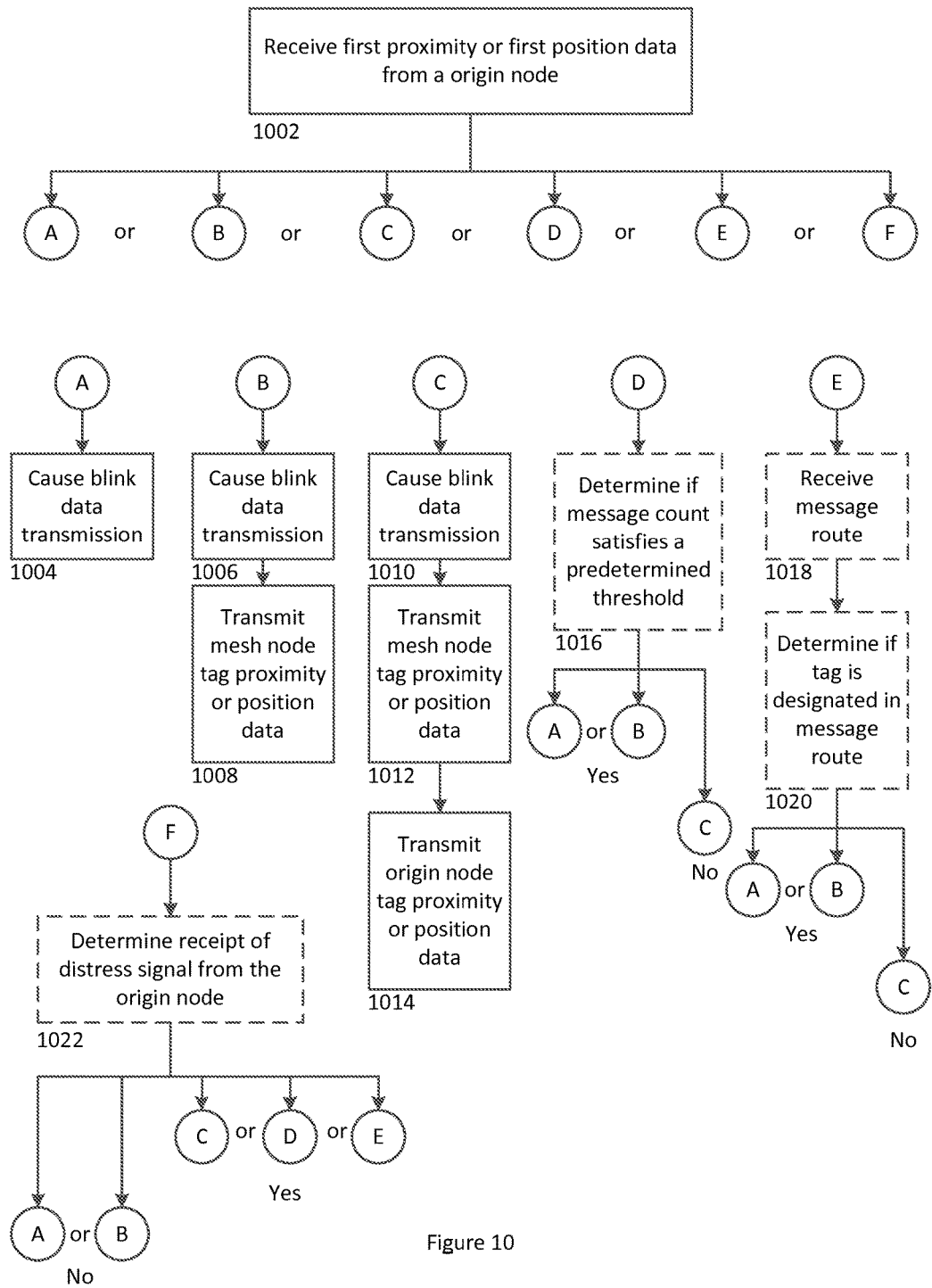
Figure 11:
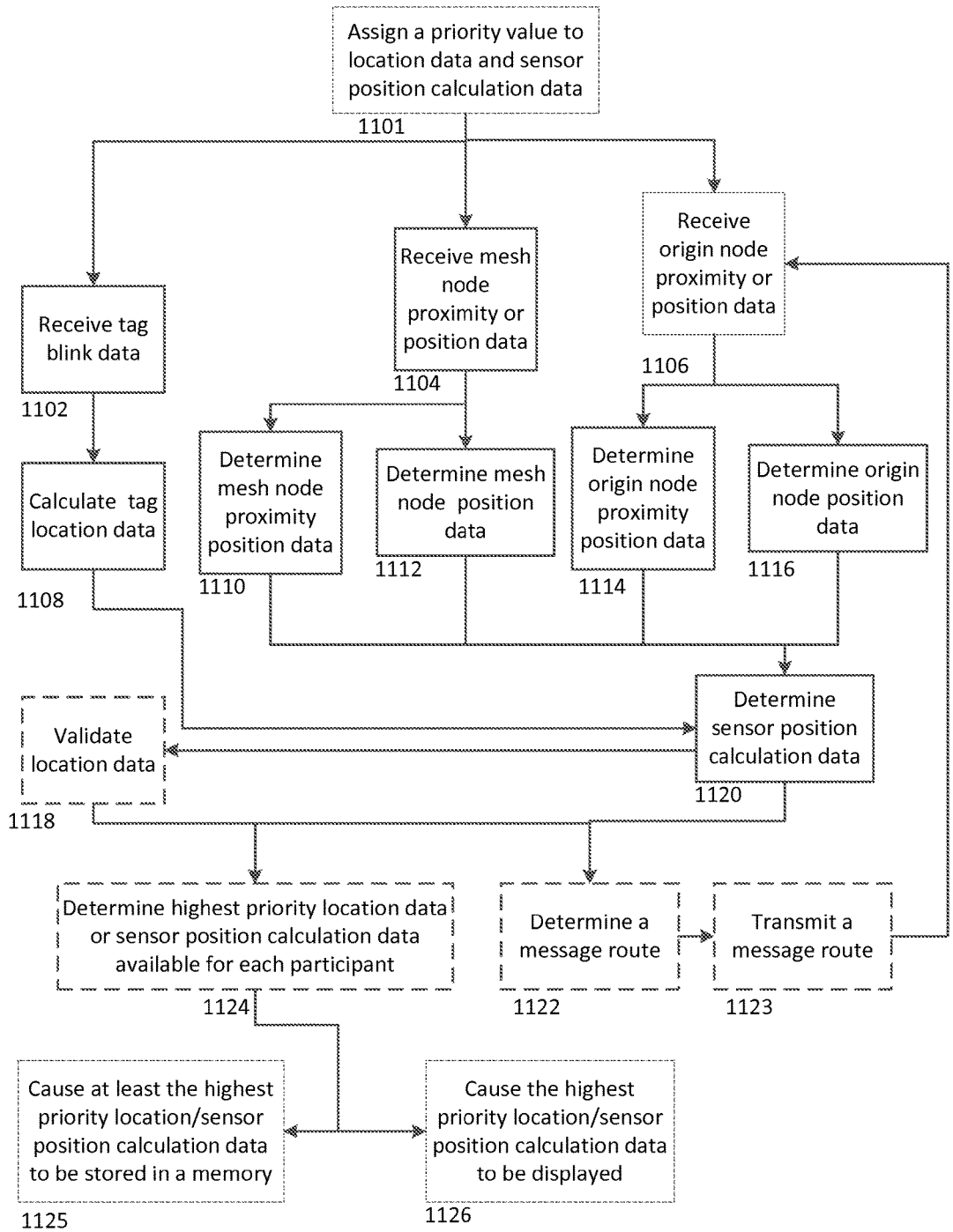

FIG. 8A-C illustrate an exemplary block diagram of processing components of the location system in accordance with some example embodiments of the present invention; and FIG. 9 illustrates a flowchart of an exemplary process for determining transmissions from a sensor in accordance with some example embodiments of the present invention;

FIG. 10 illustrates a flowchart of an exemplary process for determining transmissions from a mesh node in accordance with some example embodiments of the present invention; and FIG. 11 illustrates a flowchart of an exemplary over-determined location determination process in accordance with some example embodiments of the present invention.

DETAILED DESCRIPTION

The present invention now will be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Preliminary Definitions

A "tag", "location tag", or "locate tag" refers to an ultra-wide band (UWB) transmitter that transmits a signal comprising a burst (e.g., 72 pulses at a burst rate of 1 Mb/s), and optionally, a burst having a tag data packet that may include tag data elements that may include, but are not limited to, a tag unique identification number (tag UID), other identification information, a sequential burst count, stored tag data, or other desired information for object or personnel identification, inventory control, etc. Transmitted tag signals are referred to herein as "blink data".

A "sensor" refers to any device that may collect and/or transmit data other than blink data. Such devices may include, without limitation, position triangulation devices such as global positioning systems (GPS), proximity detectors, accelerometers, magnetometers, time-of-flight sensors, health monitoring sensors (e.g., blood pressure sensors, heart monitors, respiration sensors, moisture sensors, temperature sensors), light sensors, or the like.

Tags and sensors may be separate units or may be housed in a single monitoring unit. In some instances, the tag is configured to be in data communication with a sensor. Further, a tag may be configured to be in communication with a short range low frequency receiver. Tags and sensors may be associated with each other based on proximate mounting location on a participant or by a tag-sensor correlator, which is discussed in detail below. Additionally or alternatively, tags and sensors may be associated in a database, perhaps during a registration step, by a receiver hub or receiving processing and distribution system.

A "mesh network" refers to a network of sensors where each sensor in the network is configured to not only transmit its own sensor data but also to relay sensor data of other sensors. Mesh networks may transmit sensor data through Wi-Fi protocols such as IEEE 802.11, 802.15 or 802.16, Bluetooth low energy (BLE) protocols, near field communication (NFC) protocols, or the like.

An "origin node" refers to a sensor, associated with a specific tag, which is the origin point of a sensor data transmission in a mesh network.

A "mesh node" is a sensor, associated with a specific tag, which receives and/or transmits sensor or tag data from an origin node in a mesh network. Depending on its status and transmission payload, a sensor may shift between being deemed as an origin node, mesh node or both.

The term "location data" or "locate data" refers to a location determined by the location system based on blink data transmissions received from a location tag by receivers.

The term "position data" refers to data received from sensors that may be used to determine a sensor position calculation data or position of a sensor, which is not based on location tag blink data transmissions. Examples may include triangulation positioning data, such as global positioning, telemetry data, or the like.

The term "proximity data" refers to data which includes a sensed identity within a specified range or radius of the sensor. The sensed identity may be a fixed location or a mobile identity, such as another participant.

The term "over-determined location" refers to a calculated location or position for a tag, sensor, or combination thereof, wherein two or more location technologies are used to provide redundancy and/or validation for the calculated location or position. In some embodiments, the over-determined location may be determined or selected from one or more positions or locations based on a location hierarchy.

Overview

Some location systems may suffer from degradation or losses of location data due to reliance on a single location technology. These losses may be due to blockages or interference with location tag signals. For example, a tag may move out of range of the receiver network, may be mounted to a player at the bottom of a pile in football, in a scrum in rugby, or an individual positioned in close proximity to another individual or other RF limiting body.

Various embodiments of the locate systems discussed herein may increase the accuracy and prevent degradation or loss of location or position data of an object or participant by utilizing a diverse or over-determined locate system. An over-determined locate system may include multiple location technologies including without limitation, ultra wide band (UWB), position triangulation, such as global positioning system (GPS), proximity or triangulation positioning, such as Wi-Fi, BLE, or NFC, or the like.

In one embodiment, the over-determined locate system may use two or more of the location technologies to provide redundancy and/or validation cross checks of the location data, therefore, allowing the locate system to support a hierarchy of performance accuracy. For example, a location hierarchy may be generated with a UWB based locate deemed the highest priority, while proximity to a UWB device may be deemed a second priority, and a triangulation based position calculation, such as GPS, may be deemed a third priority. The location system may determine and display and/or store the over-determined location or highest accuracy/priority location or sensor position calculation data available. Further, the location system may filter or validate location data or sensor position calculation data by comparing the various location and sensor position calculation data values to each other and/or previously received data.

Tag locate technologies that use a line of sight signal between the locate tag and one or more receivers may produce degraded tag locate data if the tag loses line of sight communication with the one or more receivers because of blockage (e.g., a pile up of tagged players in football). In an instance when the tag cannot be seen by one or more receivers, the associated sensor or origin node may transmit position data and/or proximity data to another sensor or mesh node. The sensors may transmit position or proximity data through Bluetooth Low Energy (BLE), NFC, Wi-Fi, or the like. The sensor associated with the tag may have a specified limited transmission range.

In an example embodiment, proximity or position data may be transmitted to a transceiver using a mesh network routing protocol, wherein the origin node transmits the proximity data and/or the position data to a mesh node. The mesh node then transmits to another mesh node until the message comprising proximity data and position data reaches a receiver. In some example embodiments, a message count is used to limit the time or duration of transmission or relaying of the tag message. The message count may be a transmission count (e.g., number of time the message has been transmitted from one tag to another tag), a time count, or other of the like. In an example embodiment, a directional long range receiver antenna may be used to pull BLE messages directly from a mesh node without relying on a mesh network.

In one example embodiment, the location system includes a transmitter, the transmitter being configured to send a transmission reliability signal to sensors within the monitored area. In an instance in which a sensor receives the transmission reliability signal, it may determine there is not an obstruction or interference to the associated tag, and cause the tag to transmit blink data. In an instance in which the sensor, or in this case origin node does not receive the transmission reliability signal, the sensor may determine that the tag blink data may be obstructed and transmit proximity/position data to a mesh node and/or transmit a distress signal to a mesh node and/or send a signal to the tag to terminate or alter tag blink data. The mesh node may receive and transmit the proximity or position data to a receiver through a mesh network, through a directional antenna backhaul, or the like. In an example embodiment, the mesh node may only transmit origin node position or proximity data based on the receipt of a distress signal, which is described in greater detail below.

In an example embodiment, the over-determined location system may use two or more locate technologies to filter or validate location data that may be blocked, out of range, degraded due to interference, bounced, or the like. The location system may calculate location (based on tag blink data) or position (based on sensor data) based on each of the technologies provided and compare them to validate the calculated location or position. In an instance in which a calculated location may be deemed inaccurate, any associated location data may be deemed as inaccurate and thus dismissed in favor of position data, proximity data, or some combination thereof.

Examples of inaccurate/faulted location data may include tags that appear to disappear from the network (e.g., no blink data received) for a tag blink cycle or several tag blink cycles. Such non-blinking tags may be assumed to be obstructed. Tags may also appear to "pop" or jump to a distant location due to blink data reflections, or other issues.

Some location technologies are less preferred for particular installation environments. For example, UWB based location technologies may not be suitable for large or unbounded monitored environments (e.g., a marathon running course, etc.) due to their reliance on adequate receiver coverage of the monitored environments. In another example, GPS may not be suitable for environments requiring precise position determination (e.g., determining precise, i.e., subfoot, movements of basketball players, football players, or baseball players).

In one embodiment, multiple location technologies may be used to enable location determination in difficult, nonconventional, or even traditional environments where redundant location determination may be desirable. The overdetermined location system may designate two or more monitored areas, each having a location hierarchy. For example, in one embodiment, in race car driving, cars moving around the track area, or first monitored area may be monitored by a GPS based position technology, as the highest priority location technology, as precise subfoot accuracy for car position is not necessary. However, crew members moving about the pit area may be monitored by a UWB location technology, as the highest priority location technology, because precise subfoot accuracy for crew member position may be desired to ensure safety and to monitor crew member efficiency. In some embodiments, the combination of two or more location technologies and delineation of multiple monitoring areas with associated location hierarchies allows the accuracy and coverage range to be specifically designed for the type of location information desired in each area of the monitored event.

In some embodiments, a tag or sensor may receive a signal indicating that it is within or has left the monitored zone of one location technology (e.g., a UWB location technology) and therefore shift transmission type or frequency. For example, in some embodiments, the sensor may be configured to shift to transmit only position data; transmit only proximity, position, and/or cause the transmission of blink data; change its blink rate; or the like. In one embodiment, a tag may receive an indication of the boundary of the monitored area by a signal from an exciter at the transition zone or based on a sensor's receipt of a transmission reliability signal. In another example embodiment, a sensor may transmit position data and cause the transmission of the blink data and the locating system may determine an overdetermined location, which in various embodiments may comprise the highest priority location or position that has been calculated based on accuracy, environment, and information requirements.

The utilization of multiple location technologies may provide a more accurate and reliable location system. Further, the use of multiple location technologies may facilitate tracking locations and positions at varying accuracy levels for differing environments and informational needs.

Example Real Time Locating System

Figure 1:
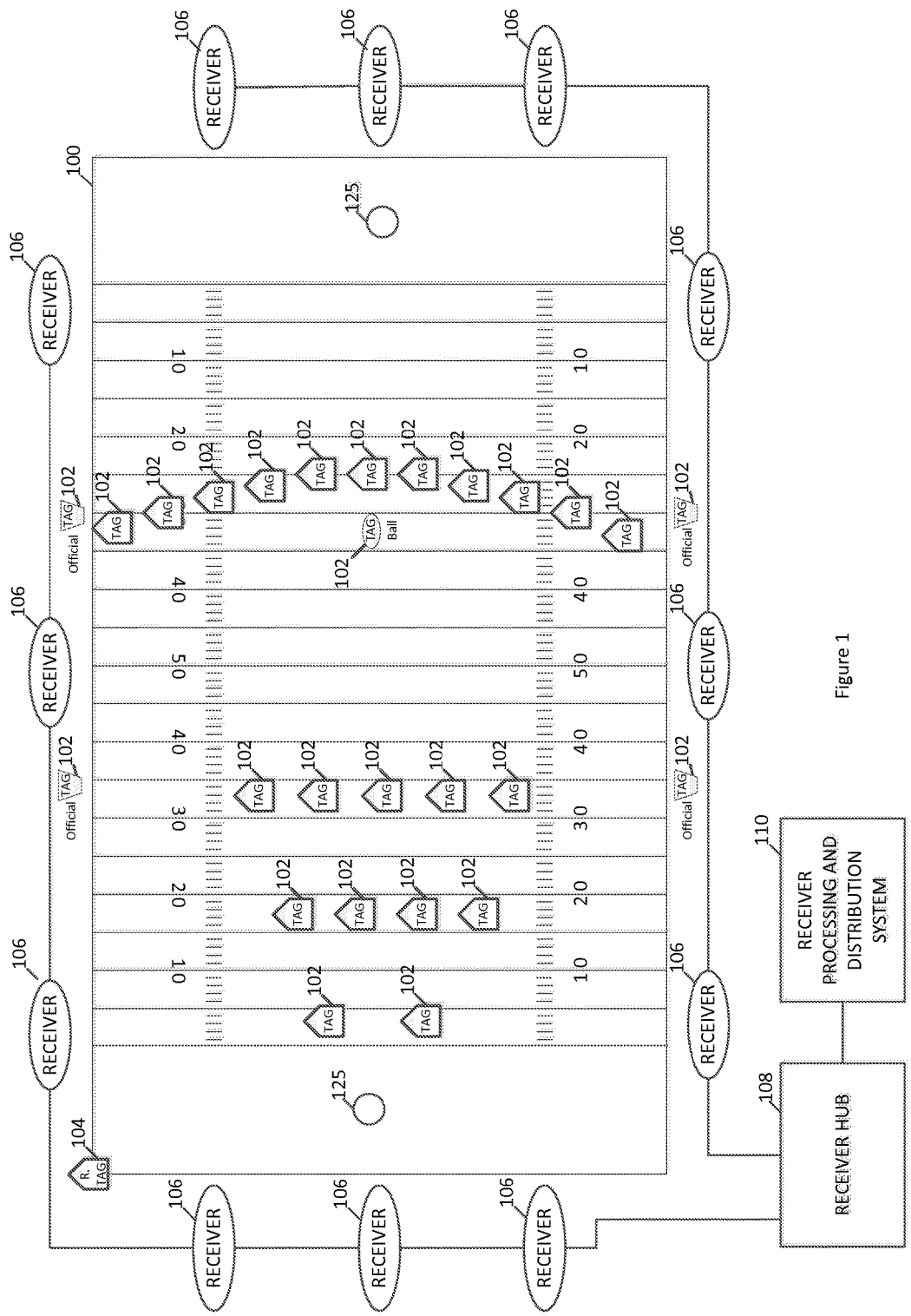

FIG. 1 illustrates an exemplary locating system 100 useful for calculating a location by an accumulation of location data or time of arrivals (TOAs) at a receiver hub 108, whereby the TOAs represent a relative time of flight (TOF) from RTLS tags 102 as recorded at each receiver 106 (e.g., UWB reader, etc.). A timing reference clock is used, in some examples, such that at least a subset of the receivers 106 may be synchronized in frequency, whereby the relative TOA data associated with each of the RTLS tags 102 may be registered by a counter associated with at least a subset of the receivers 106. In some examples, a reference tag 104, preferably a UWB transmitter, positioned at known coordinates, is used to determine a phase offset between the counters associated with at least a subset of the of the receivers 106. The RTLS tags 102 and the reference tags 104 reside in an active RTLS field. The systems described herein may be referred to as either "multilateration" or "geolocation" systems, terms that refer to the process of locating a signal source by solving an error minimization function of a location estimate determined by the difference in time of arrival (DTOA) between TOA signals received at multiple receivers 106.

In some examples, the system comprising at least the tags 102 and the receivers 106 is configured to provide two dimensional and/or three dimensional precision localization (e.g., subfoot resolutions), even in the presence of multipath interference, due in part to the use of short nanosecond duration pulses whose TOF can be accurately determined using detection circuitry, such as in the receivers 106, which can trigger on the leading edge of a received waveform. In some examples, this short pulse characteristic allows necessary data to be conveyed by the system at a higher peak power, but lower average power levels, than a wireless system configured for high data rate communications, yet still operate within local regulatory requirements.

In some examples, to provide a preferred performance level while complying with the overlap of regulatory restrictions (e.g. FCC and ETSI regulations), the tags 102 may operate with an instantaneous −3 dB bandwidth of approximately 400 MHz and an average transmission below 187 pulses in a 1 msec interval, provided that the packet rate is sufficiently low. In such examples, the predicted maximum range of the system, operating with a center frequency of 6.55 GHz, is roughly 200 meters in instances in which a 12 dBi directional antenna is used at the receiver, but the projected range will depend, in other examples, upon receiver antenna gain. Alternatively or additionally, the range of the system allows for one or more tags 102 to be detected with one or more receivers positioned throughout a football stadium used in a professional football context. Such a configuration advantageously satisfies constraints applied by regulatory bodies related to peak and average power densities (e.g., effective isotropic radiated power density ("EIRP")), while still optimizing system performance related to range and interference. In further examples, tag transmissions with a −3 dB bandwidth of approximately 400 MHz yields, in some examples, an instantaneous pulse width of roughly 2 nanoseconds that enables a location resolution to better than 30 centimeters.

Referring again to FIG. 1, the object to be located has an attached tag 102, preferably a tag having a UWB transmitter, that transmits a burst (e.g., multiple pulses at a 1 Mb/s burst rate, such as 112 bits of On-Off keying (OOK) at a rate of 1 Mb/s), and optionally, a burst comprising an information packet utilizing OOK that may include, but is not limited to, ID information, a sequential burst count or other desired information for object or personnel identification, inventory control, etc. In some examples, the sequential burst count (e.g., a packet sequence number) from each tag 102 may be advantageously provided in order to permit, at a receiver hub 108, correlation of TOA measurement data from various receivers 106.

In some examples, the tag 102 may employ UWB waveforms (e.g., low data rate waveforms) to achieve extremely fine resolution because of their extremely short pulse (i.e., sub-nanosecond to nanosecond, such as a 2 nsec (1 nsec up and 1 nsec down)) durations. As such, the information packet may be of a short length (e.g. 112 bits of OOK at a rate of 1 Mb/sec, in some example embodiments), that advantageously enables a higher packet rate. If each information packet is unique, a higher packet rate results in a higher data rate; if each information packet is transmitted repeatedly, the higher packet rate results in a higher packet repetition rate. In some examples, higher packet repetition rate (e.g., 12 Hz) and/or higher data rates (e.g., 1 Mb/sec, 2 Mb/sec or the like) for each tag may result in larger datasets for filtering to achieve a more accurate location estimate. Alternatively or additionally, in some examples, the shorter length of the information packets, in conjunction with other packet rate, data rates and other system requirements, may also result in a longer battery life (e.g., 7 years battery life at a transmission rate of 1 Hz with a 300 mAh cell, in some present embodiments).

Tag signals may be received at a receiver directly from RTLS tags, or may be received after being reflected en route. Reflected signals travel a longer path from the RTLS tag to the receiver than would a direct signal, and are thus received later than the corresponding direct signal. This delay is known as an echo delay or multipath delay. If reflected signals are sufficiently strong enough to be detected by the receiver, they can corrupt a data transmission through inter-symbol interference. In some examples, the tag 102 may employ UWB waveforms to achieve extremely fine resolution because of their extremely short pulse (e.g., 2 nsec) durations. Furthermore, signals may comprise short information packets (e.g., 112 bits of OOK) at a somewhat high burst data rate (1 Mb/sec, in some example embodiments), that advantageously enable packet durations to be brief (e.g. 112 microsec) while allowing inter-pulse times (e.g., 998 nsec) sufficiently longer than expected echo delays, avoiding data corruption.

Reflected signals can be expected to become weaker as delay increases due to more reflections and the longer distances traveled. Thus, beyond some value of inter-pulse time (e.g., 998 nsec), corresponding to some path length difference (e.g., 299.4 m.), there will be no advantage to further increases in inter-pulse time (and, hence lowering of burst data rate) for any given level of transmit power. In this manner, minimization of packet duration allows the battery life of a tag to be maximized, since its digital circuitry need only be active for a brief time. It will be understood that different environments can have different expected echo delays, so that different burst data rates and, hence, packet durations, may be appropriate in different situations depending on the environment.

Minimization of the packet duration also allows a tag to transmit more packets in a given time period, although in practice, regulatory average EIRP limits may often provide an overriding constraint. However, brief packet duration also reduces the likelihood of packets from multiple tags overlapping in time, causing a data collision. Thus, minimal packet duration allows multiple tags to transmit a higher aggregate number of packets per second, allowing for the largest number of tags to be tracked, or a given number of tags to be tracked at the highest rate.

In one non-limiting example, a data packet length of 112 bits (e.g., OOK encoded), transmitted at a data rate of 1 Mb/sec (1 MHz), may be implemented with a transmit tag repetition rate of 1 transmission per second (1 TX/sec). Such an implementation may accommodate a battery life of up to seven years, wherein the battery itself may be, for example, a compact, 3-volt coin cell of the series no. BR2335 (Rayovac), with a battery charge rating of 300 mAhr. An alternate implementation may be a generic compact, 3-volt coin cell, series no. CR2032, with a battery charge rating of 220 mAhr, whereby the latter generic coin cell, as can be appreciated, may provide for a shorter battery life.

Alternatively or additionally, some applications may require higher transmit tag repetition rates to track a dynamic environment. In some examples, the transmit tag repetition rate may be 12 transmissions per second (12 TX/sec). In such applications, it can be further appreciated that the battery life may be shorter.

The high burst data transmission rate (e.g., 1 MHz), coupled with the short data packet length (e.g., 112 bits) and the relatively low repetition rates (e.g., 1 TX/sec), provide for two distinct advantages in some examples: (1) a greater number of tags may transmit independently from the field of tags with a lower collision probability, and/or (2) each independent tag transmit power may be increased, with proper consideration given to a battery life constraint, such that a total energy for a single data packet is less that a regulated average power for a given time interval (e.g., a 1 msec time interval for an FCC regulated transmission).

Alternatively or additionally, additional sensor or telemetry data may be transmitted from the tag to provide the receivers 106 with information about the environment and/or operating conditions of the tag. For example, the tag may transmit a temperature to the receivers 106. Such information may be valuable, for example, in a system involving perishable goods or other refrigerant requirements. In this example embodiment, the temperature may be transmitted by the tag at a lower repetition rate than that of the rest of the data packet. For example, the temperature may be transmitted from the tag to the receivers at a rate of one time per minute (e.g., 1 TX/min.), or in some examples, once every 720 times the data packet is transmitted, whereby the data packet in this example is transmitted at an example rate of 12 TX/sec.

Alternatively or additionally, the tag 102 may be programmed to intermittently transmit data to the receivers 106 in response to a signal from a magnetic command transmitter (not shown). The magnetic command transmitter may be a portable device, functioning to transmit a 125 kHz signal, in some example embodiments, with a range of approximately 15 feet or less, to one or more of the tags 102. In some examples, the tags 102 may be equipped with at least a receiver tuned to the magnetic command transmitter transmit frequency (e.g., 125 kHz) and functional antenna to facilitate reception and decoding of the signal transmitted by the magnetic command transmitter.

In some examples, one or more other tags, such as a reference tag 104, may be positioned within and/or about a monitored region. In some examples, the reference tag 104 may be configured to transmit a signal that is used to measure the relative phase (e.g., the count of free-running counters) of non-resettable counters within the receivers 106.

One or more (e.g., preferably four or more) receivers 106 are also positioned at predetermined coordinates within and/or around the monitored region. In some examples, the receivers 106 may be connected in a "daisy chain" fashion to advantageously allow for a large number of receivers 106 to be interconnected over a significant monitored region in order to reduce and simplify cabling, provide power, and/or the like. Each of the receivers 106 includes a receiver for receiving transmissions, such as UWB transmissions, and preferably, a packet decoding circuit that extracts a time of arrival (TOA) timing pulse train, transmitter ID, packet number, and/or other information that may have been encoded in the tag transmission signal (e.g., material description, personnel information, etc.) and is configured to sense signals transmitted by the tags 102 and one or more reference tags 104.

Each receiver 106 includes a time measuring circuit that measures times of arrival (TOA) of tag bursts, with respect to its internal counter. The time measuring circuit is phase-locked (e.g., phase differences do not change and therefore respective frequencies are identical) with a common digital reference clock signal distributed via cable connection from a receiver hub 108 having a central timing reference clock generator. The reference clock signal establishes a common timing reference for the receivers 106. Thus, multiple time measuring circuits of the respective receivers 106 are synchronized in frequency, but not necessarily in phase. While there typically may be a phase offset between any given pair of receivers in the receivers 106, the phase offset is readily determined through use of a reference tag 104. Alternatively or additionally, each receiver may be synchronized wirelessly via virtual synchronization without a dedicated physical timing channel.

In some example embodiments, the receivers 106 are configured to determine various attributes of the received signal. Since measurements are determined at each receiver 106, in a digital format, rather than analog in some examples, signals are transmittable to the receiver hub 108. Advantageously, because packet data and measurement results can be transferred at high speeds to a receiver memory, the receivers 106 can receive and process tag (and corresponding object) locating signals on a nearly continuous basis. As such, in some examples, the receiver memory allows for a high burst rate of tag events (i.e., information packets) to be captured.

Data cables or wireless transmissions may convey measurement data from the receivers 106 to the receiver hub 108 (e.g., the data cables may enable a transfer speed of 2 Mbps). In some examples, measurement data is transferred to the Central Processor/Hub at regular polling intervals.

As such, the receiver hub 108 determines or otherwise computes tag location (i.e., object location) by processing TOA measurements relative to multiple data packets detected by the receivers 106. In some example embodiments, the receiver hub 108 may be configured to resolve the coordinates of a tag using nonlinear optimization techniques.

In some examples, TOA measurements from multiple receivers 106 are processed by the receiver hub 108 to determine a location of the transmit tag 102 by a differential time-of-arrival (DTOA) analysis of the multiple TOAs. The DTOA analysis includes a determination of tag transmit time $t_0$, whereby a time-of-flight (TOF), measured as the time elapsed from the estimated tag transmit time $t_0$ to the respective TOA, represents graphically the radii of spheres centered at respective receivers 106. The distance between the surfaces of the respective spheres to the estimated location coordinates $(x_0, y_0, z_0)$ of the transmit tag 102 represents the measurement error for each respective TOA, and the minimization of the sum of the squares of the TOA measurement errors from each receiver participating in the DTOA location estimate provides for both the location coordinates $(x_0, y_0, z_0)$ of the transmit tag and of that tag's transmit time $t_0$.

In some examples, the system described herein may be referred to as an "over-specified" or "over-determined" system. As such, the receiver hub 108 may calculate one or more valid (i.e., most correct) locations based on a set of measurements and/or one or more incorrect (i.e., less correct) locations. For example, a location may be calculated that is impossible due to the laws of physics or may be an outlier when compared to other calculated locations. As such one or more algorithms or heuristics may be applied to minimize such error.

The starting point for the minimization may be obtained by first doing an area search on a coarse grid of x, y and z over an area defined by the user and followed by a localized steepest descent search. The starting location for this algorithm is fixed, in some examples, at the mean position of all active receivers. No initial area search is needed, and optimization proceeds through the use of a Davidon-Fletcher-Powell (DFP) quasi-Newton algorithm in some examples. In other examples, a steepest descent algorithm may be used.

One such algorithm for error minimization, which may be referred to as a time error minimization algorithm, may be described in Equation 1:

$$\epsilon = \Sigma_{j=1}^{N}[[(x-x_j)^2+(y-y_j)^2+(z-z_j)^2]^{1/2}-c(t_j-t_0)]^2 \quad (1)$$

Where N is the number of receivers, c is the speed of light, $(x_j, y_j, z_j)$ are the coordinates of the $j^{th}$ receiver, $t_j$ is the arrival time at the $j^{th}$ receiver, and $t_0$ is the tag transmit time. The variable $t_0$ represents the time of transmission. Since $t_0$ is not initially known, the arrival times, $t_j$, as well as $t_0$, are related to a common time base, which in some examples, is derived from the arrival times. As a result, differences between the various arrival times have significance for determining location as well as $t_0$.

The optimization algorithm to minimize the error $\epsilon$ in Equation 1 may be the Davidon-Fletcher-Powell (DFP) quasi-Newton algorithm, for example. In some examples, the optimization algorithm to minimize the error $\epsilon$ in Equation 1 may be a steepest descent algorithm. In each case, the algorithms may be seeded with an initial location estimate (x, y, z) that represents the two-dimensional (2D) or three-dimensional (3D) mean of the positions of the receivers 106 that participate in the tag location determination.

In some examples, the RTLS system comprises a receiver grid, whereby each of the receivers 106 in the receiver grid keeps a receiver clock that is synchronized, with an initially unknown phase offset, to the other receiver clocks. The phase offset between any receivers may be determined by use of a reference tag that is positioned at a known coordinate position $(x_T, y_T, z_T)$. The phase offset serves to resolve the constant offset between counters within the various receivers 106, as described below.

In further example embodiments, a number N of receivers 106 $\{R_j: j=1, \ldots, N\}$ are positioned at known coordinates $(x_{R_j}, y_{R_j}, z_{R_j})$, which are respectively positioned at distances $d_{R_j}$ from a reference tag 104, such as given in Equation 2:

$$d_{R_j} = \sqrt{(x_{R_j}-x_T)^2+(y_{R_j}-y_T)^2+(z_{R_j}-z_T)^2} \quad (2)$$

Each receiver $R_j$ utilizes, for example, a synchronous clock signal derived from a common frequency time base, such as a clock generator. Because the receivers are not synchronously reset, an unknown, but constant offset $O_j$ exists for each receiver's internal free running counter. The value of the constant offset $O_j$ is measured in terms of the number of fine resolution count increments (e.g., a number of nanoseconds for a one nanosecond resolution system).

The reference tag is used, in some examples, to calibrate the radio frequency locating system as follows: The reference tag emits a signal burst at an unknown time $\tau_R$. Upon receiving the signal burst from the reference tag, a count $N_{R_j}$ as measured at receiver $R_j$ is given in Equation 3 by:

$$N_{R_j} = \beta\tau_R + O_j + \beta d_{R_j}/c \quad (3)$$

Where c is the speed of light and $\beta$ is the number of fine resolution count increments per unit time (e.g., one per nanosecond). Similarly, each object tag $T_i$ of each object to be located transmits a signal at an unknown time $\tau_i$ to produce a count $N_{ij}$, as given in Equation 4:

$$N_{ij} = \beta\tau_i + O_j + \beta d_{ij}/c \quad (4)$$

at receiver $R_j$ where $d_{ij}$ the distance between the object tag $T_i$ and the receiver 106 $R_j$. Note that $\tau_i$ is unknown, but has the same constant value for all receivers. Based on the equalities expressed above for receivers $R_j$ and $R_k$ and given the reference tag 104 information, phase offsets expressed as differential count values are determined as given in Equations 5a-b:

$$N_{R_j} - N_{R_k} = (O_j - O_k) + \beta\left(\frac{d_{R_j}}{c} - \frac{d_{R_k}}{c}\right) \quad (5a)$$

Or, $$(O_j - O_k) = (N_{R_j} - N_{R_k}) - \beta\left(\frac{d_{R_j}}{c} - \frac{d_{R_k}}{c}\right) = \Delta_{jk} \quad (5b)$$

Where $\Delta_{jk}$ is constant as long as $d_{R_j} - d_{R_k}$ remains constant, (which means the receivers and reference tag are fixed and there is no multipath situation) and $\beta$ is the same for each receiver. Note that $\Delta_{jk}$ is a known quantity, since $N_{R_j}$, $N_{R_k}$, $\beta$, $d_{R_j}/c$, and $d_{R_k}/c$ are known. That is, the phase offsets between receivers $R_j$ and $R_k$ may be readily determined based on the reference tag 104 transmissions. Thus, again from the above equations, for a tag 102 ($T_i$) transmission arriving at receivers $R_j$ and $R_k$, one may deduce the following Equations 6a-b:

$$N_{i_j} - N_{i_k} = (O_j - O_k) + \beta\left(\frac{d_{i_j}}{c} - \frac{d_{i_k}}{c}\right) = \Delta_{jk} + \beta\left(\frac{d_{i_j}}{c} - \frac{d_{i_k}}{c}\right) \quad (6a)$$

Or, $$d_{i_j} - d_{i_k} = (c/\beta)[N_{i_j} - N_{i_k} - \Delta_{jk}] \quad (6b)$$

Each arrival time, $t_j$, can be referenced to a particular receiver (receiver "1") as given in Equation 7:

$$t_j = \frac{1}{\beta}(N_j - \Delta_{j1}) \quad (7)$$

The minimization, described in Equation 1, may then be performed over variables (x, y, z, $t_0$) to reach a solution (x', y', z', $t_0'$).

In some example embodiments, the location of a tag 102 may then be output to a receiver processing and distribution system 110 for further processing of the location data to advantageously provide visualizations, predictive analytics, statistics and/or the like.

Example Tag/Sensor Positioning and Participant Correlation

FIG. 1 shows a monitored area 100. The monitored area 100 comprises a plurality of positions at one or more time epochs. The plurality of positions may be divided into one or more regions, called zones. Each zone may be described by one or more coordinate systems, such as a local NED (North-East-Down) system, a latitude-longitude system, or even a yard line system as might be used for an American football game. A location is a description of a position, or a plurality of positions, within the monitored area. For example, a field marker at the intersection of the south goal line and west out of bounds line at Bank of America Stadium in Charlotte, N.C. could be described as {0, 0, 0} in a local NED system, or 35.225336 N 80.85273 W longitude 751 ft. altitude on a latitude-longitude system, or simply "Panthers Goal Line" in a yard line system. Because different types of locating systems or different zones within a single locating system may use different coordinate systems, a Geographical Information System (GIS) or similar monitored area database may be used to associate location data. In some embodiments, a Global Coordinate System (such as a latitude-longitude system) could describe a plurality of positions encompassing one or more regions outside the area monitored by the real time location system as well as one or more zones within the monitored area. In such an embodiment, a participant could be tracked via a Location when within the monitored area and via a Coordinate outside the monitored area, or tracked through the use of a Coordinate in either area, as defined by the Geographical Information System.

Example Tag/Sensor Positioning and Participant Correlation

FIGS. 2a-e illustrate some exemplary tag and sensor configurations that may provide information to a location system or over-determined location system in accordance with some embodiments of the present invention. A participant is any person, location or object to which a tag and/or sensor has been attached. FIG. 2a illustrates a participant 202, which is a football player wearing equipment having attached tags 102 in accordance with some embodiments. In particular, the depicted participant 202 is wearing shoulder pads having tags 102 affixed to opposite sides thereof. This positioning advantageously provides an elevated broadcast position for each tag 102 thereby increasing its communication effectiveness. Additional sensors 203 may be attached to equipment worn by participant 202, such as accelerometers, magnetometers, compasses, gyroscopes, time-of-flight sensors, health monitoring sensors (e.g., blood pressure sensors, heart monitors, respiration sensors, moisture sensors, temperature sensors), light sensors, or the like. The additional sensors 204 may be affixed to shoulder pads, the helmet, the shoes, rib pads, elbow pads, the jersey, the pants, a bodysuit undergarment, gloves, arm bands, wristbands, and the like. In some cases, additional sensors may be fastened to or implanted under the player's skin, swallowed, or otherwise be carried internally in the player's body. Sensors 204 may be configured to communicate with receivers (e.g., receivers 106 of FIG. 1) directly or indirectly through tags 102 or other transmitters. For example, in one embodiment, a sensor 203 may be connected, wired (e.g., perhaps through wires sewn into a jersey or bodysuit undergarment) or wirelessly, to tags 102 to provide sensor data to tags 102, which is then transmitted to the receivers 106. In another embodiment, a plurality of sensors (not shown) may be connected to a dedicated antenna or transmitter, perhaps positioned in the helmet, which may transmit sensor data to one or more receivers.

In an example embodiment, an array of tags 102 may be attached to the player, for example on the head, shoulders, wrists, hips, knees, elbows, feet, or the like, which may be used to determine the location of various portions of the player's body in relation to each other.

FIG. 2b illustrates a participant 206 depicted as a game official wearing equipment having attached tags 102 and sensors 203 in accordance with some embodiments. In the depicted embodiment, tags 102 are attached to the participant's jersey proximate opposite shoulders. Sensors 203 are positioned in wristbands worn on the official's wrists as shown. Sensors 203 may be configured to communicate with receivers (e.g., receivers 106 of FIG. 1) directly or indirectly through tags 102 or other transmitters as discussed above in connection with FIG. 2a.

As discussed in greater detail below, the positioning of sensors 204 (here, accelerometers) proximate the wrists of the participant may allow the receiver processing and distribution system 110 to determine particular motions, movements, or activities of the official 206 for use in determining events (e.g., winding of the game clock, first down, touchdown, or the like). The participant 206 may also carry other equipment, such as penalty flag 208, which may also have a tag 102 (and optionally one or more sensors) attached to provide additional data to the receiver processing and distribution system 110. For example, the receiver processing and distribution system 110 may use tag position data from the penalty flag 208 to determine when the official is merely carrying the penalty flag 208 versus when the official is using the penalty flag 208 to indicate an event, such as a penalty (e.g., by throwing the penalty flag 208).

FIG. 2c illustrates an example of a participant 210 depicted as a game ball having tags 102 attached or embedded in accordance with some embodiments. Additionally, sensors 203 may be attached to or embedded in the ball 210, such as accelerometers, time-of-flight sensors, or the like. In some embodiments, the sensor 204 may be connected, wired or wirelessly, to tag 102 to provide sensor data to tag 102 which is then transmitted to the receivers 106. In some embodiments, the sensor 203 may transmit sensor data to receivers separately from the tag 102, such as described above in connection with FIG. 2a.

FIG. 2d illustrates a monitoring unit 205 including a tag 102 and a sensor 203. The tag and sensor may be embodied in a single housing or monitoring unit 205. The tag and sensor may operate independently or may be in wired or wireless communication. The sensor 203 may be configured to transmit signals to the tag 102 to commence, terminate, or change the rate of blink data transmissions. The sensor 203 may send signals configured to control the tag blink data transmission by using a low frequency transceiver with a range based on the size of the monitoring unit 205.

FIG. 2e illustrates a tag 102 and sensor 203 configuration in which the tag and sensor are separate units. The tag 102 may be associated but operate independently of the sensor 203, or may be in wired or wireless communication. In an instance in which the tag 102 is in wireless communication with the sensor 203, the sensor may send control signals to control the tag blink data transmissions as discussed above in FIG. 3d. The effective range of the sensor low frequency transmission may be 12 inches, 18 inches, 24 inches, 36 inches or any other distance value. The effective range of the low frequency transmission is based on the proximate mounting locations of the tag 102 and sensor 203. In an instance in which the tag 102 and the sensor 203 are mounted in close proximity the low frequency transmission may be of a lower range and power. For example, in an instance in which the tag 102 and sensor 203 are mounted 2 inches away from each other on the back of a helmet. Similarly, the range and power of the low frequency transmission may be increased if the tag 102 and sensor are located further away from each other. For example, in an instance in which the sensor is mounted to the participant's belt at waist level, and the tag is mounted in a shoulder pad.

As will be apparent to one of ordinary skill in the art in view of this disclosure, once the tags 102 and sensors 203 of FIGS. 2a-e are positioned on participants, they may be correlated to such participants and/or to each other. For example, in some embodiments, unique tag or sensor identifiers ("unique IDs") may be correlated to a participant profile (e.g., John Smith—running back, Fred Johnson—line judge official, or ID 027—one of several game balls, etc.) and stored to a remote database accessible to the performance analytics system as discussed in greater detail below. Each participant profile may further include or be correlated with a variety of data including, but not limited to, biometric data (e.g., height, weight, health data, etc.), role data, team ID, performance statistics, and other data that may be apparent to one of skill in the art in view of the foregoing description.

In some embodiments, such participant profile or role data may be pre-defined and stored in association with the unique tag or sensor identifiers. In other embodiments, the participant profile or role data may also be "learned" by the system as a result of received tag or sensor data, formation data, play data, event data, and/or the like. For example, in some embodiments the system may determine that a tag or sensor is not correlated to a participant profile and may analyze data received from the tag and/or sensor to determine possible participant roles, etc., which may be ranked and then selected/confirmed by the system or by a user after being displayed by the system. In some embodiments, the system may determine possible participant roles (i.e., participant role data) based on determined participant position data (e.g., movement patterns, alignment position, etc.).

In some embodiments, as described in greater detail below, the participant profile or role data may also be updated by the system (i.e., to produce a data set for the participant that is far more robust than that established at initial registration) as a result of received tag or sensor data, formation data, play data, event data, and/or the like. In some embodiments, the participant profile and/or role data may be used in a performance analytics system to weight the actions of the participants during analysis to assist in qualifying what is occurring, such as in determining formations, plays, events, etc.

Tag ID and Sensor Data Transmission Architecture

FIGS. 3A, 3B, 3C, 3D, 3E, and 3F show block diagrams of various different architectures that may be utilized in transmitting signals from one or more tags and sensors to one or more receivers of an over-determined location system in accordance with embodiments of the invention. In some embodiments, the depicted architectures may be used in connection with the receiver processing and analytics system 110 of FIG. 1. More than one of these architectures may be used together in a single system.

FIG. 3A shows a location tag 102, such as that shown in FIG. 1, which may be configured to transmit a tag signal to one or more receivers 106. The one or more receivers 106 may transmit a receiver signal to the receiver hub 108.

The depicted location tag 102 may generate or store a tag unique identifier ("tag UID") and/or tag data as shown. The tag data may include useful information such as the installed firmware version, last tag maintenance date, configuration information, and/or a tag-individual correlator. The tag-individual correlator may comprise data that indicates that a monitored individual (e.g., participant) is associated with the location tag 102 (e.g., name, uniform number and team, biometric data, tag position on individual, i.e., right wrist). As will be apparent to one of skill in the art in view of this disclosure, the tag-individual correlator may be stored to the location tag 102 when the tag is registered or otherwise associated with an individual. While shown as a separate field for illustration purposes, one of ordinary skill in the art may readily appreciate that the tag-individual correlator may be part of any tag data or even omitted from the tag.

The tag signal transmitted from location tag 102 to receiver 106 may include "blink data" as it is transmitted at selected intervals. This "blink rate" may be set by the tag designer or the system designer to meet application requirements. In some embodiments it is consistent for one or all tags; in some embodiments it may be data dependent. Blink data includes characteristics of the tag signal that allow the tag signal to be recognized by the receiver 106 so the location of the location tag 102 may be determined by the locating system. Blink data may also comprise one or more tag data packets. Such tag data packets may include any data from the tag 102 that is intended for transmission such as, for example in the depicted embodiment, a tag UID, tag data, and a tag-individual correlator. In the case of TDOA systems, the blink data may be or include a specific pattern, code, or trigger that the receiver 106 (or downstream receiver processing and analytics system) detects to identify that the transmission is from a location tag 102 (e.g., a UWB tag).

The depicted receiver 106 receives the tag signal, which includes blink data and tag data packets as discussed above. In one embodiment, the receiver 106 may pass the received tag signal directly to the receive hub/locate engine 108 as part of its receiver signal. In another embodiment, the receiver 106 could perform some basic processing on the received tag signal. For instance, the receiver could extract blink data from the tag signal and transmit the blink data to the receive hub/locate engine 108. The receiver could transmit a time measurement to the receive hub/locate engine 108 such as a TOA measurement and/or a TDOA measurement. The time measurement could be based on a clock time generated or calculated in the receiver, it could be based on a receiver offset value, it could be based on a system time, and/or it could be based on the time difference of arrival between the tag signal of the location tag 102 and the tag signal of a RF reference tag (e.g., tag 104 of FIG. 1). The receiver 106 could additionally or alternatively determine a signal measurement from the tag signal (such as a received signal strength indication (RSSI)), a direction of signal, signal polarity, or signal phase) and transmit the signal measurement to the receive hub/locate engine 108.

FIG. 3B shows a location tag 202 and sensor 203, such as those worn on an individual's person as shown in FIG. 2, which may be configured to transmit tag signals and sensor signals, respectively, to one or more receivers 106, 166. The one or more receivers 106, 166 may then transmit receiver signals to the receiver hub 108. One or more receivers 106, 166 may share physical components, such as a housing or antenna.

The depicted location tag 202 may comprise a tag UID and tag data (such as a tag-individual correlator) and transmit a tag signal comprising blink data as discussed in connection with FIG. 3A above. The depicted sensor 203 may generate and/or store a sensor UID, additional stored sensor data (e.g. a sensor-individual correlator, sensor type, sensor firmware version, last maintenance date, the units in which environmental measurements are transmitted, etc.), and environmental measurements. The "additional stored sensor data" of the sensor 203 may include any data that is intended for transmission, including but not limited to a location tag 202, a reference tag (e.g., 104 of FIG. 1), a sensor receiver, a receiver 106, and/or the receiver/hub locate engine 108.

The sensor-individual correlator may comprise data that indicates that a monitored individual is associated with the sensor 203 (e.g., name, uniform number and team, biometric data, sensor position on individual, i.e., right wrist). As will be apparent to one of skill in the art in view of this disclosure, the sensor-individual correlator may be stored to the sensor 203 when the sensor is registered or otherwise associated with an individual. While shown as a separate field for illustration purposes, one of ordinary skill in the art may readily appreciate that the sensor-individual correlator may be part of any additional stored sensor data or omitted from the sensor altogether.

Sensors such as sensor 203 that are structured according to embodiments of the invention may sense or determine one or more environmental conditions (e.g. temperature, pressure, pulse, heartbeat, rotation, velocity, acceleration, radiation, position, chemical concentration, voltage) and store or transmit "environmental measurements" that are indicative of such conditions. To clarify, the term "environmental measurements" includes measurements concerning the environment proximate the sensor including, without limitation, ambient information (e.g., temperature, position, humidity, etc.) and information concerning an individual's health, fitness, operation, and/or performance. Environmental measurements may be stored or transmitted in either analog or digital form and may be transmitted as individual measurements, as a set of individual measurements, and/or as summary statistics. For example, temperature in degrees Celsius may be transmitted as {31}, or as {33, 32, 27, 22, 20, 23, 27, 30, 34, 31}, or as {27.9}. In some embodiments, the sensor-individual correlator could be determined at least in part from the environmental measurements.

In the embodiment depicted in FIG. 3B, location tag 202 transmits a tag signal to receiver 106 and sensor 203 transmits a sensor signal to sensor receiver 166. The sensor signal may comprise one or more sensor information packets. Such sensor information packets may include any data or information from the sensor 203 that is intended for transmission such as, for example in the depicted embodiment, sensor UID, additional stored sensor data, sensor-individual correlator, and environmental measurements. A receiver signal from receiver 106 and a sensor receiver signal from sensor receiver 166 may be transmitted via wired or wireless communication to receiver hub 108 as shown.

FIG. 3C depicts a sensor 203 communicating through a location tag 202 in accordance with various embodiments. In one embodiment, the sensor 203 may be part of (i.e., reside in the same housing or assembly structure) the location tag 202. In another embodiment, the sensor 203 may be distinct from (i.e., not resident in the same housing or assembly structure) the location tag 202 but configured to communicate wirelessly or via wired communication with the location tag 202.

In one embodiment, the location tag 202, the sensor 203, or both, may generate and/or store a tag-sensor correlator that indicates an association between a location tag 202 and a sensor 203 (e.g., tag UID/sensor UID, distance from tag to sensor in a particular stance, set of sensors associated with a set of tags, sensor types associated with a tag, etc.). In the depicted embodiment, both the location tag 202 and the sensor 203 store the tag-sensor correlator.

In the depicted embodiment, sensor 203 transmits a sensor signal to location tag 202. The sensor signal may comprise one or more sensor information packets as discussed above. The sensor information packets may comprise the sensor UID, a sensor-individual correlator, additional stored sensor data, the tag-sensor correlator, and/or the environmental measurements. The location tag 202 may store some portion of, or all of, the sensor information packets locally and may package the sensor information packets into one or more tag data packets for transmission to receiver 106 as part of a tag signal or simply pass them along as part of its tag signal.

FIG. 3D illustrates an example communication structure for a reference tag 104 (e.g., reference tag 104 of FIG. 1), a location tag 202, a sensor 203, and two receivers 106 in accordance with one embodiment. The depicted reference tag 104 is a location tag and thus may include tag data, a tag UID, and is capable of transmitting tag data packets. In some embodiments, the reference tag 104 may form part of a sensor and may thus be capable of transmitting sensor information packets.

The depicted sensor 203 transmits a sensor signal to RF reference tag 104. The RF reference tag 104 may store some portion or some or all of the sensor information packets locally and may package the sensor information packets into one or more tag data packets for transmission to receiver 106 as part of a tag signal, or simply pass them along as part of its tag signal.

As was described above in connection with FIG. 1, the receivers 106 of FIG. 3D are configured to receive tag signals from the location tag 202 and the reference tag 104. Each of these tag signals may include blink data, which may comprise tag UIDs, tag data packets, and/or sensor information packets. The receivers 106 each transmit receiver signals via wired or wireless communication to the receiver hub 108 as shown.

FIG. 3E illustrates an example communication structure between a location tag 202, a plurality of receivers 106, and a variety of sensor types including, without limitation, a sensor 203, a diagnostic device 233, a triangulation positioner 243, a proximity positioner 253, and a proximity label 263 in accordance with various embodiments. In the depicted embodiment, none of the sensors 203, 233, 243, 253 form part of a location tag 202 or reference tag 104. However, each may comprise a sensor UID and additional stored sensor data. Each of the depicted sensors 203, 233, 243, 253 transmits sensor signals comprising sensor information packets.

In the depicted embodiment, receiver 106 is configured to receive a tag signal from location tag 202 and a sensor signal directly from sensor 203. In such embodiments, sensor 203 may be configured to communicate in a communication protocol that is common to location tag 202 as will be apparent to one of ordinary skill in the art in view of this disclosure.

Figure 3F:
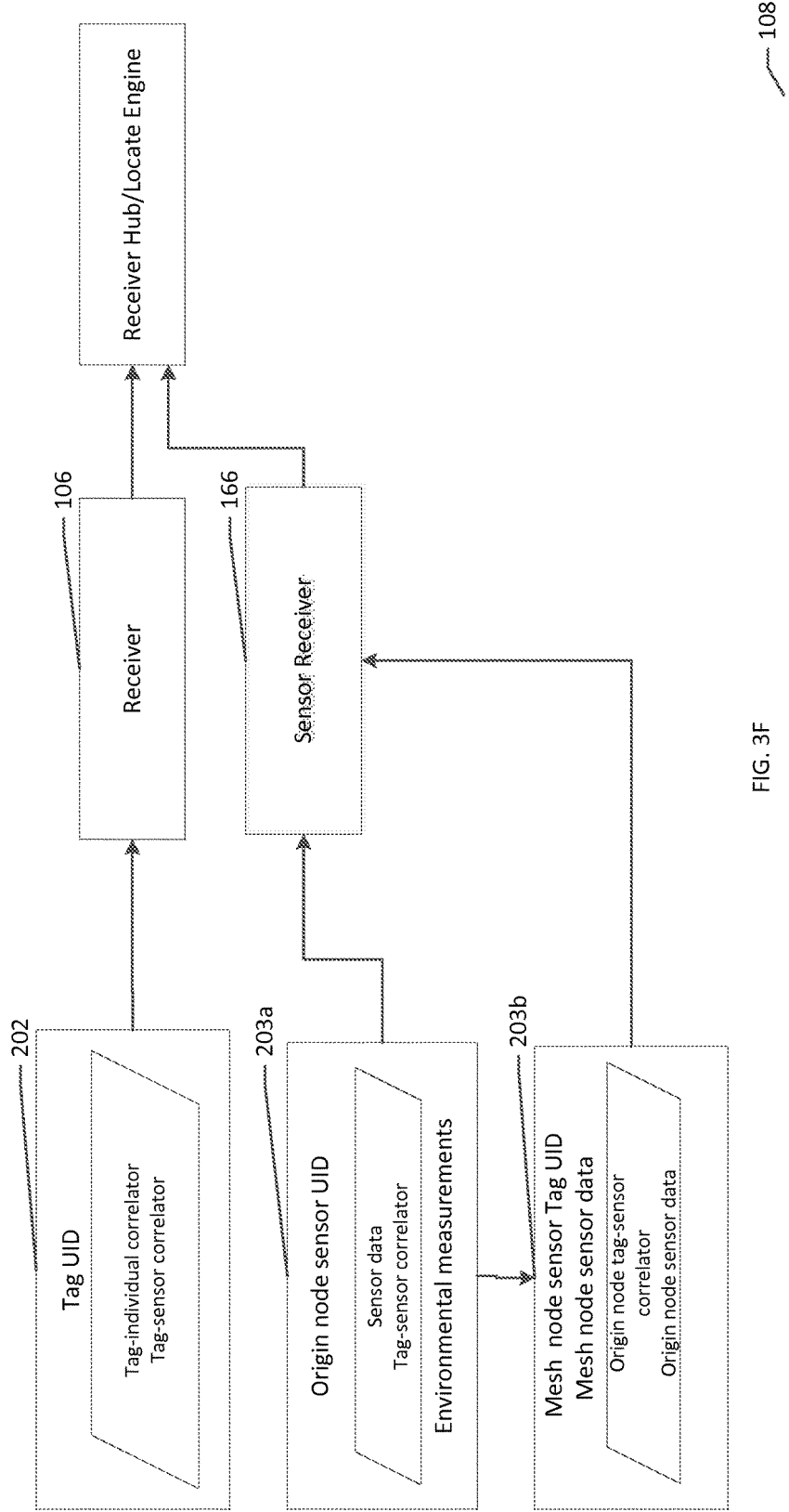

FIG. 3F illustrates an example communication structure between location tags 202, Origin nodes sensor 203*a*, mesh node sensor 203*b*, receivers 106, transceivers 107 and the receiver hub 108. The a location tag 202, such as that shown in FIG. 1, which may be configured to transmit a tag signal to one or more receivers 106. The one or more receivers 106 may transmit a receiver signal to the receiver hub 108. The sensors 203 may be housed separately from the tag 202 or may be housed in a single housing unit. The sensors 203 may be in wired or wireless communication with the tags 202 for tag signal control, such as commencing, terminating, or altering tag signal blink rate. The sensors 203 may transmit sensor data, sensor UID, tag-sensor correlator, or the like directly to the sensor receiver 166. In an example embodiment, the sensor receiver 166 may be a long range directional transceiver antenna configured to backhaul sensor data directly from a mesh node without using a mesh network.

In an embodiment in which the sensor data is transmitted through a mesh network the sensors may be designated as origin node sensors 203*a* and mesh node sensors 203*b*. A sensor 203*a* that originates the sensor data transmission may be referred to as an origin node 203*a*. One or more sensors 203*b* that receive and transmit the sensor data from the origin node to the sensor receiver 166 may be referred to as a mesh node 202*b*. The origin node 202*a* and mesh node 202*b* may use Wi-Fi, BLE, or NFC to transmit the sensor data to the next mesh node or sensor receiver 166 through a mesh network.

FIGS. 3E/F depicts one type of sensor referred to herein as a "proximity interrogator". The proximity interrogator 223 can include circuitry operative to generate a magnetic, electromagnetic, or other field that is detectable by a location tag 202. While not shown in FIGS. 3E/F, a proximity interrogator 223 may include a sensor UID and other tag and sensor derived data or information as discussed above.

In some embodiments, the proximity interrogator 223 is operative as a proximity communication device that can trigger a location tag 202 (e.g., when the location tag 202 detects the field produced by the proximity interrogator 223) to transmit blink data under an alternate blink pattern or blink rate. The location tag can initiate a preprogrammed (and typically faster) blink rate to allow more location points for tracking an individual. In some embodiments, the location tag may not transmit a tag signal until triggered by the proximity interrogator 223. In some embodiments the location tag 202 may be triggered when the location tag 202 moves near (e.g., within communication proximity to) a proximity interrogator 223. In some embodiments, the location tag may be triggered when the proximity interrogator 223 moves near to the location tag 202.

In other embodiments, the location tag 202 may be triggered when a button is pressed or a switch is activated on the proximity interrogator 223 or on the location tag itself. For example, a proximity interrogator 223 could be placed at the start line of a racetrack. Every time a car passes the start line, a car-mounted location tag 202 senses the signal from the proximity interrogator and is triggered to transmit a tag signal indicating that a lap has been completed. As another example, a proximity interrogator 223 could be placed at a Gatorade cooler. Each time a player or other participant fills a cup from the cooler a participant-mounted location tag 202 senses the signal from the proximity interrogator and is triggered to transmit a tag signal indicating that Gatorade has been consumed. As another example, a proximity interrogator 223 could be placed on a medical cart. When paramedics use the medical cart to pick up a participant (e.g., a player) and move him/her to the locker room, a participant-mounted location tag 202 senses the signal from the proximity interrogator and is triggered to transmit a tag signal indicating that they have been removed from the game. As explained, any of these post-triggered tag signals may differ from pre-triggered tag signals in terms of any aspect of the analog and/or digital attributes of the transmitted tag signal.

FIG. 3E depicts another type of sensor that is generally not worn by an individual but is referred to herein as a "diagnostic device". However, like other sensors, diagnostic devices may measure one or more environmental conditions and store corresponding environmental measurements in analog or digital form.

While the depicted diagnostic device 233 is not worn by an individual, it may generate and store a sensor-individual correlator for association with environmental measurements taken in connection with a specific individual. For example, in one embodiment, the diagnostic device 233 may be a blood pressure meter that is configured to store as environmental measurements blood pressure data for various individuals. Each set of environmental measurements (e.g., blood pressure data) may be stored and associated with a sensor-individual correlator.

The depicted diagnostic device 233 is configured to transmit a sensor signal comprising sensor information packets to a sensor receiver 166. The sensor information packets may comprise one or more of the sensor UID, the additional stored data, the environmental measurements, and/or the sensor-individual correlator as discussed above. The sensor receiver 166 may associate some or all of the data from the sensor information packets with other stored data in the sensor receiver 166 or with data stored or received from other sensors, diagnostic devices, location tags 102, or reference tags. The sensor receiver 166 transmits a sensor receiver signal to a receiver hub 108.

Another type of sensor shown in FIG. 3E/F is a triangulation positioner 243. A "triangulation positioner" is a type of sensor that senses position. The depicted triangulation positioner 243 includes a sensor UID, additional stored sensor data, and environmental measurements as discussed above.

In some embodiments, a triangulation positioner, such as a global positioning system (GPS) receiver receives position data, such as clock data transmitted by one or more geostationary satellites (a satellite in a known or knowable position) and/or one or more ground based transmitters (also in known or knowable positions), compares the received clock data, and computes a "position calculation". The position calculation may be included in one or more sensor information packets as environmental measurements and transmitted to the receiver hub 108, which may determine the position calculation based on the position data. In an example embodiment the triangulation positioner 243 may compare the position data clock data and compute a position calculation, which may be may be included in one or more sensor information packets as environmental measurements and transmitted to the receiver hub 108. Other triangulations positioners may include common timing time difference of arrival systems, angle of arrival systems, received signal strength systems, or the like.

In another embodiment, a triangulation positioner comprises one or more cameras or image-analyzers that receive position data, such as emitted or reflected light or heat. The position data may be transmitted to the receiver hub 108, which may analyze the received position data e.g., images to determine the position of an individual or sensor. Although a triangulation positioner may transmit data wirelessly, it is not a location tag because it does not transmit blink data or a tag signal that can be used by a receiver hub 108 to calculate location. In contrast, a triangulation positioner senses position data and/or computes a position calculation that may then be used as environmental measurements by the receiver hub 108 to determine a position of the sensor.

In an example embodiment the triangulation positioner comprises a RFID over ISO-2 system or WhereNet™. The ISO-2 system may have active RFID chips that may be read by a sensor when in proximity to a chip or forced to transmit at the receipt of a predetermined signal or sensor position data. The receiver hub 108 may determine the sensor position calculation based on the time difference of arrival of the RFID forced transmission.

In one embodiment, a triangulation positioner could be combined with a location tag or reference tag (not shown). In such embodiments, the triangulation positioner could compute and transmit its position calculation via the location tag to one or more receivers. However, the receiver hub would calculate tag location based on the blink data received as part of the tag signal and not based solely on the position calculation. The position calculation would be considered as environmental measurements and may be included in associated sensor information packets.

As will be apparent to one of ordinary skill in the art, position calculations (e.g., GPS receiver position calculations) are not as accurate as the location calculations (e.g., UWB waveform based location calculations) performed by receiver hub/locate engines structured in accordance with various embodiments of the invention. That is not to say that position calculations may not be improved using known techniques. For example, a number of influences, including atmospheric conditions, can cause GPS accuracy to vary over time. One way to control this is to use a differential global positioning system (DGPS) comprising one or a network of stationary triangulation positioners that are placed in a known position, and the coordinates of the known position are stored in memory as additional stored sensor data. These triangulation positioners receive clock data from geostationary satellites, determine a position calculation, and broadcast a difference between the position calculation and the stored coordinates. This DGPS correction signal can be used to correct for these influences and significantly reduce location estimate error.

Another type of sensor shown in FIG. 3E/F is a proximity detector 253. A "proximity detector" is a type of sensor that senses identity within an area (e.g., a local area) that is small with respect to the monitored area 100 of FIG. 1. Many different ways of sensing identity (e.g., a unique ID or other identifier for a sensed object or individual) would be apparent to one of ordinary skill in the art in view of this disclosure including, without limitation, reading a linear bar code, reading a two-dimensional bar code, reading a near field communication (NFC) tag, reading a RFID tag such as a passive UHF tag, a passive HF tag, or low frequency tag, an optical character recognition device, a biometric scanner, or a facial recognition system. The identity sensed by the proximity detector 253 and the range or radius associated with the identity may be referred to as proximity data.

In an example embodiment the proximity detector 253 may be a radio frequency identification (RFID) chip. The RFID chip may be sensed by an RFID sensor when the RFID sensor is within a predetermined range.

Figure 5B:
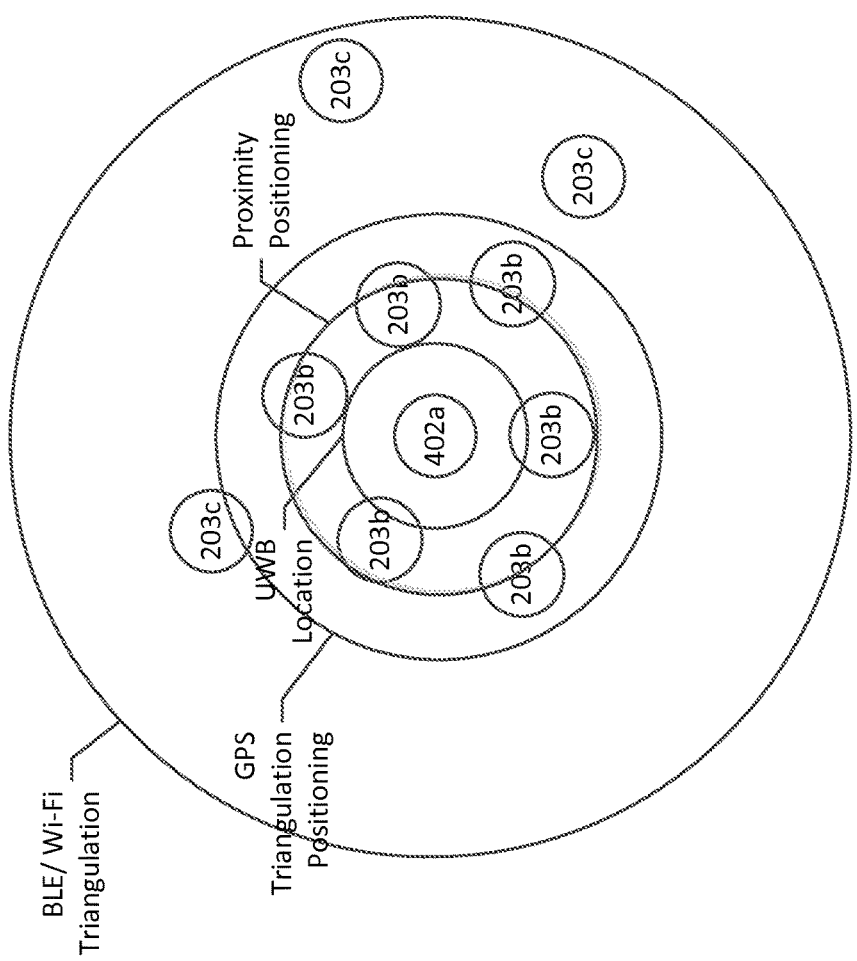
FIGS. 5A and 5B illustrate exemplary location technology accuracy and proximity transmission radii in accordance with some of the example embodiments of the present invention.
Figure 5A:
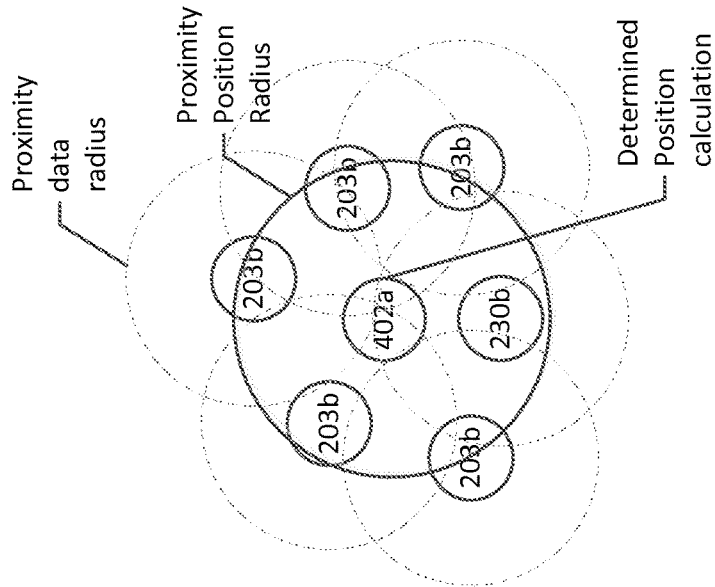

In an example embodiment, the proximity detector 253 may sense a Bluetooth Low Energy (BLE) signals identifying sensors. The BLE transmissions may have a predetermined radius and the transmissions may comprise the sensor or associated tag UIDs for the proximate sensors. The receiver hub 108 may determine the location of each identified proximate sensor based on an associated tag and the predetermined transmission radii. The BLE proximity position calculation may be determined as the position or area in which the proximity radii intersect, as depicted in FIG. 5a.

In an example embodiment, the proximity detector 253 may be a Wi-Fi transceiver. The Wi-Fi transceiver may send and receive Wi-Fi proximity or identity signals to and from sensors within the transmission range. The Wi-Fi transceiver may have a predetermined range or use the RSSI to determine proximity. In an instance in which the Wi-Fi transceiver has a predetermined broadcast or receiver range, the tag proximity position is calculated in a manner substantially similar to the BLE transmitter discussed above. In an instance in which the Wi-Fi transceiver does not have a predetermined range, the Wi-Fi RSSI is used to determine the identified sensors that are closest and furthest from the sensor based on signal strength. Additionally, an approximation of transmission radius may be derived from the RSSI and a proximity position calculated in a manner substantially similar to BLE transmitter above.

In some example embodiments, proximity may be determined based on predetermined relationships between tags or sensors. In an instance in which the tags or sensors move toward or away from each other, the receiver hub 108 or receiver processing and distribution system 110 may determine a change of proximity status associated with the relationship. For example, if a referee has a tag 102 or sensor 203 associated with a portion of his body, such as his shoulder and there is a tag or sensor associated with a flag kept in a pocket of his uniform, there may be a predetermined relationship between the flag and the shoulder of the referee. In an instance in which the flag is thrown the proximate relationship would change and the receiver hub 108 or receiver processing and distribution system 110 may update the status of the proximate relationship.

In some embodiments, a proximity detector senses an attribute of an individual (or an individual's wristband, tag, label, card, badge, clothing, uniform, costume, phone, ticket, etc.). The proximity data e.g., identity sensed by a proximity detector may be stored locally at the proximity detector 253 as shown and transmitted as proximity data via one or more sensor information packets to a sensor receiver 166.

In some embodiments, a proximity detector 253 may have a defined position, which is often stationary, and may be associated with a location in the monitored area 100 of FIG. 1. For example, a proximity detector 253 could be located at a finish line of a race track, an entrance gate of a stadium, with a diagnostic device, at a goal line or goal post of a football field, at a base or home plate of a baseball diamond, or a similar fixed location. In such embodiments where the proximity detector is stationary, the position coordinates of the proximity detector and a sensor UID could be stored to a monitored area database (not shown) that is accessible by one or more of the receivers 106, 166, the receiver hub 108, and/or other components of the receiver processing and analytics system 110. In embodiments where the proximity detector is movable, a position calculation could be determined with a triangulation positioner, or the proximity detector could be combined with a location tag and located by the receiver hub 108. While shown as separate fields for illustration purposes in FIG. 3E/F, identity information and position data could comprise part of the additional stored sensor data, the environmental measurements, or both.

In one embodiment, the proximity detector could be associated with a reference tag (e.g., tag 104 of FIG. 1) whose position is recorded in the monitored area database. In other embodiments, the proximity detector is movable, such that it may be transported to where it is needed. For example, a proximity detector 253 could be located on a medical cart, first down marker, a diagnostic device, goal post, or carried by a paramedic or security guard. In an embodiment where the proximity detector 253 is movable, it would typically be associated with a location tag or triangulation positioner so that location (for a location tag) or position (for a triangulation positioner) can be determined at the time identity is sensed.

In the embodiment where the proximity detector includes a location tag, the receiver hub 108 would locate the associated location tag, and the tag data/sensor data filter would associate the location data for the associated location tag as the position of the proximity detector, while determining the identity of an associated individual from any received sensor information packets. In the alternate embodiment where the proximity detector includes a triangulation positioner, the triangulation positioner would compute a position calculation that could be stored as additional stored sensor data and/or environmental measurements, and transmitted as one or more sensor information packets. In one embodiment, sensor information packets for a proximity detector may include both sensed identity information and a position calculation.

Another type of sensor shown in FIG. 3E is a proximity label 263. A proximity label has a fixed position and an identification code (e.g., a sensor UID). The proximity label 263 may further comprise additional stored sensor data as shown. The depicted proximity label 263 is configured to be read by proximity detector 253. In some embodiments, proximity detector 253 may be further configured to write information to proximity label 263.

A proximity label 263 may be a sticker, card, tag, passive RFID tag, active RFID tag, NFC tag, ticket, metal plate, electronic display, electronic paper, inked surface, sundial, or otherwise visible or machine readable identification device as is known in the art. The coordinates of the position of the proximity label 263 are stored such that they are accessible to the receive hub/locate engine 108. For example, in one embodiment, the position coordinates of a proximity label 263 could be stored in a field database or monitored area database accessible via a network, or stored locally as additional stored data in the proximity detector 253.

In some embodiments, a position of the proximity label 263 is encoded into the proximity label 263 itself. For example, coordinates of a position of the proximity label 263 could be encoded into a passive RFID tag that is placed in that position. As another example, the coordinates of a position of the proximity label 263 could be encoded into a printed barcode that is placed in that position. As another example, a proximity label 263 comprising a NFC tag could be encoded with the location "end zone", and the NFC tag could be placed at or near an end zone at Bank of America stadium. In some embodiments, the stored coordinates of the proximity label 263 may be offset from the actual coordinates of the proximity label 263 by a known or determinable amount.

In one embodiment, a proximity label 263 such as an NFC tag may be encoded with a position. When a sensor such as a proximity detector approaches the NFC tag it may read the position, then transmit the position in a sensor information packet to the sensor receiver 166' and eventually to the receiver hub 108. In another embodiment, a proximity label 263 such as a barcode label may be encoded with an identification code. When a smartphone with a proximity detector (such as a barcode imager) and a triangulation positioner (such as a GPS chip, GPS application, or similar device) approaches the barcode label it may read the identification code from the barcode, determine a position calculation from received clock data, then transmit the identity and the position calculation to sensor receiver 166' and eventually to the receiver hub 106 as part of one or more sensor information packets.

In the depicted embodiment, triangulation positioner 243 and proximity detector 253 are each configured to transmit sensor signals carrying sensor information packets to sensor receiver 166'. The depicted sensors 243, 253, like any sensor discussed herein, may transmit sensor signals via wired or wireless communication protocols. For example, any proprietary or standard wireless protocol (e.g., 802.11, Zigbee, ISO/IEC 802.15.4, ISO/IEC 18000, IrDA, Bluetooth, CDMA, or any other protocol) could be used for the sensor signals. Alternatively or additionally, any standard or proprietary wired communication protocol (e.g., Ethernet, Parallel, Serial, RS-232, RS-422, USB, Firewire, I²C, etc.) may be used. Similarly, sensor receiver 166', and any receiver discussed herein, may use similar wired and wireless protocols to transmit receiver signals to the receiver hub/locate engine.

In one embodiment, upon receiving sensor signals from the triangulation positioner 243 and the proximity detector 253, the sensor receiver 166' may associate some or all of the data from the received sensor information packets with other data stored to the sensor receiver 166', or with data stored or received from other sensors (e.g., sensor 203, audio sensor 105), diagnostic devices 233, location tags 102, or RF reference tags 104. Such associated data is referred to herein as "associated sensor data". In the depicted embodiment, the sensor receiver 166' is configured to transmit some or all of the received sensor information packets and any associated sensor data to the receiver hub 108 at part of a sensor receiver signal.

In one embodiment, a smartphone comprising a proximity detector (such as a barcode imager) and a triangulation positioner (such as a GPS chip) may associate an identification code determined from a barcode with a position calculation from received clock data as associated sensor data and transmit a sensor information packet that includes such associated sensor data to the receiver hub 108. In another embodiment, the smartphone could transmit a first sensor information packet including the identification code and the smartphone's unique identifier to another sensor receiver, the smartphone could transmit a second sensor information packet including the position calculation and the smartphone's unique identifier to the sensor receiver, and the sensor receiver could associate the position calculation with the identification code based on the common smartphone unique identifier and transmit such associated sensor data to the receiver hub 108. In another embodiment, the sensor receiver could determine a first time measurement associated with the first sensor information packet and a second time measurement associated with the second sensor information packet that, in conjunction with the sensor UID, could be used, by the receiver hub 108, to associate the first sensor information packet with the second sensor information packet.

In one embodiment, the receiver hub 108 receives receiver signals from the receiver 106 and sensor receiver signals from the sensor receivers 166, 166'. In the depicted embodiment, receiver 106 may receive blink data from the location tag 102 and transmits to the receiver hub 108 some or all of the blink data, perhaps with additional time measurements or signal measurements. In some embodiments, time measurements or signal measurements may be based on a tag signal received from a RF reference tag (e.g., reference tag 104 of FIG. 1). The receiver hub 108 collects the blink data, time measurements (e.g., time of arrival, time difference of arrival, phase), and/or signal measurements (e.g., signal strength, signal direction, signal polarization, signal phase) from the receivers 106 and computes location data for the tags 102 as discussed above in connection with FIG. 1. In some embodiments, the receivers 106 may be configured with appropriate RF filters, such as to filter out potentially interfering signals or reflections proximate the field of play or other area to be monitored.

The receiver hub 108 may also access stored data or clock data from local storage and from a network location. The receiver hub 108 uses this information to determine location data for each location tag. It may also associate data derived or extracted from tag signals transmitted from one or more location tags with information or data derived or extracted from sensor signals transmitted from one or more sensors.

In addition to the TOA or TDOA systems previously described, other real-time location systems (RTLS) such as received signal strength indication based systems could potentially be implemented by a receiver hub 108. Any RTLS system using location tags, including those described herein, could require considerable processing by the receiver hub 108 to determine the location data from the blink data received from the tags. These may require time measurement and/or signal measurement in addition to blink data, which preferably includes a tag UID. In contrast, in other systems, such as global position systems (GPS) systems, location data is determined based upon the position calculation transmitted from a GPS transmitter (also referred to as a GPS receiver or GPS tag) which includes calculated information about the location where the tag was positioned (i.e., coordinates determined at the tag via satellite signal triangulation, etc.) when the position calculation was determined or stored. Thus, GPS information typically refers to additional information that is transmitted along with a GPS transmitter ID before the transmission is received by a sensor receiver.

A GPS host device or back-end server may receive the GPS information and simply parse the position calculation (as opposed to calculating the position information at the host device) and the GPS transmitter ID into a data record. This data record may be used as a GPS position calculation, or it could be converted to a different coordinate system to be used as a GPS position calculation, or it could be processed further with DGPS information to be used as a GPS position calculation.

Returning to FIG. 3C, the depicted location tag 202 is used to convey (sometimes called backhaul) sensor information packets to a receiver 106. In some embodiments, while not shown, multiple sensors 203 may transmit sensor signals carrying sensor information packets to location tag 202. Such received sensor information packets may be associated with blink data that is transmitted to receiver 106.

In one embodiment, the receiver hub 108 may parse sensor information packets from received tag data packets and associate such sensor information packets with the location tag 202 that transmitted the sensor information packet. Thus, the receiver hub 108 may be able to determine location data, which may comprise a location and other data (e.g., tag data, tag UID, tag-individual correlator, sensor-individual correlator, additional stored sensor data, environmental measurements (e.g., audio data), tag-sensor correlator, identity information, position calculation, etc.) from one or more tags or sensors. Such data and information may be transmitted to the receiver processing and analytics system 110.

In some embodiments, once the receiver hub 108 determines a location estimate of a location tag 102 at the time epoch of the tag signal, the receiver hub 108 can also associate a location estimate with the tag data packet included in the blink data of such tag signal. In some embodiments, the location estimate of the tag signal may be used as location data for the tag data packet. In some embodiments a Geographical Information System (GIS) may be used by the receive hub/locate engine 108 to refine a location estimate, or to map a location estimate in one coordinate system to a location estimate in a different coordinate system, to provide a location estimate for the tag data packet.

In one embodiment, the location estimated for the tag data packet may be associated with any data in the tag data packet, including a tag UID, other tag data, and, if included, one or more sensor information packets, including sensor UID, additional stored sensor data, and environmental measurements. Since environmental measurements may include a position calculation from a triangulation positioner (e.g., a GPS device), the receiver hub 108 could parse the position calculation and use it to refine a location estimate for the tag data packet.

Preferably, the receiver hub 108 may access an individual database to determine tag-individual correlators or sensor-individual correlators. Individual data (e.g., an individual profile) may be stored in a server, in tag memory, in sensor memory, or in other storage accessible via a network or communication system, including tag data or additional stored sensor data as explained previously.

In some embodiments, by comparing data accessed using a sensor-individual correlator, the receiver hub 108 may associate an individual with a sensor information packet received from a sensor, and/or may associate an individual with such sensor. Because the receiver hub 108 may associate a sensor position estimate with a sensor information packet, the receiver hub 108 may also estimate an individual position for the associated individual.

In another embodiment, by comparing data accessed using a tag-sensor correlator, the receiver hub 108 may associate a sensor with a tag data packet received from a location tag 102. Because the receiver hub 108 may associate a location estimate with a tag data packet, the receiver hub 108 may also create a sensor location estimate for the associated sensor. By comparing a location estimate for a location tag with a sensor location estimate or a sensor position estimate, the receiver hub 108 may associate a location tag with a sensor, or may associate a tag data packet with a sensor information packet. The receiver hub 108 could also determine a new or refined tag-sensor correlator based on this association.

In still another embodiment, by comparing a location estimate for a location tag with an individual location estimate or an individual position estimate, the receiver hub 108 may associate a location tag with an individual, or may associate a tag data packet with an individual. The receiver hub 108 could also determine a new or refined tag-individual correlator based on this association.

In one embodiment, by comparing a location estimate for a sensor with an individual location estimate or an individual position estimate, the receiver hub 108 may associate a sensor with an individual, or may associate a sensor information packet with an individual. The receiver hub 108 could also determine a new or refined sensor-individual correlator based on this association.

Data derived or extracted from tag signals transmitted from one or more location tags is referred to herein as "tag derived data" and shall include, without limitation, tag data, tag UID, tag-individual correlator, tag-sensor correlator, tag data packets, blink data, time measurements (e.g. time of arrival, time difference of arrival, phase), signal measurements (e.g., signal strength, signal direction, signal polarization, signal phase) and location data (e.g., including tag location estimates). Tag derived data is not derived by the location tag, but rather, is derived from information transmitted by the location tag. Information or data derived or extracted from sensor signals transmitted from one or more sensors is referred to herein as "sensor derived data" and shall include, without limitation, sensor UID, additional stored sensor data, sensor-individual correlator, environmental measurements, sensor information packets, position calculations (including sensor position estimates), position information, identity information, tag-sensor correlator, and associated sensor data. Information or data derived or extracted from audio sensor signals transmitted by one or more audio sensors is referred to herein as "audio data" and shall include without limitation, audio sensor UID, additional stored audio sensor data, audio sensor-individual correlator, audio sensor information packets, tag-audio sensor correlator, and associated audio sensor data. Data derived or extracted from stored individual data is referred to herein as "individual profile information", "participant profile information", or simply "profile information" and shall include, without limitation tag-individual correlator, sensor-individual correlator, identity information, name, uniform number and team, biometric data, tag position on individual. In various embodiments, the receiver hub 108 may transmit tag derived data, sensor derived data, individual profile information, various combinations thereof, and/or any information from the GIS, the field database, the monitored area database, and the individual database to the receiver processing and analytics system 110.

Exemplary Over-Determined Location System with Multiple Location Technologies

Figure 4:
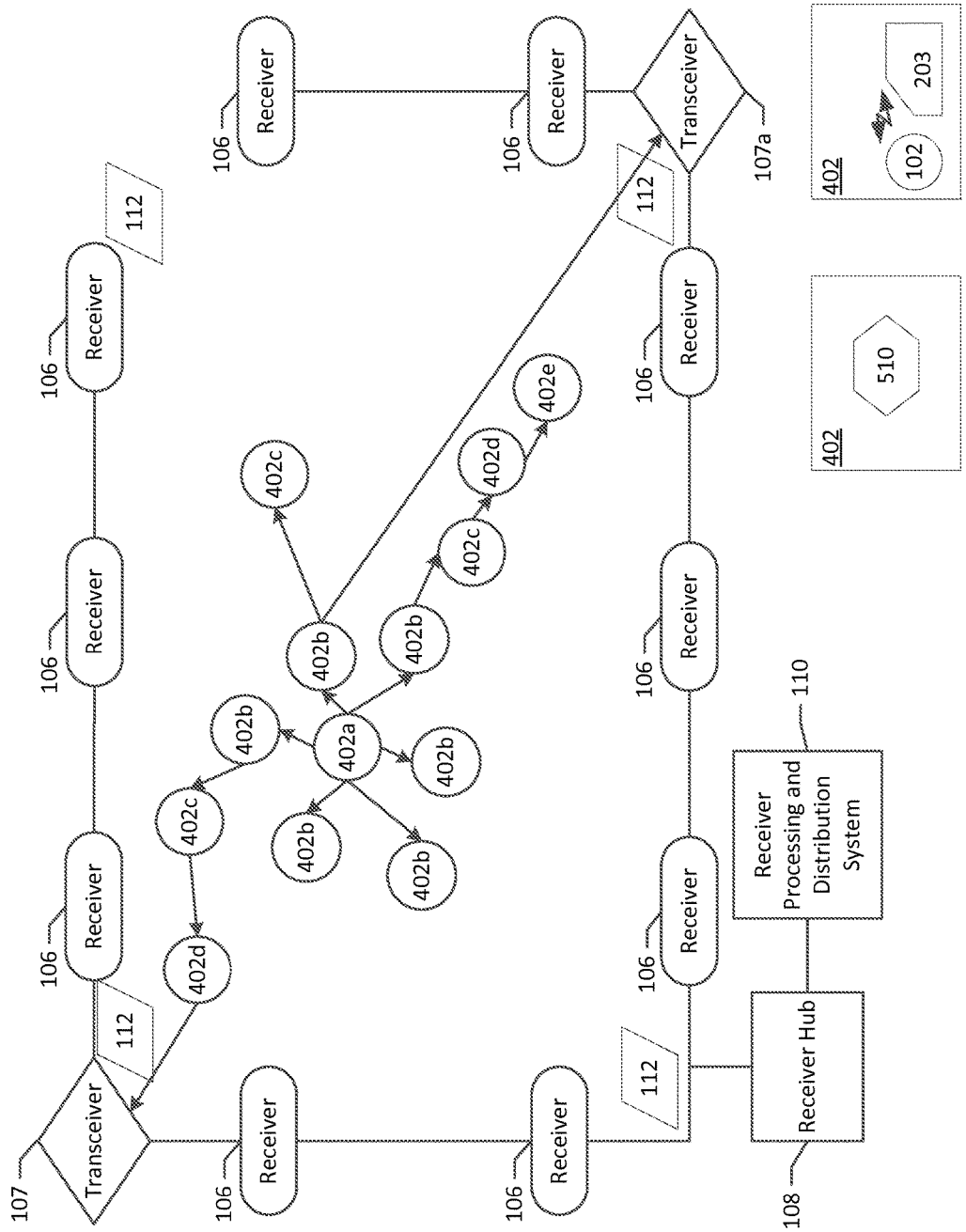
FIG. 4 illustrates an exemplary over-determined locating system that may utilize multiple location technologies in accordance with some example embodiments of the present invention.

FIG. 4 illustrates a diagram of an over determined location system with multiple location technologies. The location system may include participants 402*a-e*, tags 102, sensors 203, monitoring units 510, receivers 106, transceivers 107 and 107*a*, a receiver hub 108, a receiver processing and distribution system 110, and exciters 112. Participants 402*a-e* may carry a tag 102 and a sensor 203 or a monitoring unit 510, as depicted in the participant 402 breakouts. The following descriptions of tags 102 and sensors 203 may include the tags 102 and sensors 203 housed within the monitoring unit 510, or separately mounted. Tags 102 and sensors 203 may be referred to by their associated participant designator. For example participant 402*a* may carry tag 102*a* and sensor 102*a*. Each tag 102*a-e* may transmit blink data as described above in FIG. 1. Sensors 203*a-e* may transmit proximity and/or position data or receive and transmit proximity and/or position data from other sensors as described in FIG. 3. The transceiver 107 may function as a sensor receiver, such as sensor receiver 166 of FIG. 3E/F.

Proximity data may include BLE, NFC, Wi-Fi or other communication transmissions comprising the tag UID or sensor UID for each sensor that is within range. The proximity data may be a proximity detector identification of proximate sensors, such as sensor or tag UIDs having a predetermined range, or proximity radii, such as Wi-Fi RSSI. Position data may include without limitation triangulation position data, such as GPS or ISO-2, telemetry data, or other data that may be used to determine the sensor position. The sensors 203*a-e* may transmit the proximity data or position data by NFC, Wi-Fi, BLE, or the like.

In an instance in which a sensor is the origin point for transmission of proximity or position data, the sensor may be referred to as an origin node. In an instance in which the sensor receives and/or transmits the proximity or position data of an origin node, the sensor may be referred to as a mesh node. A sensor may dynamically shift between origin node, mesh node or both based on transmitting the sensor data from another sensor, its own sensor data or both as described below.

An origin node 203*a* may transmit proximity data or position data to mesh nodes 203*b*, 203*c*, or 203*d*. Mesh nodes 203*b*, 203*c*, 203*d* may be configured to relay the proximity data or position data to a transceiver 107 using a mesh network protocol. In an example embodiment sensor 203*b* may be an origin node and a mesh node when transmitting proximity or position data from sensor 203*a* and transmitting its own proximity or position data. Similarly, sensor 203*b* may be an origin node when transmitting proximity or position data to mesh nodes 203*c*.

In an example embodiment, a directional long range transceiver antenna 107*a* may pull the proximity or position data from the origin node 203*a* or mesh node 203*b* directly without using a mesh network. In an example embodiment, the mesh network may be utilized to transmit position or proximity data out of an area of interference such as physical interference of a player pile up, and backhauled through the directional long range transceiver antenna 107*a*.

In an example embodiment, the origin node 203*a* and subsequent mesh nodes 203*b-e* append their associated tag UID or sensor UID to the transmission of sensor proximity or position data. The tag/sensor UIDs may be used by the mesh nodes 203*b-e* to determine a transmission count as described below. Additionally, the receiver hub 108 or receiver processing and distribution system 110 may use the tag/sensor UIDs for system analytics or diagnostics. For example the receiver hub 108 or receiver processing and distribution system 110 may determine the route a proximity or position data message took through the mesh network.

In an example embodiment, the duration of relay transmissions of the proximity data or position data message through a mesh network may be limited by a message count. The limitation of the message transmission duration prevents a message from cycling throughout the mesh network indefinitely, or continuing transmission after the message has been received by transceiver 107. A message count may be a number of transmissions from sensor to sensor (e.g., transmission count) such three transmissions, four transmissions, five transmissions, or any other number of transmissions. The message count may be a time count such as 3 seconds, 2 seconds, 1 second, ½ second, or any other time value.

In an instance in which the message count does not satisfy a predetermined threshold (e.g. 4 transmissions or 3 seconds), the mesh node 203 *b-e* may transmit the received origin node 203*a* proximity or position data. In an instance in which the message count satisfies a predetermined threshold (e.g., 4 transmissions or 3 seconds), the mesh node 203*b-e* may not transmit the received origin node 203*a* proximity or position data.

For example, the origin node 203*a* may transmit proximity or position data to a mesh node 203*b*, and mesh nodes 203*b* may transmit to mesh nodes 203*c-d*. In an instance in which the message count threshold is four transmissions, mesh node 203*d* is the last transmission of the message. The message may be received by a transceiver 107 which sends the message to the receiver hub 108 for processing, or be received by another mesh node 203*e*. The message count threshold is satisfied in an instance in which the mesh node 203*e* receives the message and the mesh node disregards the message, terminating the message route.

In another example, the origin node 203*a* may transmit proximity or position data to a mesh node 203*b* with a time notation, and mesh nodes 203*b* may transmit to mesh nodes 203*c-d*. In an instance in which the message count threshold is 3 seconds, mesh nodes 203*b-d* each verify the time notation is less than 3 seconds. Where the transmission to mesh node 203*d* occurs prior to 3 seconds and subsequent transmission would exceed 3 seconds, the transmission from 203*d* is the last transmission of the message. The message may be received by a transceiver 107 which sends the message to the receiver hub 108 for processing, or be received by another mesh node 203*e*. The message count threshold of 3 seconds is satisfied in an instance in which the mesh node 203*e* receives the message and the mesh node disregards the message, terminating the message route.

In an example embodiment, the receiver hub 108 or receiver processing and distribution system 110 may determine the best route for a proximity or position data message. The receiver hub 108 or receiver processing and distribution system 110 may determine that the blink data has not been received for a specified tag. The receiver hub 108 or receiver processing and distribution system 110 may use the last known location of the tag 102*a* and/or the participants' 402*a* position calculations and the locations or position calculations for other participants 402*b-e* in the monitored area to determine the best route for the message to reach a transceiver 107 (e.g., smallest number of transmissions). The receiver hub 108 or the receiver processing and distribution system 110 may cause the transceiver 107 to transmit the message route to the monitored area. The sensors 203 may be configured with a transceiver to receive message route or other control signals from the receiver hub 108 or processing and distribution system 110. In an instance in which a mesh node 203*b-d* receives a proximity or position data message, the mesh node may determine if the mesh node is designated in the message route. If the sensor is designated the mesh node 203*b-e* may transmit the proximity and position data message along with its own data. In an instance in which the mesh node 203*b-e* is not designate the mesh node dismisses the received proximity or position data.

In an example embodiment, the monitored area 100 may have transmitters, such as exciters 112, placed at the boundary of the monitored area. The exciters 112 may transmit a short range LF signal or a transmission reliability signal. The exciters 112 may transmit the transmission reliability signal repeatedly, such as continuously or near continuously. The tags 102*a-e* and/or sensors may include a short range LF receiver for setting tag blink rate. The exciters 112 may be a series of ground mounted exciters, the tags or sensors may receive the transmission reliability signal as the participant passed over the exciter. In an example embodiment, the exciters 112 may be mounted in a ring in which the participant must pass through to enter or exit a monitored area.

The transmission reliability signal from the exciters 112 may be received by the tag receiver and change the state of blink data transmission. Additionally or alternatively, the transmission reliability signal may be received by a sensor 203, the sensor may in turn transmit a signal configured to cause the tag 102 to change blink data transmission state. The transmission reliability signal may be used to transition the tag blink data transmissions based on being within or outside of the monitored area. For example, tags 102*a-e* may transmit blink data when they are within the monitored area or to cease transmitted blink data when they leave the monitored area as indicated by crossing through the transmission reliability signal of the exciters 112. Additionally, exciters 112 may be used to signal to sensors 203 to transmit proximity data or position data when within the monitored area or cease transmitting proximity or position data when not within the monitored area in a manner similar to tags as described.

In an example embodiment, tags alter their blink rate based on the receipt of the transmission reliability signal. For example the tag may blink at 56 Hz when within the monitored area and 1 Hz when outside of the monitored area. In other embodiments, the tag 102 and associated sensor 203 may transmit via one or multiple location methods within a monitored area and transmit on a different or single location method when outside of the monitored area. For example, transmitting blink data from the tag 102 and proximity data from the sensor 203 within the monitored area and transmitting only position data outside of the monitored area. Tags 102 terminating transmission or high blink rate transmission when outside of the monitored area may increase battery life of the tag 102 and reduce processor load on the receiver hub 108.

In an example embodiment, a transmitter 107 may transmit a transmission reliability signal to the monitored area. The transmission reliability signal may be received by a sensor 203a. In an instance when the 203a receives the transmission reliability signal it may transmit proximity data and position data or not transmit if configured to transmit only when the tag 102 location may not be calculated. If the sensor 203a fails to receive the transmission reliability signal the sensor may assume that the tag blink data is obstructed, for example, by a pile up of players in football. An illustration of an example obstruction is depicted in FIG. 6, the tag 102a and associated sensor 203 (not shown) does not have a direct line of sight to the receiver 106 due to participants 402b blocking the tag signal or any other physical obstruction to the tag signal. In an instance in which the sensor 203a does not receive the transmission reliability signal, the sensor may transmit proximity data and/or position data to mesh nodes 203b. Mesh node 203b may transmit its own blink data, proximity data, and/or position data and origin node 203a position data and/or proximity data. Additionally, sensor 203, may transmit a signal to the tag 102 configured to cause the termination of blink data transmissions or lower blink rate. When the transmission reliability signal is received at the sensor 203a, the sensor may transmit a signal configured to cause the tag 102a to recommence blink data transmissions or increase blink rate.

In an example embodiment, if sensor 203a fails to receive the transmission reliability signal, it may also transmit a distress signal. The distress signal may be indicative of a tag or sensor signal blockage. The distress signal may be received by a mesh node sensor 203b. In an instance in which a mesh node 203b receives the distress signal and proximity or position data, mesh node may transmit its own proximity data, and/or position data and origin node 203a position data and/or proximity data. In an instance in which mesh node 203b does not receive a distress signal, it may transmit only its own proximity data and/or position data and not transmit origin node 203a's position data or proximity data, having determined that the origin node is not obstructed.

The receiver hub 108 may generate a location hierarchy by assigning a priority value to each of the location and position methods for which the location system is equipped. For example, UWB location may be assigned a priority value of 1; proximity position calculation based on a UWB location may have a priority value of 2; GPS position calculation backhauled over Wi-Fi or ISO-2 may have a priority value of 3; ISO-2, Wi-Fi RSSI, and proximity position calculation based on GPS position may have a priority value of 4; where 1 represents the highest priority value and 4 the lowest priority value.

The blink data, proximity data, and position data may be received at the receiver hub 108 or receiver processing and distribution system 110 from the receivers 106 and/or transceivers 107. The receiver hub 108 or the receiver processing and distribution system 110 may calculate tag locations based on the blink data as discussed in FIG. 1. The receiver hub may determine sensor proximity data and/or sensor position data. The receiver hub 108 or receiver processing and distribution system 110 may use the location data, proximity data, and/or position data to determine a origin node position calculation based on available location and sensor position calculation data from mesh nodes.

In an embodiment, the receiver hub 108 or the receiver processing and distribution system 110 may receive proximity data for a sensor 203a. The proximity data may include data, such as tag or sensor UIDs, identifying one or more mesh nodes 203b in proximity to the specified origin node 203a. The origin node 203a may have a predetermined range for transmission of the proximity data, limiting the receipt of the proximity data to a specified radius. For example, the range may be 10 ft, 4 ft, 2 ft, or any other radial distance value. The receiver hub 108 or receiver processing and distribution system 110 may calculate mesh node 102b location based on blink data and a proximity radius for each mesh node to determine a position calculation for the origin node 102a as illustrated in FIG. 5a.

In an example embodiment, the receiver hub 108 or receiver processing and distribution system 110 may receive position data for an origin node 203a. The position data may include telemetry data, such as Wi-Fi, or a triangulated position, such as GPS. The receiver hub 108 or the receiver processing and distribution system 110 may determine a position calculation based on the available telemetry data or triangulation position data as discussed in FIG. 3E/F.

The receiver hub 108 or the receiver processing and distribution system 110 may validate calculated tag locations using the determined position data and/or previous location/position data. The validation may reduce the occurrences of bounced blink data causing inaccurate locates or other anomalies in the tag location determination. The receiver hub 108 or the receiver processing and distribution system 110 may compare the current location data to the previous location data. Previous location data may include the last 2, 5, 10, 20 or another number of location data that were calculated before location data that is being validated. In an instance in which the change in location data satisfies a predetermined threshold such as 2 ft, 5 ft, 20 ft, 30 ft, 100 ft, or any other distance value, the receiver hub 108 or the receiver processing and distribution system 110 may determine that the tag 102 could not travel the determined distance between blinks and dismiss the location data. For example, in an instance in which the location data changes by 35 ft and the predetermined threshold is 20 ft, the receiver hub 108 or receiver processing and distribution system 110 may dismiss the location data.

In an example embodiment, the receiver hub 108 may compare the location data of a participant 402a to the location data of participants 402b that have received the origin node 203a proximity data. The receiver hub 108 or the receiver processing and distribution system 110 may determine that the tag 102a location data is within the mesh nodes 203b proximity radius and is therefore valid, as shown in FIG. 5a. The receiver hub 108 or receiver processing and distribution system may determine that the tag 102a location data is outside of the mesh node 102b proximity radius and therefore the location data is invalid and dismiss the location data as unavailable.

In an example embodiment, the receiver hub 108 or receiver processing and distribution system 110 may compare the tag 102 location data to the determined positions based on the position data received from the sensor 203a. The receiver hub 108 or receiver processing and distribution system 110 may determine that the location data is within the position calculation accuracy radius or radii, as shown in FIG. 5b, and therefore the location data is valid. The receiver hub 108 or receiver processing and distribution system 110 may determine that the location data is outside of the determined sensor position calculation accuracy and dismiss the location data as unavailable.

The receiver hub 108 or the receiver processing and distribution system 110 may determine a message route based on the last location data of the participant 402 and the location data and position calculations of other participants. The receiver hub 108 or the receiver processing and distribution system 110 may determine the shortest route, e.g. the smallest number of transmissions through a mesh network to the transceiver 107 and designate mesh nodes 203b-e. The receiver hub 108 or receiver processing and distribution system 110 may cause the transceiver 107 to transmit the message route to the monitored area for receipt by sensors 203a-e.

The receiver hub 108 or the receiver processing and distribution system 110 may determine the highest priority location or position data available, or over-determined location. The receiver hub 108 or receiver processing and distribution system 110 may determine which location methods are available (e.g. providing an accurate or valid location or position). The receiver hub 108 or receiver processing and distribution system 110 may select the available location or sensor position calculation data which has the highest assigned priority value, in a location hierarchy. For example, if UWB location-priority 1 and GPS position calculation-priority 2 are available the receiver hub 108 or receiver processing and distribution system 110 may select the UWB location. In an instance in which the receiver hub 108 or receiver processing and distribution system 110 determines that UWB proximity position calculation-priority 2 and Wi-Fi-priority 3 are available, UWB proximity position calculation may be selected. In an instance in which two or more location methods are available and have the same priority value the determined position may be an average of the selected locations or positions.

The receiver hub 108 or receiver processing and distribution system may cause the display of the selected location or sensor position calculation data on a graphic user interface (GUI). In an example embodiment the selected location or sensor position calculation data is displayed on the GUI overlaid with the other available location or position data. Additionally, the receiver hub 108 or receiver processing and distribution system may cause all or at least the selected location and sensor position calculation data to be stored in a memory for later analysis or display.

Example Over-Determined Location System with Distinct Monitoring Areas

Figure 7:
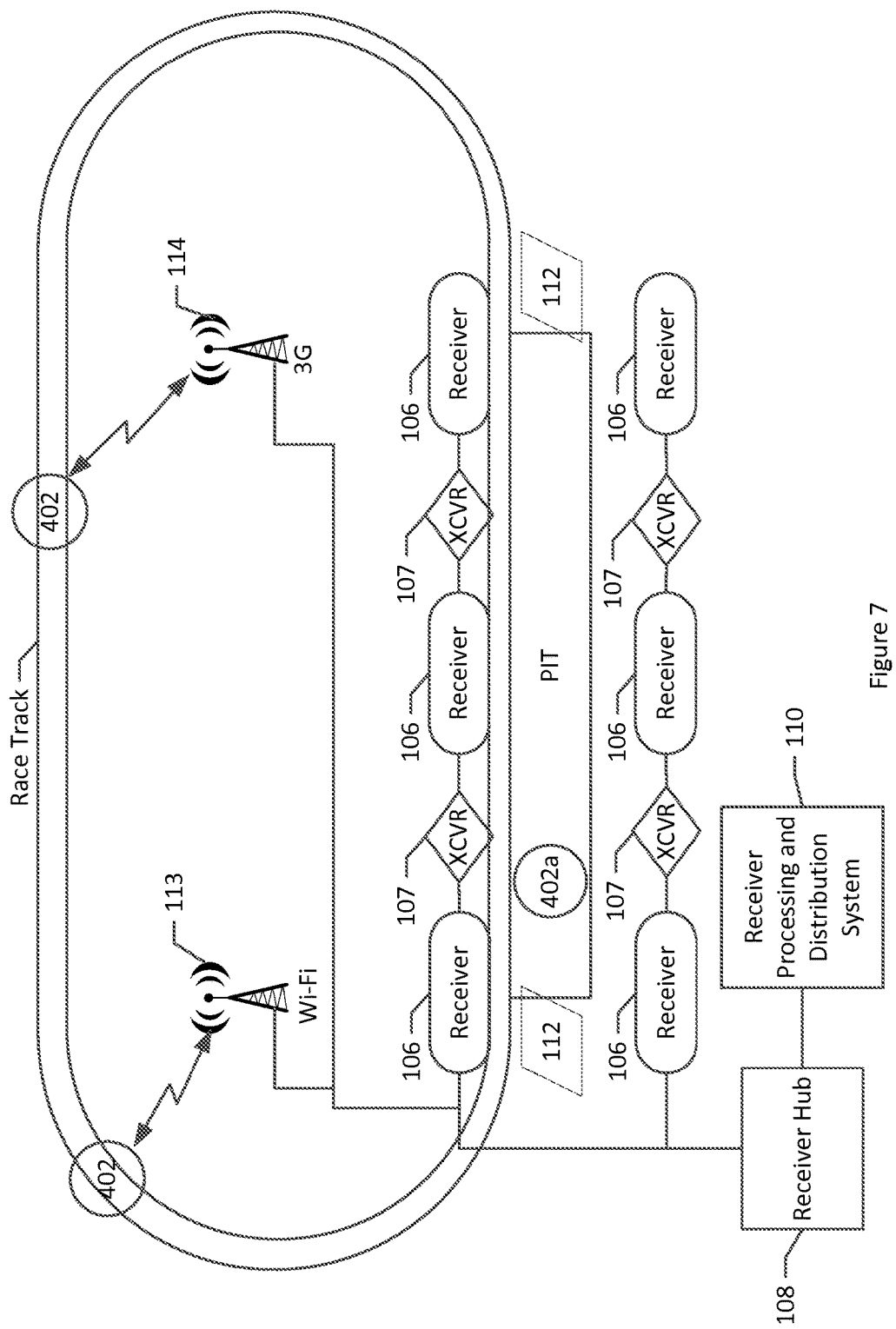
FIG. 7 illustrates an exemplary over-determined location system with distinct monitoring areas in accordance with some example embodiments of the present invention.

FIG. 7 illustrates a diagram of an over-determined location system utilizing multiple location technologies. The location system including tagged participants 402/402a, receivers 106, transceivers 107, a receiver hub 108, a receiver processing and distribution system 110, exciters 112, a Wi-Fi receiver 113, and a cellular (3G) receiver 114. In an event location such as a race track, a cross county field or a bicycle course, a single location technology may not be suitable to deliver accurate location over the range of the event terrain or area. A location system may utilize multiple location technologies to deliver the type of information required at different areas of the event. For example, on a race track a location may be desired, but a subfoot location may be unnecessary. However within the same event in the pit area high accuracy location of tools, personnel, cars, or the like may be desired for safety and analytics. In another example, UWB locations may be highly desirable at the finish line of events as a method of determining a winner of a race, but subfoot accuracy may not be necessary for the remainder of the event.

The receiver hub 108 or receiver processing and distribution system 110 may generate a location hierarchy for each monitored areas of the event. For example, in the first monitored area, such as the pit, transition point or pit the receiver hub 108 or receiver processing and distribution system 110 may establish a location hierarchy by assigning a priority of 1 to UWB location and a priority of 2 to position calculations, such as GPS. In a second monitored area, such as the race track, race course, or the like, the receiver hub 108 or receiver processing and distribution system 110 may establish a location hierarchy by assigning a priority of 1 to position calculations, such as GPS, and a priority of 2 to UWB location data, which may or may not be available. The receiver hub 108 or receiver processing and distribution system 110 may determine an over-determined location based on the location data, sensor position calculation data and the location hierarchy of the first or second monitored area.

Continuing the example, participants 402/402a may carry tags 102, sensors 203 or a monitoring unit 510 as discussed in FIGS. 2 and 4. In an instance in which participant 402 is outside of the UWB monitored area of the event, here the pit, the tag may utilize DGPS or other triangulation positioning and transmit the position data to the receiver hub through a Wi-Fi 113 or 3G receiver 114. When a participant 402a enters the monitored area, such as the pit of a race track, UWB blink data may be received by receivers 106 and a location data calculated as discussed above in FIG. 1. The pit crew can use the high accuracy location data in the pit area to for analytics such as, determining optimum pit crew deployment to decease pit stop time and determining crew member locations to prevent injury.

The tag 102a may receive a transmission reliability signal from an exciter 112. The tag 102a may commence transmitting when it receives the transmission reliability signal and may cease transmission when it exits the transmission reliability signal area as discussed in FIG. 4. In an example embodiment, the sensor 203a may receive a transmission reliability signal from transmitter 107 or exciters 112. The sensor 203a may transmit proximity data or position data, based on receiving or not receiving the transmission reliability signal as discussed above in FIG. 4. Further, the sensor may transmit a signal configured to cause the tag 102a to transition the tag blink rate based on the receipt of the transmission reliability signal as discussed above in FIG. 4. In some example embodiments, the pit may be a first zone of a monitored area and the event area outside of the first zone of the monitored area, e.g. the race track, may be a second zone of the monitored area.

Example Processing Module

FIG. 8a shows a block diagram of components that may be included in a processing module 800. Processing module 800 may comprise one or more processors, such as processor 802, one or more memories, such as memory 804, and communication circuitry 806. Processor 802 can be, for example, a microprocessor that is configured to execute software instructions and/or other types of code portions for carrying out defined steps, some of which are discussed herein. Processor 802 may communicate internally using data bus, for example, which may be used to convey data, including program instructions, between processor 802 and memory 804.

Memory 804 may include one or more non-transitory storage media such as, for example, volatile and/or non-volatile memory that may be either fixed or removable. Memory 804 may be configured to store information, data, applications, instructions or the like for enabling processing module 800 to carry out various functions in accordance with example embodiments of the present invention. For example, the memory 804 could be configured to buffer input data for processing by processor 802. Additionally or alternatively, the memory 804 could be configured to store instructions for execution by processor 802. Memory 804 can be considered primary memory and be included in, for example, RAM or other forms of volatile storage which retain its contents only during operation, and/or memory 804 may be included in non-volatile storage, such as ROM, EPROM, EEPROM, FLASH, or other types of storage that retain the memory contents independent of the power state of the processing module 800. Memory 804 could also be included in a secondary storage device, such as external disk storage, that stores large amounts of data. In some embodiments, the disk storage may communicate with processor 802 using an input/output component via a data bus or other routing component. The secondary memory may include a hard disk, compact disk, DVD, memory card, or any other type of mass storage type known to those skilled in the art.

In some embodiments, processor 802 may be configured to communicate with external communication networks and devices using communications circuitry 806, and may use a variety of interfaces such as data communication oriented protocols, including X.25, ISDN, DSL, among others. Communications circuitry 806 may also incorporate a modem for interfacing and communicating with a standard telephone line, an Ethernet interface, cable system, and/or any other type of communications system. Additionally, processor 802 may communicate via a wireless interface that is operatively connected to communications circuitry 806 for communicating wirelessly with other devices, using for example, one of the IEEE 802.11 protocols, 802.15 protocol (including Bluetooth, Zigbee, and others), a cellular protocol (Advanced Mobile Phone Service or "AMPS"), Personal Communication Services (PCS), or a standard 3G wireless telecommunications protocol, such as CDMA2000 1x EV-DO, GPRS, W-CDMA, LTE, and/or any other protocol.

Example Sensor

FIG. 8b shows a block diagram of components that may be included in a sensor 820. The sensor 820 may include a processing module 800 and a transmission module 822. The sensor 820 may include a transmission module 822 which may, in turn be in communication with the processor 802, or the processing module 800. The transmission module 822 may be configured to cause the processor 802 to determine receipt of a transmission reliability signal; and cause transmission of sensor proximity data or position data based on the determination of the transmission reliability signal. In an embodiment, the transmission module 822 may be configured to cause the processor 802 to cause the transmission of a distress signal or blink data based on the determination of the receipt of the transmission reliability signal. In an example embodiment, the transmission module 822 may be configured to cause the processor 802 to receive proximity data and/or position data from an origin node and transmit a signal configured to cause the transmission of blink data, sensor proximity data or sensor position data, and origin node position and/or proximity data. The transmission module 822 may be further configured to cause the processor 802 to receive a distress signal from an origin node, and cause the transmission of the origin node proximity and/or position data based on the receipt of the distress signal. The transmission module 822 may also be configured to cause the processor 802 to determine if a message count has satisfied a predetermined threshold and the transmission of origin node proximity and/or position data is based on the message count determination.

Example Apparatus

FIG. 8c shows a block diagram of components that may be included in an apparatus 830 such as the receiver hub 108 or receiver processing and distribution system 110 of FIG. 1. The apparatus 830 may comprise a processing module 800, a location module 832, or a user interface 808.

The user interface 808 may be in communication with the processor 802, of the processing module 800, to provide output to the user and to receive input. For example, the user interface may include a display and, in some embodiments, may also include a keyboard, a mouse, a joystick, a touch screen, touch areas, soft keys, a microphone, a speaker, or other input/output mechanisms. The processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The apparatus 830 may include a location module 832 that may, in turn, be in communication with the processor 802, of the processing module 800 and configured to cause the processor to receive blink data from a location tag associated with a first sensor, receive proximity and/or position data generated based on communications between the first sensor and a second sensor, the proximity data including the second sensor identifier, calculating the location tag location data based on the blink data, and determining a first sensor position calculation based on the proximity and/or position data. The location module 832 may be further configured to cause the processor 802 to assign a priority values to the location data and the sensor position calculation data, and determine the highest priority location data or sensor position calculation data available. In an example embodiment the location module 832 may cause the highest priority location data or sensor position calculation data to be displayed on a graphic user interface 808 or stored in a memory 804. In an example embodiment, the location module 832 may be configured to cause the processor 802 to determine a sensor position calculation data associated with a location tag based on the previous location data associated with the location tag. In an example embodiment, the location module 832 may be configured to cause the processor 802 to validate the location data based on the calculated location data and the determined sensor position calculation data. In an example embodiment the location module 832 may be configured to determine a message route based on the calculated location data of a plurality of location tags or determined position calculations of a plurality of sensors and transmit the message route in a monitored area.

FIGS. 9, 10, and 11 illustrate example flowcharts of the operations performed by an apparatus, such as apparatus 830 of FIG. 8c and sensor 820 of FIG. 8b, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory 804 of a processing module 800 employing an embodiment of the present invention and executed by a processor 802 in the processing module. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 9, 10, and 11 when executed, convert a computer or processing circuitry into a particular machine configured to perform an example embodiment of the present invention. Accordingly, the operations of FIGS. 9, 10, and 11 define an algorithm for configuring a computer or processor, to perform an example embodiment. In some cases, a general purpose computer may be provided with an instance of the processor which performs the algorithm of FIGS. 9, 10, and 11 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

In some example embodiments, certain ones of the operations herein may be modified or further amplified as described below. Moreover, in some embodiments additional optional operations may also be included (some examples of which are shown in dashed lines in FIGS. 9, 10, and 11). It should be appreciated that each of the modifications, optional additions or amplifications described herein may be included with the operations herein either alone or in combination with any others among the features described herein.

Example Sensor Transmission Process

FIG. 9 illustrates a flowchart of an exemplary process for determining a transmission from a sensor. At 902, a sensor 820 may be provided including a transmission module 822 and a processing module 820. The transmission module 822 may be configured to cause the processor 802 to determine receipt of a transmission reliability signal. The communications circuitry 806 may receive transmission reliability signals from exciters (e.g. exciters 112 as shown in FIG. 4) indicating the sensor 203 and associated tag 102 are within the monitored area or crossing the boundary of a monitored area. Additionally or alternatively, the communication circuitry 806 may receive a transmission reliability signal from a transceiver (e.g. transceiver 107 as shown in FIG. 4) indicating the associated tag 102 signal to receiver 106 are not obstructed. In an instance in which the transmission reliability is received by the processor 802, the processor 802 may cause the communication circuitry 806 transmit a signal configured to cause the tag to transmit blink data at 904 or cause the transmission of tag blink data 906 and transmit proximity or position data at 908. In an instance in which the processor 802 determines the transmission reliability signal has not been received, the processor may cause the communication circuitry to transmit a signal configured to terminate blink data transmission 909 and transmit proximity or position data 910, or terminate blink data transmission 911, transmit a distress signal 912, and transmit proximity or position data 914.

At 904 and 906, the transmission module may be configured to cause the processor 802 to cause the transmission blink data. The processor 802 may cause the communication circuitry 806 to transmit a signal to the associated tag 102 configured to cause the tag to commence transmitting tag blink data based on the determination of receipt of the transmission reliability signal at 902. The commence transmitting signal may be a short range low frequency signal as discussed in FIG. 4 or through wired communication in an instance in which the sensor and tag are housed in a monitoring unit, such as monitoring unit 510. The transmission of blink data is discussed in FIG. 1.

At 909 and 911, the transmission module may be configured to cause the processor 802 to cause the termination of blink data transmission. The processor 802 may cause the communication circuitry 806 to transmit a signal to the associated tag 102 configured to cause the tag to commence terminate transmitting tag blink data based on the determination of a failure to receive of the transmission reliability signal at 902. The terminate transmitting signal may be a short range low frequency signal as discussed in FIG. 4 or through wired communication in an instance in which the sensor and tag are housed in a monitoring unit, such as monitoring unit 510.

In an example embodiment, the processor 802 may cause the communications circuitry 806 to transmit a signal to the tag 102 configured to alter tag blink rate based on the receipt of the transmission reliability signal. For example the sensor 820 may cause the tag 102 to blink at 56 Hz when within the monitored area or unobstructed and 1 Hz when outside of the monitored area or obstructed.

At 908, 910, and 914, the transmission module 822 may be configured to cause the processor 802 to cause the communications circuitry 806 to transmit proximity or position data at 908. The communication circuitry 806 may transmit proximity or position data by NFC, Wi-Fi, BLE, or the like. The proximity or position data may be received by mesh nodes, such as mesh nodes 203b-e of FIG. 4 or a transceiver, such as transceiver 107 of FIG. 4. Sensor proximity data may include the associated tag or sensor UID, proximity transmission radius, or other data indicative of the proximate location of a sensor. Sensor position data may include a triangulation position, such as GPS or ISO-2, or telemetry data. In an example embodiment the sensor UID or associated tag UID is appended to the proximity or position data for later use in determination of number of transmissions or system diagnostics.

In an example embodiment, the transmission module 822 may be configured to cause the processor 802 to cause the communication circuitry 806 to transmit via one or multiple location methods within a monitored area and transmit on a different or single location method when outside of the monitored area based on the transmission reliability signal. For example, the communication circuitry 806 may transmit proximity and position data at 908 within the monitored area. Outside of the monitored area the processor 802 may cause the communication circuitry 806 to only transmit proximity or position data at 910 or 914.

In an instance in which the processor 802 fails to receive the transmission reliability signal, the transmission module 822 may assume that the tag blink data transmissions would be obstructed, for example, by a pile up of players in football, a rugby scrum, or a player holding another player. The transmission module 822 may be configured to cause the processor 802 to cause the communication circuitry 806 to transmit a distress signal at 912. The distress signal may be received by mesh nodes 203b-e.

In an example embodiment, the transmission module 822 is configured to cause the processor 802 to cause in turn the communication circuitry 806 to cause the transmission of blink data and transmit proximity and/or position data without a determination of receipt of the transmission reliability signal. For example, location systems using redundant location methods may have transmission modules 822 configured to cause the processor 802 to cause the communication circuitry 806 to transmit proximity and position data for validation of location and position calculations and/or as a secondary location/position determination.

Example Mesh Node Transmission Process

FIG. 10 illustrates a flowchart of an exemplary process for determining a transmission from a mesh node. The mesh node may be a sensor 820 including a transmission module 822 and a processing module 800. The transmission module may be in communication with the processor 802 of the processor module 800. At 1002, the transmission module 822 may be configured to cause the processor 802 to receive from a communication circuitry 806, a first proximity or position data from an origin node, such as origin node 203a of FIG. 4. The processor 802 may be configured to receive the origin node 203a proximity or position data over a mesh network protocol through NFC, Wi-Fi, BLE, or the like. The mesh node 820 may continue the process at data path A, B, C, D, E, or F depending on the sensor configuration. In data path A at 1004, the transmission module 822 may be configured to cause the processor 802 to cause the communications circuitry 806 to transmit a signal configured to cause the transmission of tag blink data from the associated tag 102, as described at 904 of FIG. 9, disregarding the received origin node 203a proximity or position data. The mesh node 820 may not be configured to transmit origin node 203a data or may have determined that transmission of origin node data should not be performed in data path D, E, or F.

In data path B, the transmission module 822 may be configured to cause the processor 802 to cause the communications circuitry 806 to transmit a signal configured to cause the transmission of blink data by a tag associated with the mesh node 820 at 1006 as discussed at 904 of FIG. 9 and transmit mesh node proximity or position data at 1008. The communication circuitry may transmit the mesh node proximity of position data through the mesh network protocol through NFC, Wi-Fi, BLE, or the like for receipt by a sensor transceiver 107 using mesh nodes 203c-e. In an example embodiment, the mesh node 820 proximity and/or position data may be transmitted for receipt by a directional long range transceiver antenna, such as 107a.

Origin node proximity data may include the origin node UID, proximity transmission radius, or other data indicative of the proximate position of an origin node. Origin node position data may include a triangulation position, such as GPS or ISO-2, or telemetry data. In an example embodiment the mesh node UID is appended to the proximity or position data for later use in determination of number of transmissions or system diagnostics. In an example embodiment, the origin node proximity data is used to generate the mesh node proximity or position data by appending the associated tag or sensor UIDs of all tags/sensors including the origin node for which proximity data was received in the mesh node proximity data. The mesh node 102b may not be configured to transmit origin node 203a data or may have determined that transmission of origin node data should not be performed in data path D, E, or F. Origin node position data may include a triangulation position, such as GPS or ISO-2, or telemetry data.

In data path C, the transmission module 822 may be configured to cause the processor 802 to cause the communications circuitry 806 cause the associated tag to transmit blink data at 1010 as discussed in 904 of FIG. 9, transmit mesh node proximity or position data at 1012 as discussed at 1008, and transmit origin node proximity or position tag data at 1014. The process may repeat at 1002 until the node and/or origin node data reaches a transceiver 107.

At 1014, the transmission module 822 may be configured to cause the processor 802 to appended the mesh node 820 associated tag or sensor UID in addition to the origin node associated tag or sensor UID to the proximity or position data for later use in determination of number of transmissions or system diagnostics. Additionally, the mesh node tag/sensor UIDs may be used for system analytics and diagnostics to determine the route the message took through the mesh network. The processor 802 may then cause the communication circuitry 806 to transmit the origin node 203a proximity or position data, in a manner substantially similar to the transmission of mesh node data at 1008.

In data path D may apply in an instance in which the origin node proximity or position data is transmitted through a mesh network, the transmission module 822 may cause the processor 802 to limit the transmission to prevent the message from being perpetually transmitted throughout the monitored area. At 1016, the transmission module 822 may cause the processor 802 to determine if a message count has satisfied a predetermined threshold. The message count may include a transmission count such as 3, 4 or 5 transmissions; or a time count, such as 3, 2, or 1 seconds. The number of transmissions may be determined by an incremental count in the message data, or by the number of tag UIDs that have been appended to the message data. If the processor 802 determines the message count satisfies a pre-determined threshold, the transmission module 822 may cause the processor 802 to transmit data as discussed in data path A or B. In an instance in which the processor 802 determines that the message count fails to satisfy the threshold, the processor may cause the communication circuitry 806, the transmit data as discussed in data path C, therefore sending the proximity and position data to the next mesh node 203b in the mesh network or to the transceiver 107.

For example, if the message count is 4 transmissions and the mesh node 820 receives origin node 203a proximity or position data with an incremental count of 3 or 3 tag/sensor UIDs, the mesh node may determine the message count is not satisfied and continue the process at data path C. At data path C, processor 802 of the mesh node 820 may cause the communication circuitry 806 to transmit a signal configured to cause the transmission of blink data by the associated tag 102, transmit mesh node 820 proximity or position data, and transmit origin node 203a proximity or position data. In an instance in which the incremental count is 4 or 4 tag/sensor UIDs present, the processor 802 may determine he message count has been satisfied and disregard the origin node data in data path A or B. The processor 802 may cause the communication circuitry to transmit a signal configured to cause the transmission of the blink data of the associated tag 102 in data path A, or transmit a signal configured to cause the transmission of blink data from the associated tag 102 and transmit the mesh tag 820 proximity or position data in data path B.

Data path E may be applied in an instance in which the sensor proximity or position data is being transmitted through a mesh network, the receiver hub 108 or receiver processing and distribution system 110 may determine the best route (e.g. smallest number of transmissions to reach a transceiver 107) for the message and transmit the route to the sensors in the monitored area. In data path E, the transmission module 822 may cause the processor 802 to receive a message route from communication circuitry 806 at 1018. Communication circuitry 806 may receive the message route from transceivers 107. At 1020, the transmission module 822 may cause the processor 802 to determine if the mesh node 820 is designated in the received message route. If the processor 802 determines the mesh node 102b is not designated in the message route, the processor 802 may cause the communication circuitry 806 to cause the transmission of blink data from the associated tag 102 or cause the transmission of blink data from the associated tag 102 and transmit mesh node proximity or position data as discussed in data path A or B. If the processor 802 determines that mesh node 820 is designated in the message route, the processor 802 may cause the communication circuitry 806 to cause the transmission of blink data from the associated tag 102 and transmit mesh node 820 and origin node 203a position or proximity data as discussed in data path C.

Data path F may be applied in an instance in which the origin node is configured to send a distress signal in response to failing to receive a transmission reliability signal as discussed in FIG. 9. The distress signal may be indicative of a tag or sensor data transmission being obstructed. At 1022, the transmission module 822 may be configured to cause the processor 802 to determine receipt of a distress signal from the communication circuitry 806. Communication circuitry 806 may receive the distress signal from an origin node 203a. In an instance in which the processor 802 fails to receive an indication of receipt of a distress signal from an origin node 203a, the processor 802 may assume the tag 102 or sensor data is not obstructed and cause transmission of data as discussed in data path A or B. In an instance in which the processor 802 does receive an indication of the receipt of a distress signal from an origin node 203a, the processor may determine that the tag and/or the origin node is obstructed and continue data processing as discussed in data path D or E, or transmit data as discussed in data path C.

Example Over-Determined Location Determination Process

FIG. 11 illustrates an exemplary process for determining an over-determined participant location. An apparatus 830 such as a receiver hub 108 or receiver processing and distribution system 110 may include a location module 832, a processing module 800, and a user interface 808. The location module 832 may be configured to cause the processor 802 to generate a location hierarchy by assigning priority values to each location and position method the location system may utilize. For example, UWB location data may be assigned a priority value of 1; proximity position calculation based on a UWB location may have a priority value of 2; triangulation position calculation such as GPS backhauled over Wi-Fi or ISO-2 may have a priority value of 3; ISO-2, Wi-Fi RSSI, and proximity position based on triangulation position calculation may have a priority value of 4; where 1 represents the highest priority value and 4 the lowest priority value.

In an example embodiment, the processor may generate location hierarchies for two or more monitored areas. For example, a first monitored area may the race track or course, with a location hierarchy including GPS backhauled over Wi-Fi or ISO-2 with a priority value of 1, UWB location data priority value of 2, Wi-Fi RSSI, and proximity position based on triangulation position calculation may have a priority value of 3. A second monitored area may be the pit, or transmission point of a race with a location hierarchy including UWB location data with a priority value of 1; triangulation position calculation such as GPS backhauled over Wi-Fi or ISO-2 with a priority value of 3; ISO-2, Wi-Fi RSSI, and proximity position based on triangulation position calculation may have a priority value of 3.

At 1102, the location module 832 may be configured to cause the processor 802 to receive blink data from communications circuitry 806. The communication circuitry 806 may receive blink data from the receivers 106. At 1108, the location module 832 may be configured to cause the processor 802 to calculate location data based on the received blink data as discussed in FIG. 1.

At 1104, the location module 832 may be configured to cause a processor 802 to receive mesh node 203b proximity or position data from the communications circuitry 806. The communication circuitry 806 may receive the sensor 820 or mesh node 203b proximity or position data from the transceiver 107. The proximity data may include data identifying one or more mesh nodes 203b in proximity to the specified origin node 203a, such as the origin node and mesh node UIDs or their associated tag UIDs. Additionally the proximity data may include data indicative of a proximity radius, such as a Wi-Fi RSSI. The position data may include telemetry data or a triangulated position data, such as DGPS or ISO-2.

The transceiver 107 may receive sensor 820 or mesh node 203b proximity or position data through a mesh network protocol through mesh nodes 203b-e transmitting in NFC, BLE, or Wi-Fi. Alternatively, the transceiver 107a may direct backhaul proximity or position data from a sensor 820 or mesh node 203b using a directional long range transceiver antenna 107a. Origin node 203a proximity or position data may be received in a substantially similar manner at 1106.

At 1110, the location module 832 may be configured to cause the processor 802 to determine sensor 820 or mesh node 203b proximity position data. Each sensor may have a predetermined range for transmission of the proximity data, limiting the receipt of the proximity data to a specified radius. For example, the range may be 10 ft, 4 ft, 2 ft, or any other radial distance value. The processor 802 may calculate location data and a proximity radius for each tag for which proximity data was received from an associated sensor 203, as illustrated in FIG. 5a.

At 1120, the location module 832 may be configured to cause the processor 802 to determine the sensor 820 or participant 402 position calculation based on the sensor proximity data. The processor 802 may determine a sensor 820 position calculation as the position or area in which the sensor proximity radii intersect, as depicted in FIG. 5a.

In an example embodiment the processor may weight located sensor positions based on the Wi-Fi RSSI and/or determine a transmission range based on the Wi-Fi RSSI. The processor 802 may determine the proximity position based on the determined transmission range radius intersections and/or weighting the area or position based on the RSSI for each proximate sensor 203.

At 1114, the location module 832 may be configured to cause the processor 802 to determine an origin node 203a proximity position data in a manner substantially similar to 1110. The processor 802 may determine the origin node 203a position calculation based on proximity position data in a manner substantially similar to 1120.

At 1112, the location module 832 may be configured cause the processor 802 to determine sensor 820 or mesh node 203b position data. The processor 802 may compile triangulation position data or telemetry data received from various sensors 203. The processor 802 may be configured to determine the origin node 203a position data in a substantially similar manner at 1116.

The location module 832 may be configured to cause the processor 802 to determine the origin node 203a position calculation based on the sensor position data at 1120 as discussed in FIG. 3E/F. The processor 802 may determine the sensor position calculation based on the position data determined at 1112 or 1116, by associating the triangulation position to the sensor 203, or calculating the sensor position using the telemetry data as discussed in FIG. 3E/F.

At 1118, the location module 832 may be configured to cause the processor 802 to validate location data. The processor 802 may validate location data by comparing determined proximity sensor position calculation data to the location data as shown in FIG. 5b. If the calculated location data is within a predetermined threshold of accuracy radius to the proximity sensor position calculation data, the processor 802 may determine the location data is validated. In an instance in which the location data fails to satisfy the predetermined threshold of accuracy, falling outside of the sensor proximity position calculation accuracy radii, the processor 802 may determine the location data is invalid and is considered missed. A missed location data may be considered unavailable for determination of highest priority location data or position calculation available. 1122 and is not used for display or analytics, but may be stored for later system diagnostics.

In an example embodiment, the location module 832 may be configured cause the processor 802 to validate location data by comparing the location data to the determined sensor position calculations, as shown in FIG. 5b. In an instance in which, the calculated location data falls within a predetermined threshold of accuracy radius of the sensor position calculation data, the processor 802 may determine the location data is valid. In an instance in which the location data falls outside the predetermined sensor position calculation data radius, the processor 802 may determine the location data is invalid and considered missed.

In an example embodiment, the location module 832 may be configured to cause the processor 802 to validate location data by comparing the current location data to the previously calculated location data. Previously calculated location data may include the last 2, 5, 10, 20 or another number of location data that were calculated prior to the location data that is being validated. In an instance in which the change in location data satisfies a predetermined threshold such as 2 ft, 5 ft, 20 ft, 30 ft, 100 ft, or any other distance value, the processor 802 may determine that the tag 102 could not travel that distance between blinks and the location data is invalid and considered missed. For example, if the difference in location data is 35 ft and the predetermined threshold is 25 ft, the processor may determine that the location data is invalid. A missed location data is considered unavailable and may not be used for further determinations. In an instance in which the change in location data fails to satisfy the predetermined threshold, the processor 802 may determine the location data is valid and may be available and used for further determinations.

At 1122, the location module maybe configured to cause the processor 802 to determine a message route. In an instance in which an origin node 203a proximity or position data or the blink data for a tag 102 associated with an origin node has not been received, the processor 802 may determine a message route for the origin data through the mesh network. The processor 802 may use the last location data and position calculation of the participant 402a and mesh nodes 203b-e to determine the shortest route to the transceiver 107, e.g. the smallest number of transmissions. The processor 802 may determine and designate mesh nodes by sensor UID, associated tag UID, or other identification. The processor 802 may generate a message route comprising the designated mesh node identifiers.

At 1123, the location module may cause the processor 802 to cause the communication circuitry 806 to transmit the message route. The communication circuitry 806 may transmit the message route to the transceiver 107 for transmission to the sensors 820 within the monitored area.

At 1124, the location module 832 may be configured to cause the processor 802 to determine highest priority location or sensor position calculation data available, or overdetermined location, for each participant 402. The processor 802 may determine the available location data and sensor position calculation data for each participant 402. The processor 802 may select the location data or sensor position calculation data based on the location hierarchy with the highest priority value assigned at 1101 from the available location and sensor position calculation data for the participant 402. For example, if UWB location data-priority 1 and GPS sensor position calculation data priority-2 are available the processor 802 may select the UWB location data. In an instance in which the processor 802 determines that UWB proximity position calculation-priority 2 and Wi-Fi position calculation-priority 3 are available, UWB proximity position calculation may be selected. In an instance in which two or more location/position methods are available and have the same priority value the determined position calculation may be an average of the selected location or sensor position calculation data.

In an example embodiments in which the monitored area includes two or more areas each having a location hierarchy, the processor 1202 may determine the monitored area associated with the location data or sensor position calculation data. The processor 1202 may determine the highest priority location data or sensor position calculation data, or over-determined location based on the location hierarchy of the monitored area associated with the location data and sensor position calculation data. For example, in which the location data or sensor position calculation data is associated with the first monitored area and location hierarchy, if the GPS sensor position calculation data-priority 1 and UWB location data priority-2 are available the processor 802 may select the GPS sensor position calculation data as the over-determined location. In an instance in which the location data or position calculation data is associated with a second monitored area and location hierarchy if UWB location data-priority 1 and GPS sensor position calculation data priority-2 are available the processor 802 may select the UWB location data as the over-determined location.

At 1125, the location module 832 may be configured to cause the processor 802 to cause at least the highest priority location or sensor position calculation data, or the over-determined location to be stored in a memory 804. The processor 802 may also store any other location data, or sensor position calculation data, position data, or proximity data in a memory 804 for later analytics or system diagnostics. For example, if an UWB location data-priority 1, an UWB proximity position calculation-priority 2 and a GPS position calculation-priority 3 are available; the processor may cause only the UWB location data to be stored, or store the UWB location data and UWB proximity sensor position calculation data, or store the UWB location, the UWB proximity sensor position calculation data and the GPS sensor position calculation data.

At 1126, location module 832 may cause the processor 802 to cause the highest priority of location or sensor position calculation data, or over-determined location to be displayed on a user interface 808. For example, in an instance where UWB location data is the highest priority, the processor 802 may cause the UWB location data to be displayed. In an instance when UWB location data is unavailable, but UWB proximity sensor position calculation data is available, the processor 802 may cause the user interface 808 to display the UWB proximity calculation data. In an example embodiment, the highest priority location or position is displayed and lower priority location or positions may be overlaid similar to the depiction of the radial accuracy thresholds shown in FIG. 5b.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    calculating, using a processor, location data for a location tag based on blink data received from the location tag;
    determining sensor position calculation data based on position data or proximity data received from a sensor associated with the location tag;
    determining an over-determined location based on the location data, the sensor position calculation data, and a location hierarchy, wherein the location hierarchy comprises a first priority for the location data, a second priority for the sensor position calculation data based on the position data, and a third priority for the sensor position calculation data based on the proximity data; and
    causing the over-determined location to be displayed on a user interface.

2. The method of claim 1, wherein the determining the over-determined location based on the location data, the sensor position calculation data, and the location hierarchy comprises determining a highest one of the priorities for the location tag.

3. The method of claim 1, wherein the determining the over-determined location based on the location data, the sensor position calculation data, and the location hierarchy comprises using the location hierarchy to select one or more of the location data or the sensor position calculation data for the location tag.

4. The method of claim 1 further comprising causing the over-determined location to be stored in a memory.

5. The method of claim 1, wherein the location hierarchy comprises a first set of priorities for a first monitored area and a second set of priorities for a second monitored area.

6. An apparatus comprising at least one processor and at least one memory including computer program code, the at least one memory and computer program code configured to, with the processor, cause the apparatus to:
    calculate location data for a location tag based on blink data received from the location tag;
    determine sensor position calculation data based on position data or proximity data received from a sensor associated with the location tag;
    determine an over-determined location based on the location data, the sensor position calculation data, and a location hierarchy, wherein the location hierarchy comprises a first priority for the location data, a second priority for the sensor position calculation data based on the position data, and a third priority for the sensor position calculation data based on the proximity data; and
    cause the over-determined location to be displayed on a user interface.

7. The apparatus of claim 6, wherein the over-determined location is determined based on the location data, the sensor position calculation data, and the location hierarchy by determining a highest one of the priorities for the location tag.

8. The apparatus of claim 6, wherein the over-determined location is determined based on the location data, the sensor position calculation data and the location hierarchy by using the location hierarchy to select one or more of the location data or the sensor position calculation data for the location tag.

9. The apparatus of claim 6, wherein the at least one memory and computer program code are further configured to, with the processor, cause the apparatus to cause the over-determined location to be stored in a memory.

10. A computer program product comprising a non-transitory computer readable medium having program code portions stored thereon, the program code portions configured, upon execution to:
 calculate location data for a location tag based on blink data received from the location tag;
 determine sensor position calculation data based on position data or proximity data received from a sensor associated with the location tag;
 determine an over-determined location based on the location data, the sensor position calculation data, and a location hierarchy, wherein the location hierarchy comprises a first priority for the location data, a second priority for the sensor position calculation data based on the position data, and a third priority for the sensor position calculation data based on the proximity data; and
 cause the over-determined location to be displayed on a user interface.

11. The computer program product of claim 10, wherein the determining the over-determined location based on the location data, the sensor position calculation data, and the location hierarchy comprises determining a highest one of the priorities for the location tag.

12. The computer program product of claim 10, wherein the determining the over-determined location based on the location data, the sensor position calculation data, and the location hierarchy comprises using the location hierarchy to select one or more of the location data or the sensor position calculation data for the location tag.

13. A computer program product of claim 10, wherein the program code portions are further configured, upon execution, to cause the over-determined location to be stored in a memory.

14. A method comprising:
 calculating, using a processor, location data for a location tag based on blink data received from the location tag;
 determining sensor position calculation data based on position data or proximity data received from a sensor associated with the location tag;
 determining an over-determined location based on the location data, the sensor position calculation data, and a location hierarchy, wherein the location hierarchy comprises a first set of priorities for a first monitored area and a second set of priorities for a second monitored area; and
 causing the over-determined location to be displayed on a user interface.

* * * * *